US012642740B2

(12) United States Patent
Giacometti et al.

(10) Patent No.: US 12,642,740 B2
(45) Date of Patent: Jun. 2, 2026

(54) SYSTEMS AND METHODS FOR DETERMINING COMPRESSION DEPTH AND PROVIDING FEEDBACK DURING ACTIVE COMPRESSION DECOMPRESSIONS

(71) Applicant: ZOLL Medical Corporation, Chelmsford, MA (US)

(72) Inventors: Paolo Giacometti, North Grafton, MA (US); Naghmeh Mostofi, Belmont, MA (US); Gary A. Freeman, Waltham, MA (US); Annemarie E. Silver, Bedford, MA (US); James R. Homuth, Corcoran, MN (US); Joshua W. Lampe, Groton, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 1311 days.

(21) Appl. No.: 17/424,253

(22) PCT Filed: Jan. 31, 2020

(86) PCT No.: PCT/US2020/016174
§ 371 (c)(1),
(2) Date: Jul. 20, 2021

(87) PCT Pub. No.: WO2020/160448
PCT Pub. Date: Aug. 6, 2020

(65) Prior Publication Data

US 2022/0110827 A1 Apr. 14, 2022

Related U.S. Application Data

(60) Provisional application No. 62/928,083, filed on Oct. 30, 2019, provisional application No. 62/888,216,
(Continued)

(51) Int. Cl.
*A61H 31/00* (2006.01)

(52) U.S. Cl.
CPC ......... *A61H 31/005* (2013.01); *A61H 31/007* (2013.01); *A61H 2031/001* (2013.01);
(Continued)

(58) Field of Classification Search
CPC ...... A61H 2031/001; A61H 2201/0153; A61H 2201/5007; A61H 2201/5043;
(Continued)

(56) References Cited

U.S. PATENT DOCUMENTS

| | | | |
|---|---|---|---|
| 4,797,104 | A | 1/1989 | Laerdal et al. |
| 6,463,327 | B1 | 10/2002 | Lurie et al. |

(Continued)

FOREIGN PATENT DOCUMENTS

| | | | |
|---|---|---|---|
| CN | 101303812 | A | 11/2008 |
| CN | 101534783 | A | 9/2009 |

(Continued)

OTHER PUBLICATIONS

A. Jalali et al., "Modeling Mechanical Properties of the Chest During the Cardiopulmonary Resuscitation Procedure", Computing in Cardiology, 41:13-16 (2014).

(Continued)

*Primary Examiner* — Justine R Yu
(74) *Attorney, Agent, or Firm* — Mintz, Levin, Cohn, Ferris, Glovsky and Popeo, P.C.

(57) ABSTRACT

A system for assisting with cardiopulmonary resuscitation (CPR) includes an active compression decompression (ACD) device configured for a user to push downward and pull upward on a chest of a patient, a sensor to measure force applied to the chest of the patient, a sensor configured to measure displacement of the chest of the patient, one or more processors, and a user interface. The processor is
(Continued)

configured to configured to execute computer-executable instructions to determine a maximum compression force applied to the chest of the patient during a compression cycle and a maximum decompression force applied to the chest of the patient during the compression cycle, estimate a displacement value for a total displacement of the chest of the patient during the compression cycle for compressing and decompressing the chest of the patient, and estimate at least one of a compression depth and a decompression displacement for the compression cycle.

24 Claims, 52 Drawing Sheets

Related U.S. Application Data filed on Aug. 16, 2019, provisional application No. 62/799,267, filed on Jan. 31, 2019.

(52) U.S. Cl.
CPC ................ *A61H 2201/0153* (2013.01); *A61H 2201/5007* (2013.01); *A61H 2201/5043* (2013.01); *A61H 2201/5071* (2013.01); *A61H 2201/5084* (2013.01)

(58) Field of Classification Search
CPC .... A61H 2201/5071; A61H 2201/5084; A61H 31/00; A61H 31/005–007
See application file for complete search history.

(56) References Cited

U.S. PATENT DOCUMENTS

| | | | | |
|---|---|---|---|---|
| 7,220,235 | B2 * | 5/2007 | Geheb | A61H 31/007 600/587 |
| 8,652,007 | B2 | 2/2014 | Kato et al. | |
| 8,920,348 | B2 | 12/2014 | Freeman | |
| 9,358,178 | B1 | 6/2016 | Morgan | |
| 9,713,568 | B2 | 7/2017 | Nilsson et al. | |
| 11,058,602 | B2 | 7/2021 | Freeman | |
| 2002/0188332 | A1 | 12/2002 | Lurie et al. | |
| 2002/0193711 | A1 | 12/2002 | Halperin et al. | |
| 2004/0249297 | A1 | 12/2004 | Pfeiffer et al. | |
| 2004/0267325 | A1 | 12/2004 | Geheb et al. | |
| 2007/0050910 | A1 | 3/2007 | Blanchard et al. | |
| 2008/0300517 | A1 | 12/2008 | Nysaether | |
| 2008/0300518 | A1 | 12/2008 | Bowes | |
| 2012/0052470 | A1 | 3/2012 | Woerlee et al. | |
| 2012/0136286 | A1 | 5/2012 | Nova et al. | |
| 2012/0330200 | A1 | 12/2012 | Voss et al. | |
| 2013/0218056 | A1 | 8/2013 | Aelen et al. | |
| 2013/0282068 | A1 | 10/2013 | Sagiroglu et al. | |
| 2013/0324894 | A1 | 12/2013 | Herken et al. | |
| 2013/0330200 | A1 | 12/2013 | Merz | |
| 2014/0046228 | A1 | 2/2014 | Walker | |
| 2014/0100496 | A1 | 4/2014 | Johnson et al. | |
| 2014/0121574 | A1 | 5/2014 | Chladek | |
| 2014/0257054 | A1 | 9/2014 | Packer et al. | |
| 2014/0323928 | A1 | 10/2014 | Johnson | |
| 2015/0257971 | A1 * | 9/2015 | Chapman | A61H 31/00 601/41 |
| 2016/0136042 | A1 * | 5/2016 | Nilsson | A61H 31/006 601/41 |
| 2017/0079876 | A1 | 3/2017 | Freeman | |
| 2017/0105895 | A1 | 4/2017 | Sardinas | |
| 2018/0092803 | A1 * | 4/2018 | Freeman | G16H 20/30 |
| 2018/0092804 | A1 | 4/2018 | Hunt et al. | |
| 2018/0256446 | A1 * | 9/2018 | Tan | A61B 5/0245 |
| 2018/0261128 | A1 * | 9/2018 | Tan | A61N 1/39044 |
| 2019/0091099 | A1 * | 3/2019 | Nilsson | A61H 31/006 |
| 2019/0175443 | A1 * | 6/2019 | Härdig | A61H 31/005 |
| 2020/0000680 | A1 * | 1/2020 | Silver | A61H 31/00 |
| 2021/0369560 | A1 | 12/2021 | Freeman | |

FOREIGN PATENT DOCUMENTS

| | | | |
|---|---|---|---|
| CN | 102368991 | A | 3/2012 |
| CN | 102920588 | A | 2/2013 |
| CN | 103200920 | A | 7/2013 |
| CN | 104271103 | A | 1/2015 |
| JP | 2005046606 | A | 2/2005 |
| JP | 2005046609 | A | 2/2005 |
| WO | 9925306 | A1 | 5/1999 |
| WO | 2017053180 | A1 | 3/2017 |

OTHER PUBLICATIONS

International Search Report mailed Jul. 9, 2020 iissued n corresponding PCT Application No. PCT/US2020/016174.
International Search Report mailed Dec. 7, 2016 issued in corresponding PCT Application No. PCT/US2016/052053.
Basseville et al., "Detection of Abrupt Changes-:Theory and Application", Prentice Hall, 1993, 469 pages.
Lobdell et al., "Impact Response of the Human Thorax", Human Impact Response, 1973, 45 pages.

* cited by examiner

4500

SYSTEMS AND METHODS FOR DETERMINING COMPRESSION DEPTH AND PROVIDING FEEDBACK DURING ACTIVE COMPRESSION DECOMPRESSIONS

CLAIM OF PRIORITY

This application is a U.S. National Stage Application under 35 U.S.C. § 371 and claims the benefit of International Patent Application No. PCT/US2020/016174, filed on Jan. 31, 2020, and claims priority under 35 U.S.C. § 119(e) to U.S. Provisional Patent Application Ser. No. 62/799,267, filed on Jan. 31, 2019, U.S. Provisional Patent Application Ser. No. 62/888,216, filed on Aug. 16, 2019, and U.S. Provisional Patent Application Ser. No. 62/928,083, filed on Oct. 30, 2019, the entire contents of each of which are hereby incorporated by reference.

TECHNICAL FIELD

This invention relates to the field of cardiac resuscitation, and in particular to devices for assisting rescuers in performing active compression and decompression of the chest during cardio-pulmonary resuscitation (CPR).

BACKGROUND

Worldwide, sudden cardiac arrest is a major cause of death and is the result of a variety of circumstances, including heart disease and significant trauma. In the event of a cardiac arrest, several measures have been deemed to be essential in order to improve a patient's chance of survival. These measures, termed Cardiopulmonary Resuscitation (CPR) must be taken as soon as possible to at least partially restore the patient's respiration and blood circulation. CPR is a collection of therapeutic interventions designed to both provide blood flow via external manipulation of the external surface of the patient (e.g. thorax, abdomen, legs) as well as oxygenate the patient's blood, typically via delivery of external oxygen and other gases to the patient's lungs. One common technique, developed approximately 30 years ago, is chest compression.

Chest compression during CPR is used to mechanically support circulation in subjects with cardiac arrest, by maintaining blood circulation and oxygen delivery until the heart is restarted. The victim's chest is compressed by the rescuer, ideally at a rate and depth of compression in accordance with medical guidelines, e.g., the American Heart Association (AHA) guidelines. Other key chest compression parameters are velocity of decompression or release velocity, and the duty cycle of compression and decompression phases.

Traditional chest compressions are performed by the rescuer by laying the patient on their back, placing the rescuer's two hands on the patient's sternum and then compressing the sternal area downward towards the patient's spine in an anterior-posterior direction with an applied downward force. The rescuer then raises their hands upwards and releases them from the patient's sternal area, and the chest is allowed to expand by its natural elasticity that causes expansion of the patient's chest wall. The rescuer then repeats this down-and-up motion in a cyclical, repetitive fashion at a rate sufficient to generate adequate blood flow. The downward phase of the compression is typically referred to as the compression phase. The upward-going portion of the compression cycle is typically referred to as the release or decompression phase.

One key step for creating blood flow through the heart is to release the chest adequately after each chest compression. The chest should be released sufficiently to enhance negative pressure in the thoracic cavity, to facilitate venous filling of the ventricles of the heart and increase blood volume available to be distributed during the next chest compression. If the chest is not released adequately, venous return and right atrial filling will be hindered.

In order for the rescuer to properly deliver chest compressions, it is beneficial to be able to provide real-time feedback to rescuer's that allow them to adjust the various aspects of their compressions to deliver optimal care to the patient. Systems such as the ZOLL Medical RealCPRHelp (Chelmsford MA) use accelerometers or other motion sensors to measure the motion of the patient's sternum and provide real-time feedback on chest compression parameters such as those mentioned above. The sternal motion is also stored in the monitoring device—a defibrillator or even a smartphone, smartwatch, etc.—for review by the rescuer or other medical personnel. Some systems use just force sensors to estimate the chest compression motion parameters by assuming some nominal value for the patient's chest compliance and calculating an estimated displacement from the measured force.

SUMMARY

A system is described for assisting with cardiopulmonary resuscitation (CPR). The system includes at least one sensor (e.g., force sensor and a sensor for measuring displacement); and one or more processors configured for calculating a relationship between force and displacement based on data received from the at least one sensor, and determining an estimated neutral position of chest compression based at least in part on the relationship between force and displacement. The system can take the form of an active compression-decompression device.

The system has a number of advantages. For example, the system can provide feedback (e.g., on a user interface) that allows a rescuer to understand the effectiveness of the CPR treatment he or she is administering. The rescuer can then adjust the forces that he or she is applying during the CPR treatment and receive feedback confirming whether the adjustment is improving the effectiveness of the treatment. Depending on the implementation, the feedback can be provided by a CPR device, or transmitted to a second device external to the CPR device. In this way, it is more likely the CPR treatment will be effective at resuscitating the victim, and less likely that the CPR treatment will cause injury to the victim.

In an aspect, an active compression decompression (ACD) system includes a device configured to push downward and pull upward on a chest of a patient; a force sensor configured to measure force applied to the chest of the patient by the ACD device; a motion sensor configured to measure displacement of the chest of the patient; one or more computer-readable media storing computer-executable instructions; and one or more processors configured to execute the computer executable instructions, the execution carrying out operations to: identify, based on one or more signals received from at least one of the force sensor and the motion sensor, a compression cycle including a compression phase and a decompression phase, determine a first depth of chest compression corresponding to a force-displacement relationship of the compression phase of the compression cycle, determine a second depth of chest compression corresponding to a force-displacement relationship of the decompression phase of the compression cycle, and estimate a neutral position of the chest of the patient based on the first depth and the second depth.

In some implementations, estimating the neutral position of the chest of the patient based on the first depth and the second depth comprises determining a chest compression depth representing the neutral position of the chest that is inside a range defined by the first depth and the second depth.

In some implementations, estimating the neutral position of the chest of the patient based on the first depth and the second depth comprises determining a chest compression depth representing the neutral position of the chest that is outside a range defined by the first depth and the second depth. In some implementations, estimating the neutral position of the chest of the patient based on the first depth and the second depth comprises determining a chest compression depth representing the neutral position of the chest that is a function of an average of the first depth and the second depth. In some implementations, the function of the average of the first depth and the second depth comprises a moving average of the first depth and the second depth for a plurality of compression cycles including the compression cycle and one or more compression cycles immediately prior to the compression cycle.

In some implementations, estimating the neutral position of the chest of the patient based on the first depth and the second depth comprises determining a chest compression depth representing the neutral position of the chest that is a function of the first depth and the second depth, where the first depth is weighted by a first weight value and where the second depth is weighted by a second weight value that is different than the first weight value. In some implementations, the compression phase comprises at least one of a compression elevated portion and a compression non-elevated portion. In some implementations, the decompression phase comprises at least one of a decompression elevated portion and decompression non-elevated portion. In some implementations, the force-displacement relationship of the compression phase is different than the force-displacement relationship of the decompression phase based on a hysteresis of the compression cycle.

In some implementations, the ACD device comprises: a first element configured to be coupled to the chest of the patient; and a second element configured to be grasped by a rescuer, the second element being coupled to the first element. In some implementations, the ACD device comprises at least one of the force sensor and the motion sensor. In some implementations, the motion sensor comprises an accelerometer.

In some implementations, the ACD system includes a user interface configured to display data representing one or more of the first depth and the second depth. In some implementations, the user interface is configured to display data indicating one or more of the force and the displacement. In some implementations, the user interface is configured to display a compression non-elevated depth of the compression phase. In some implementations, the user interface is configured to display a decompression elevated height of the decompression phase. In some implementations, the user interface is configured to display a trend graph representing chest remodeling. In some implementations, the user interface is configured for display on a device that is external to the ACD device. In some implementations, the device is remote from the ACD device.

In some implementations, the device comprises at least one of a smartphone, a smartwatch, and a tablet device. In some implementations, the ACD system includes a communication device configured to communicate data to an external device and receive data from the external device.

In some implementations, the execution is carrying out operations to: determine a third depth of chest compression corresponding to when approximately zero force is applied to the chest of the patient during the compression phase of the compression cycle determine a fourth depth of chest compression corresponding to when approximately zero force is applied to the chest of the patient during the decompression phase of the compression cycle, and estimate the neutral position of the chest of the patient based on the first depth, the second depth, the third depth and the fourth depth. In some implementations, the execution is carrying out operations to: determine a fifth depth of chest compression corresponding to a first product of force and displacement on the compression phase of the compression cycle, determine a sixth depth of chest compression corresponding to a second product of force and displacement on the decompression phase of the compression cycle, and estimate the neutral position of the chest of the patient based on the first depth, the second depth, the third depth, the fourth depth, the fifth depth, and the sixth depth.

In some implementations, estimating the neutral position of the chest of the patient based on the first depth, the second depth, the third depth, the fourth depth, the fifth depth, and the sixth depth comprises a function of an average of the first depth, the second depth, the third depth, the fourth depth, the fifth depth, and the sixth depth.

In an aspect, a system includes an active compression decompression (ACD) device configured to push downward and pull upward on a chest of a patient; a force sensor configured to measure force applied to the chest of the patient by the ACD device; a motion sensor configured to measure displacement of the chest of the patient; one or more computer-readable media storing computer-executable instructions; and one or more processors configured to execute the computer executable instructions, the execution carrying out operations to: identify, based on one or more signals received from at least one of the force sensor and the motion sensor, a compression cycle including a compression phase and a decompression phase, determine a first depth of chest compression corresponding to when approximately zero force is applied to the chest of the patient during the compression phase of the compression cycle, determine a second depth of chest compression corresponding to when approximately zero force is applied to the chest of the patient during the decompression phase of the compression cycle, and estimate a neutral position of the chest of the patient based on the first depth and the second depth.

In some implementations, estimating the neutral position of the chest of the patient based on the first depth and the second depth comprises determining a chest compression depth representing the neutral position of the chest that is inside a range defined by the first depth and the second depth. In some implementations, estimating the neutral position of the chest of the patient based on the first depth and the second depth comprises determining a chest compression depth representing the neutral position of the chest that is outside a range defined by the first depth and the second depth. In some implementations, estimating the neutral position of the chest of the patient based on the first depth and the second depth comprises determining a chest compression depth representing the neutral position of the chest that is a function of an average of the first depth and the second depth. In some implementations, the function of the average of the first depth and the second depth comprises a moving average of the first depth and the second depth for a plurality of compression cycles including the compression cycle and one or more compression cycles immediately prior to the compression cycle.

In some implementations, estimating the neutral position of the chest of the patient based on the first depth and the second depth comprises determining a chest compression depth representing the neutral position of the chest that is a function of the first depth and the second depth, where the first depth is weighted by a first weight value and where the second depth is weighted by a second weight value that is different than the first weight value. In some implementations, the compression phase comprises at least one of a compression elevated portion and compression non-elevated portion. In some implementations, the decompression phase comprises at least one of a decompression elevated portion and decompression non-elevated portion. In some implementations, a difference between the first depth and the second depth is based on a hysteresis of the compression cycle. In some implementations, the ACD device comprises: a first element configured to be coupled to the chest of the patient; and a second element configured to be grasped by a rescuer, the second element being coupled to the first element. In some implementations, the ACD device comprises at least one of the force sensor and the motion sensor. In some implementations, the motion sensor comprises an accelerometer.

In some implementations, the system includes a user interface configured to display data representing one or more of the first depth and the second depth. In some implementations, the user interface is configured to display data indicating one or more of the force and the displacement. In some implementations, the user interface is configured to display a compression non-elevated depth of the compression phase. In some implementations, the user interface is configured to display a decompression elevated height of the decompression phase. In some implementations, the user interface is configured to display a trend graph representing chest remodeling. In some implementations, the user interface is configured for display on a device that is external to the ACD device. In some implementations, the device is remote from the ACD device. In some implementations, the device comprises at least one of a smartphone, a smartwatch, and a tablet device.

In some implementations, the system includes a communication device configured to communicate data to an external device and receive data from the external device.

In some implementations, the execution is carrying out operations to: determine a third depth of chest compression corresponding to a force-displacement relationship of the compression phase of the compression cycle, determine a fourth depth of chest compression corresponding to a force-displacement relationship of the decompression phase of the compression cycle, and estimate the neutral position of the chest of the patient based on the first depth, the second depth, the third depth and the fourth depth. In some implementations, the execution is carrying out operations to: determine a fifth depth of chest compression corresponding to a first product of force and displacement on the compression phase of the compression cycle, determine a sixth depth of chest compression corresponding to a second product of force and displacement on the decompression phase of the compression cycle, and estimate the neutral position of the chest of the patient based on the first depth, the second depth, the third depth, the fourth depth, the fifth depth, and the sixth depth. In some implementations, estimating the neutral position of the chest of the patient based on the first depth, the second depth, the third depth, the fourth depth, the fifth depth, and the sixth depth comprises a function of an average of the first depth, the second depth, the third depth, the fourth depth, the fifth depth, and the sixth depth.

In an aspect, a system includes an active compression decompression (ACD) device configured to push downward and pull upward on a chest of a patient; a force sensor configured to measure force applied to the chest of the patient by the ACD device; a motion sensor configured to measure displacement of the chest of the patient; and one or more computer-readable media storing computer-executable instructions; one or more processors configured to execute the computer executable instructions, the execution carrying out operations to: identify, based on one or more signals received from at least one of the force sensor and the motion sensor, a compression cycle including a compression phase and a decompression phase, determine a first depth of chest compression corresponding to a first product of force and displacement during the compression phase of the compression cycle, determine a second depth of chest compression corresponding to a second product of force and displacement during the decompression phase of the compression cycle, and estimate a neutral position of the chest of the patient based on the first depth and the second depth.

In some implementations, estimating the neutral position of the chest of the patient based on the first depth and the second depth comprises determining a chest compression depth representing the neutral position of the chest that is inside a range defined by the first depth and the second depth. In some implementations, estimating the neutral position of the chest of the patient based on the first depth and the second depth comprises determining a chest compression depth representing the neutral position of the chest that is outside a range defined by the first depth and the second depth. In some implementations, estimating the neutral position of the chest of the patient based on the first depth and the second depth comprises determining a chest compression depth representing the neutral position of the chest that is a function of an average of the first depth and the second depth.

In some implementations, the function of the average of the first depth and the second depth comprises a moving average of the first depth and the second depth for a plurality of compression cycles including the compression cycle and one or more compression cycles immediately prior to the compression cycle. In some implementations, estimating the neutral position of the chest of the patient based on the first depth and the second depth comprises determining a chest compression depth representing the neutral position of the chest that is a function of the first depth and the second depth, where the first depth is weighted by a first weight value and where the second depth is weighted by a second weight value that is different than the first weight value. In some implementations, the compression phase comprises at least one of a compression elevated portion and compression non-elevated portion. In some implementations, the decompression phase comprises at least one of a decompression elevated portion and decompression non-elevated portion. In some implementations, a difference between the first depth and the second depth is based on a hysteresis of the compression cycle.

In some implementations, the ACD device comprises: a first element configured to be coupled to the chest of the patient; and a second element configured to be grasped by a rescuer, the second element being coupled to the first element. In some implementations, the ACD device comprises at least one of the force sensor and the motion sensor. In some implementations, the motion sensor comprises an accelerometer.

In some implementations, the system includes a user interface configured to display data representing one or more of the first depth and the second depth. In some implementations, the user interface is configured to display data indicating one or more of the force and the displacement. In some implementations, the user interface is configured to display a compression non-elevated depth of the compression phase. In some implementations, the user interface is configured to display a decompression elevated height of the decompression phase. In some implementations, the user interface is configured to display a trend graph representing chest remodeling. In some implementations, the user interface is configured for display on a device that is external to the ACD device. In some implementations, the device is remote from the ACD device.

In some implementations, the device comprises at least one of a smartphone, a smartwatch, and a tablet device. In some implementations, the system includes a communication device configured to communicate data to an external device and receive data from the external device.

In some implementations, the one or more processors are configured to generate a compression cycle representation including a product of the force and the displacement for a plurality of displacement values during the compression phase and during the decompression phase. In some implementations, the first product of the force and the displacement comprises a local minimum of the product of force and displacement on a compression phase portion of the compression cycle representation. In some implementations, the second product of the force and the displacement comprises a local minimum of the product of force and displacement on a decompression phase portion of the compression cycle representation. In some implementations, the first depth and the second depth each correspond to a compression depth at which the first product of the force and the displacement is equal to the second product of force and the displacement. In some implementations, the compression cycle representation comprises a first compression cycle representation, and where the one or more processors are configured to generate a second compression cycle representation including a derivative of the first compression cycle representation for the plurality of displacement values during the compression phase and during the decompression phase. In some implementations, the first depth is approximately equal to the second depth, and where the first product of force and displacement is approximately equal to the second product of force and displacement. In some implementations, the execution is carrying out operations to: determine a third depth of chest compression corresponding to a force-displacement relationship of the compression phase of the compression cycle, determine a fourth depth of chest compression corresponding to a force-displacement relationship of the decompression phase of the compression cycle, and estimate the neutral position of the chest of the patient based on the first depth, the second depth, the third depth and the fourth depth. In some implementations, the execution is carrying out operations to: determine a fifth depth of chest compression corresponding to when approximately zero force is applied to the chest of the patient during the compression phase of the compression cycle; determine a sixth depth of chest compression corresponding to when approximately zero force is applied to the chest of the patient during the decompression phase of the compression cycle, and estimate the neutral position of the chest of the patient based on the first depth, the second depth, the third depth, the fourth depth, the fifth depth, and the sixth depth. In some implementations, estimating the neutral position of the chest of the patient based on the first depth, the second depth, the third depth, the fourth depth, the fifth depth, and the sixth depth comprises a function of an average of the first depth, the second depth, the third depth, the fourth depth, the fifth depth, and the sixth depth.

As described further herein, a compression fraction method may be used to estimate the depth of compression when active compression decompression treatment is being applied to the victim. The compression fraction method can reduce or eliminate estimation errors introduced by mechanical aspects of a CPR device, such as an elastic plunger. Because the force measurements used in Equation (3) are peak forces, the forces are static measurements unaffected by the elastic dynamics of the plunger (or other mechanical coupling system of the CPR device. Additionally, data temporal synchrony between force measurement and acceleration has a wide tolerance. The CPR device associates each of the force measurements with the compression cycle during which the force measurements were measured. A synchronous measurement of motion and force is not needed; rather, the forces can be measured independent from measuring the motion of the patient. As a result, generation of a presentation of feedback on a user interface, communicating the data to another device, and calculating the compression depth estimations are all simpler than when synchronous data are required. Each mechanical configuration of the CPR device can be associated with training data.

In an aspect, a system for assisting with cardiopulmonary resuscitation (CPR) includes an active compression decompression (ACD) device is configured for a user to push downward and pull upward on a chest of a patient. The system can include a force sensor configured to measure force applied to the chest of the patient by the user with the ACD device. The system can include a motion sensor configured to measure displacement of the chest of the patient. The system can include one or more processors configured to execute computer-executable instructions stored in a memory for performing operations. The operations can include determining, based on at least one signal of the force sensor, a maximum compression force applied to the chest of the patient during a compression cycle and a maximum decompression force applied to the chest of the patient during the compression cycle. The operations can include estimating, based on at least one signal of the motion sensor, a displacement value for a total displacement of the chest of the patient during the compression cycle for compressing and decompressing the chest of the patient. The operations can include estimating at least one of a compression depth and a decompression displacement for the compression cycle, the estimation being based on the determined compression force, the determined decompression force, and the estimated displacement. The system can include a user interface configured to provide an indication of one or more of the compression depth and neutral position of the chest of the patient.

In some implementations, the operations include estimating the compression depth during the compression cycle by determining a fraction of the estimated displacement value. In some implementations, the fraction comprises a ratio between i) a first function of the determined compression force and ii) a second function of the determined compression force and the determined decompression force, the second function being different than the first function.

In some implementations, the operations include estimating a neutral position value of the chest of the patient for the compression cycle, the estimating being based on the estimated compression depth. In some implementations, the operations include applying a first weight value to the determined compression force and applying a second weight value to the determined decompression force. The first weight value and the second weight value can be based on training data specifying a first relationship between the determined compression force and the compression depth and a second relationship between the determined decompression force and the decompression displacement.

In some implementations, the operations include applying a third weight value to a square of the determined compression force, the third weight value based on the training data. The training data can be generated using known compression depth values and known decompression depth values. In some implementations, the first relationship and the second relationship each comprise one of a linear relationship, a quadratic relationship, or a higher-order relationship.

In some implementations, the determined compression force value can be determined from a first range of compression force measurements, and the determined decompression force can be determined from a second range of decompression force measurements.

In some implementations, the determined compression force and the determined decompression force each comprises a moving average of compression force values and decompression force values respectively for a plurality of compression cycles including the compression cycle and one or more compression cycles immediately prior to the compression cycle.

In some implementations, the ACD device includes a first element configured to be coupled to the chest of the patient and a second element configured to be grasped by a rescuer, the second element being coupled to the first element. In some implementations, the ACD device includes a plunger. The plunger can include an elastic element. In some implementations, the ACD device includes at least one of the force sensor and the motion sensor. The motion sensor can include an accelerometer.

In some implementations, the user interface is configured to display data indicating one or more of the determined compression force, the determined decompression force, and the estimated displacement value. In some implementations, the user interface is configured for display on a device that is external to the ACD device. In some implementations, the device can be remote from the ACD device. In some implementations, the device includes at least one of a smartphone, a smartwatch, and a tablet device. In some implementations, the system includes a communication device configured to communicate data to an external device and receive data from the external device. In some implementations, the force sensor includes a load cell.

In an aspect, a process for determining a compression depth during active compression decompression (ACD) treatment includes receiving training data for training a function relating a compression depth estimate to a compression force and a decompression force. The process includes training the function using the training data. The process includes determining, based on at least one signal of a force sensor configured to measure force applied to the chest of the patient by the user with an ACD device, a maximum compression force applied to the chest of the patient during a compression cycle and a maximum decompression force applied to the chest of the patient during the compression cycle. The process includes estimating, based on at least one signal of a motion sensor configured to measure displacement of the chest of the patient, a displacement value for a total displacement of the chest of the patient during the compression cycle for compressing and decompressing the chest of the patient. The process includes estimating at least one of a compression depth using the trained function, the estimation being based on the determined compression force, the determined decompression force, and the estimated displacement. The process includes providing, through a user interface, an indication of one or more of the compression depth and neutral position of the chest of the patient.

In some implementations, training the function can include receiving baseline data generated by a neutral-point estimation process and training the function using the baseline data.

In some implementations, the neutral-point estimation process includes identifying, based on one or more signals received from at least one of the force sensor and the motion sensor, a compression cycle including a compression phase and a decompression phase. The neutral-point estimation process includes determining a first depth of chest compression corresponding to a force-displacement relationship of the compression phase of the compression cycle. The neutral-point estimation process includes determining a second depth of chest compression corresponding to a force-displacement relationship of the decompression phase of the compression cycle. The neutral-point estimation process includes estimating a neutral position of the chest of the patient based on the first depth and the second depth.

In some implementations, the neutral-point estimation process includes identifying, based on one or more signals received from at least one of the force sensor and the motion sensor, a compression cycle including a compression phase and a decompression phase. In some implementations, the neutral-point estimation process includes determining a first depth of chest compression corresponding to when approximately zero force is applied to the chest of the patient during the compression phase of the compression cycle. In some implementations, the neutral-point estimation process includes determining a second depth of chest compression corresponding to when approximately zero force is applied to the chest of the patient during the decompression phase of the compression cycle. In some implementations, the neutral-point estimation process includes estimating a neutral position of the chest of the patient based on the first depth and the second depth.

In some implementations, the neutral-point estimation process includes identifying, based on one or more signals received from at least one of the force sensor and the motion sensor, a compression cycle including a compression phase and a decompression phase. In some implementations, the neutral-point estimation process includes determining a first depth of chest compression corresponding to a first product of force and displacement during the compression phase of the compression cycle, determining a second depth of chest compression corresponding to a second product of force and displacement during the decompression phase of the compression cycle. In some implementations, the neutral-point estimation process includes estimating a neutral position of the chest of the patient based on the first depth and the second depth.

In some implementations, the process includes training the neutral point function using a set of neutral point training data including neutral point baseline data.

By displaying feedback based on an estimated neutral position of the patient's chest, the ACD devices described in this document can update the feedback provided to the rescuer during CPR treatment to respond to changes in the patient's chest compliance. For example, the ranges of the compressions and/or decompressions can be changed over time to respond to changes in the patient's chest compliance. The updated feedback can assist the rescuer in providing more effective CPR compressions than if a static target range of compression depths (e.g., downstroke displacements) were provided by the ACD device to the rescuer. Similarly, the updated feedback can assist the rescuer in providing more effective CPR decompressions than if a static target range of decompression depths (e.g., upstroke displacements) were provided by the ACD device to the rescuer.

Furthermore, the feedback can be provided by the ACD device in an intuitive way to assist a rescuer in adjusting compression and/or decompression forces that the rescuer is applying to a patient. For example, the feedback can show a prediction of the compression and/or decompression forces that the user should apply in subsequent compression cycles. The rescuer can anticipate a change (e.g., an increase or a decrease) in recommended compression force and/or decompression force to apply to the patient. The rescuer can subsequently react to the change without pausing during application of compression cycles.

Alternatively, or in addition, the ACD device can provide feedback including a history of compression and decompression forces applied to the patient. The history can include trends of compression and decompression (e.g., application of increasing or decreasing forces over a sequence of compression cycles).

The ACD device can be configured to provide feedback to the rescuer in the form of an interactive application. The application can include a track that is a plot of compression force, depth, etc. against a time. For example, the track can include a sine wave that shows the depth vs. time of the compression cycle proceeding across the screen at a frequency corresponding to the recommended compression cycle time. The rescuer can may his or her compression motion to the sine wave to following the sine wave. Deviations from the track can cause the ACD device to alert the user to alter the treatment (e.g., a tone, alert, verbal instruction, etc.). The interactive feedback can assist a rescuer to understand during treatment how the treatment should be performed, increasing the accuracy of the applied treatment to the recommended treatment and reducing rescuer errors, delays, or pauses during CPR treatment.

In an aspect, a system for managing an active compression decompression (ACD) cardiopulmonary resuscitation (CPR) treatment to a patient can include an applicator device configured for a rescuer to provide the ACD CPR treatment to a chest of the patient. The system can include a motion sensor configured to be coupled to the chest of the patient and to generate displacement signals related to the ACD CPR treatment. The system can include a force sensor configured to be coupled to the chest of the patient and to generate force signals related to the ACD CPR treatment. The system can include a feedback device for providing feedback for a rescuer to adjust the ACD CPR treatment. The system can include at least one processor configured to: process both the displacement signals and the force signals related to the ACD CPR treatment, estimate a neutral position of the chest based on the displacement signals and the force signals, determine a downstroke displacement and an upstroke displacement based on the estimated neutral position and the displacement signals, adjust at least one of a target downstroke displacement range and a target upstroke displacement range based on the estimated neutral position, determine whether the downstroke displacement falls within the target downstroke displacement range and whether the upstroke displacement falls within the target upstroke displacement range, and generate at least one feedback signal for the feedback device to provide guidance for how to modify the ACD CPR treatment based on determining whether the downstroke displacement falls within the target downstroke displacement range and whether the upstroke displacement falls within the target upstroke displacement range.

In some implementations, the at least one processor is configured to determine an updated estimate of neutral position, an updated downstroke displacement and an updated upstroke displacement. In some implementations, the at least one processor is configured to adjust at least one of the target downstroke displacement range and the target upstroke displacement range based on the updated estimate of neutral position. In some implementations, the target downstroke displacement range is adjusted from an initial target downstroke displacement range to an updated target downstroke displacement range. In some implementations, the target downstroke displacement range is adjusted from an initial target downstroke displacement range to an updated target downstroke displacement range after a predetermined interval. In some implementations, the target downstroke displacement range is adjusted from an initial target downstroke displacement range to an updated target downstroke displacement range based on whether the downstroke displacement falls within the target downstroke displacement range. In some implementations, the updated target downstroke displacement range is greater than the initial target downstroke displacement range. In some implementations, the updated target downstroke displacement range is less than the initial target downstroke displacement range. In some implementations, the target upstroke displacement range is adjusted from an initial target upstroke displacement range to an updated target upstroke displacement range. In some implementations, the target upstroke displacement range is adjusted from an initial target upstroke displacement range to an updated target upstroke displacement range after a predetermined interval. In some implementations, the target upstroke displacement range is adjusted from an initial target upstroke displacement range to an updated target upstroke displacement range based on whether the upstroke displacement falls within the target upstroke displacement range. In some implementations, the updated target upstroke displacement range is greater than the initial target upstroke displacement range. In some implementations, the updated target upstroke displacement range is less than the initial target upstroke displacement range. In some implementations, the target downstroke displacement range and the target upstroke displacement range are approximately equivalent in magnitude.

In some implementations, the at least one feedback signal provides guidance for how to modify the ACD CPR treatment so that a future downstroke displacement falls within the target downstroke displacement range. In some implementations, the at least one feedback signal provides guidance for how to modify the ACD CPR treatment so that a future upstroke displacement falls within the target upstroke displacement range. In some implementations, the at least one feedback signal provides guidance for how to modify the ACD CPR treatment so that the downstroke displacement falls within the target downstroke displacement range prior to the upstroke displacement falling within the target upstroke displacement range. In some implementations, at least one of the target downstroke displacement range and the target upstroke displacement range is based on a clinically accepted guideline. In some implementations, the target downstroke displacement range is greater or less than the clinically accepted guideline. In some implementations, the target upstroke displacement range is greater or less than the clinically accepted guideline. In some implementations, the at least one processor is configured to determine how the chest of the patient has remodeled based on the estimated neutral position. In some implementations, the at least one feedback signal causes the display to provide an indication of patient chest remodeling. In some implementations, the at least one feedback signal causes the display to provide a visual indication of the downstroke displacement, the upstroke displacement, and the estimated neutral position relative to one another. In some implementations, the at least one processor is configured to estimate a past neutral position of the chest, a past downstroke displacement and a past upstroke displacement. In some implementations, the downstroke displacement comprises a current downstroke displacement and the upstroke displacement comprises a current upstroke displacement. In some implementations, the at least one feedback signal causes the display to provide a visual indication of the current downstroke displacement, the current upstroke displacement, the past downstroke displacement, and the past upstroke displacement. In some implementations, the guidance comprises a visual indication of whether the downstroke displacement falls within the target downstroke displacement range and whether the upstroke displacement falls within the target upstroke displacement range.

In some implementations, the visual indication comprises a color or highlight change of at least a portion of the display based on whether the downstroke displacement falls within the target downstroke displacement range or whether the upstroke displacement falls within the target upstroke displacement range. In some implementations, the visual indication comprises a color or highlight change of at least a portion of the display based on whether the downstroke displacement falls outside the target downstroke displacement range or whether the upstroke displacement falls outside the target upstroke displacement range. In some implementations, the visual indication comprises at least one of a bar showing the downstroke displacement and the upstroke displacement, a target downstroke zone representing the target downstroke displacement range, and a target upstroke zone representing the target upstroke displacement range. In some implementations, the visual indication comprises a color or highlight change of at least one of the bar showing the downstroke displacement and the upstroke displacement, the target downstroke zone representing the target downstroke displacement range, and the target upstroke zone representing the target upstroke displacement range.

In some implementations, the at least one processor is configured to determine a current displacement based on the displacement signals and determine a current force based on the force signals, and the at least one feedback signal for the display provides at least one graph of force and displacement that shows the current displacement and the current force. In some implementations, the at least one graph of force and displacement comprises a force-displacement graph. In some implementations, the at least one graph of force and displacement comprises a force-time graph and a displacement-time graph. In some implementations, at least one of the target downstroke displacement range and the target upstroke displacement range is between 0.5 and 3.0 inches. In some implementations, at least one of the target downstroke displacement range and the target upstroke displacement range is between 0.5 and 1.5 inches. In some implementations, at least one of the target downstroke displacement range and the target upstroke displacement range is between 1.5 and 2.5 inches. In some implementations, at least one of the target downstroke displacement range and the target upstroke displacement range is between 2.0 and 2.4 inches.

In some implementations, the at least one feedback signal causes the display to provide a visual indication of how at least one of the target downstroke displacement range and the target upstroke displacement range has been updated. In some implementations, the at least one feedback signal causes the display to provide no visual indication of how at least one of the updated estimate of neutral position, the updated target downstroke displacement range, and the updated upstroke target displacement range has been updated. In some implementations, the at least one feedback signal causes the display to provide a visual indication of how at least one of the updated estimate of neutral position, the updated target downstroke displacement range, and the updated upstroke target displacement range has been updated.

In some implementations, the applicator device comprises a handle for the rescuer to push and pull on the chest of the patient to apply the ACD CPR treatment. In some implementations, the handle comprises the display. In some implementations, the handle is configured to provide haptic feedback to provide the guidance for how to modify the ACD CPR treatment.

In some implementations, the system includes a patient monitor including at least one sensor for obtaining physiological data from the patient. In some implementations, the patient monitor comprises the display. In some implementations, the at least one feedback signal provides an indication that instructs the rescuer of a hold period following downstroke or upstroke. In some implementations, the at least one feedback signal causes the display to provide a visual indication of a hold period following downstroke or upstroke. In some implementations, the system includes a speaker for providing audio feedback to provide guidance for how to modify the ACD CPR treatment. The at least one feedback signal provides an indication that instructs the rescuer to switch with another person in providing the ACD CPR treatment. The indication that instructs the rescuer to switch is based on whether the downstroke displacement falls within the target downstroke displacement range or whether the upstroke displacement falls within the target upstroke displacement range. The at least one feedback signal provides an indication that instructs the rescuer to adjust a velocity of downstroke or velocity of upstroke.

In an aspect, a system includes an applicator device configured for a rescuer to provide the ACD CPR treatment to a chest of a patient, a motion sensor configured to be coupled to the chest of the patient and to generate displacement signals related to the ACD CPR treatment, a force sensor configured to be coupled to the chest of the patient and to generate force signals related to the ACD CPR treatment, a display for providing feedback for the rescuer to adjust the ACD CPR treatment, and at least one processor configured to: process both the displacement signals and the force signals related to the ACD CPR treatment, estimate a past neutral position of the chest and a current neutral position of the chest based on the displacement signals and the force signals, determine a past downstroke displacement and a past upstroke displacement based on the past estimate of neutral position, determine a current downstroke displacement and a current upstroke displacement based on the current estimate of neutral position, and generate at least one feedback signal for the display to provide a visual indication of the current downstroke displacement, the current upstroke displacement, the past downstroke displacement, and the past upstroke displacement.

In some implementations, the visual indication of the current downstroke displacement and the current upstroke displacement comprises a first bar graph, and the visual indication of the past downstroke displacement and the past upstroke displacement comprises a second bar graph. In some implementations, the first bar graph is displayed adjacent to the second bar graph. In some implementations, the first bar graph appears in a different color compared to the second bar graph. In some implementations, the second bar graph appears as a lighter shade compared to the first bar graph. In some implementations, the first bar graph comprises a solid line and the second bar graph comprises a dashed line.

In some implementations, the at least one processor is configured to determine whether the current downstroke displacement falls within a target downstroke displacement range and whether the current upstroke displacement falls within a target upstroke displacement range. In some implementations, the at least one feedback signal provides guidance for how to modify the ACD CPR treatment based on determining whether the current downstroke displacement falls within the target downstroke displacement range and whether the current upstroke displacement falls within the target upstroke displacement range. In some implementations, the guidance comprises a visual indication of whether the current downstroke displacement falls within the target downstroke displacement range and whether the current upstroke displacement falls within the target upstroke displacement range. In some implementations, the visual indication comprises a color or highlight change of at least a portion of the display based on whether the current downstroke displacement falls within the target downstroke displacement range or whether the current upstroke displacement falls within the target upstroke displacement range. In some implementations, the visual indication comprises a color or highlight change of at least a portion of the display based on whether the current downstroke displacement falls outside the target downstroke displacement range or whether the current upstroke displacement falls outside the target upstroke displacement range.

In some implementations, the at least one processor is configured to adjust at least one of the target downstroke displacement range and the target upstroke displacement range based on the current estimate of neutral position. In some implementations, the at least one processor is configured to adjust at least one of the target downstroke displacement range and the target upstroke displacement range based on determining whether the current downstroke displacement falls within the adjusted target downstroke displacement range and whether the current upstroke displacement falls within the adjusted target upstroke displacement range.

In some implementations, the at least one feedback signal provides guidance for how to modify the ACD CPR treatment based on determining whether the current downstroke displacement falls within the adjusted target downstroke displacement range and whether the current upstroke displacement falls within the adjusted target upstroke displacement range. In some implementations, the guidance comprises a visual indication of whether the current downstroke displacement falls within the adjusted target downstroke displacement range and whether the current upstroke displacement falls within the adjusted target upstroke displacement range. In some implementations, the visual indication comprises a color or highlight change of at least a portion of the display based on whether the current downstroke displacement falls within the target downstroke displacement range or whether the current upstroke displacement falls within the target upstroke displacement range. The visual indication comprises a color or highlight change of at least a portion of the display based on whether the current downstroke displacement falls outside the target downstroke displacement range or whether the current upstroke displacement falls outside the target upstroke displacement range. In some implementations, the at least one feedback signal provides guidance for how to modify the ACD CPR treatment so that a future downstroke displacement falls within the target downstroke displacement range. In some implementations, the at least one feedback signal provides guidance for how to modify the ACD CPR treatment so that a future upstroke displacement falls within the target upstroke displacement range.

In some implementations, the at least one processor is configured to determine how the chest of the patient has remodeled based on the past estimate of neutral position and the current estimate of neutral position. In some implementations, the at least one feedback signal causes the display to provide an indication of patient chest remodeling. The at least one processor is configured to determine a current displacement based on the displacement signals and determine a current force based on the force signals, and the at least one feedback signal for the display provides at least one graph of force and displacement that shows the current displacement and the current force. In some implementations, the at least one graph of force and displacement comprises a force-displacement graph. In some implementations, the at least one graph of force and displacement comprises a force-time graph and a displacement-time graph.

In some implementations, the applicator device comprises a handle for the rescuer to push and pull on the chest of the patient to apply the ACD CPR treatment. In some implementations, the handle comprises the display. In some implementations, the handle is configured to provide haptic feedback to provide guidance for how to modify the ACD CPR treatment.

In some implementations, the system includes a patient monitor including at least one sensor for obtaining physiological data from the patient. In some implementations, the patient monitor comprises the display. In some implementations, the at least one feedback signal provides an indication that instructs the rescuer of a hold period following downstroke or upstroke. In some implementations, the at least one feedback signal causes the display to provide a visual indication of a hold period following downstroke or upstroke.

In some implementations, the system includes a speaker for providing audio feedback to provide guidance for how to modify the ACD CPR treatment. The at least one feedback signal provides an indication that instructs the rescuer to switch with another person in providing the ACD CPR treatment. The indication that instructs the rescuer to switch is based on whether the current downstroke displacement falls within a target downstroke displacement range or whether the current upstroke displacement falls within a target upstroke displacement range. The at least one feedback signal provides an indication that instructs the rescuer to adjust a velocity of downstroke or velocity of upstroke.

In an aspect, a system includes an applicator device configured for a rescuer to provide the ACD CPR treatment to a chest of a patient, a motion sensor configured to be coupled to the chest of the patient and to generate displacement signals related to the ACD CPR treatment, a force sensor configured to be coupled to the chest of the patient and to generate force signals related to the ACD CPR treatment, a display for providing feedback for the rescuer to adjust the ACD CPR treatment, and at least one processor configured to: process both the displacement signals and the force signals related to the ACD CPR treatment, determine a current displacement based on the displacement signals, determine a current force based on the force signals, and generate at least one feedback signal for the display to provide at least one graph of force and displacement that shows the current displacement and the current force.

In some implementations, the at least one graph of force and displacement comprises a force-displacement graph. In some implementations, the at least one graph of force and displacement comprises a force-time graph and a displacement-time graph.

In some implementations, the at least one processor is configured to determine whether the current displacement falls within a target displacement range. In some implementations, the at least one processor is configured to determine whether the current force falls within a target force range. In some implementations, the at least one feedback signal provides guidance for how to modify the ACD CPR treatment based on determining whether the current displacement falls within the target displacement range and whether the current force falls within the target force range.

In some implementations, the guidance comprises a visual indication of whether the current displacement falls within the target displacement range and whether the current force falls within the target force range. In some implementations, the visual indication comprises a color or highlight change of at least a portion of the display based on whether the current displacement falls within the target displacement range or whether the current force falls within the target force range. In some implementations, the visual indication comprises a color or highlight change of at least a portion of the display based on whether the current displacement falls outside the target displacement range or whether the current force falls outside the target force range.

In some implementations, the visual indication comprises at least one graphical target that shows at least one of the target displacement range and the target force range. In some implementations, the at least one graphical target is displayed on the at least one graph of force and displacement and shows a comparison between the at least one graphical target and the at least one graph of force and displacement. In some implementations, the at least one graphical target comprises target boundaries displayed on a force-displacement graph showing a comparison between the current displacement, the current force, and the target boundaries. In some implementations, the at least one graphical target comprises target displacement boundaries displayed on a displacement-time graph showing a comparison between the current displacement and the target displacement boundaries. In some implementations, the at least one graphical target comprises target force boundaries displayed on a force-time graph showing a comparison between the current force and the target force boundaries. In some implementations, the current displacement comprises a current downstroke displacement or a current upstroke displacement. In some implementations, the current force comprises a current compression force or a current decompression force.

In some implementations, the at least one processor is configured to determine a current estimate of neutral position of the chest based on the displacement signals and the force signals. In some implementations, the current downstroke displacement or the current upstroke displacement is based on the current estimate of neutral position.

In some implementations, the at least one processor is configured to determine whether the current downstroke displacement falls within a target downstroke displacement range and whether the current upstroke displacement falls within a target upstroke displacement range. In some implementations, the at least one feedback signal provides guidance for how to modify the ACD CPR treatment based on determining whether the current downstroke displacement falls within the target downstroke displacement range and whether the current upstroke displacement falls within the target upstroke displacement range. In some implementations, the guidance comprises a visual indication of whether the current downstroke displacement falls within the target downstroke displacement range and whether the current upstroke displacement falls within the target upstroke displacement range. In some implementations, the visual indication comprises a color or highlight change of at least a portion of the display based on whether the current downstroke displacement falls within the target downstroke displacement range or whether the current upstroke displacement falls within the target upstroke displacement range. In some implementations, the visual indication comprises a color or highlight change of at least a portion of the display based on whether the current downstroke displacement falls outside the target downstroke displacement range or whether the current upstroke displacement falls outside the target upstroke displacement range.

In some implementations, the at least one feedback signal provides guidance for how to modify the ACD CPR treatment so that a future downstroke displacement falls within the target downstroke displacement range. In some implementations, the at least one feedback signal provides guidance for how to modify the ACD CPR treatment so that a future upstroke displacement falls within the target upstroke displacement range. In some implementations, the at least one processor is configured to determine how the chest of the patient has remodeled based on an estimate of neutral position of the chest of the patient. In some implementations, the at least one feedback signal causes the display to provide an indication of patient chest remodeling.

In some implementations, the applicator device comprises a handle for the rescuer to push and pull on the chest of the patient to apply the ACD CPR treatment. In some implementations, the handle comprises the display. In some implementations, the handle is configured to provide haptic feedback to provide guidance for how to modify the ACD CPR treatment. In some implementations, the system includes a patient monitor including at least one sensor for obtaining physiological data from the patient. In some implementations, the patient monitor comprises the display. In some implementations, the system includes a speaker for providing audio feedback to provide guidance for how to modify the ACD CPR treatment. In some implementations, the at least one feedback signal provides an indication that instructs the rescuer to switch with another person in providing the ACD CPR treatment.

In an aspect, the system includes an applicator device configured to provide the ACD CPR treatment to a chest of the patient, a motion sensor configured to be coupled to the chest of the patient and to generate displacement signals related to the ACD CPR treatment, a force sensor configured to be coupled to the chest of the patient and to generate force signals related to the ACD CPR treatment; and a feedback device for providing information concerning the ACD CPR treatment, and at least one processor configured to: process both the displacement signals and the force signals related to the ACD CPR treatment, estimate a neutral position of the chest based on the displacement signals and the force signals, estimate an initial zero point of the chest prior to application of the ACD CPR treatment, determine a difference in magnitude between the estimated initial zero point of the chest and the estimated neutral position of the chest, and generate at least one feedback signal for a modification to the ACD CPR treatment to reduce the difference in magnitude between the estimated initial zero point of the chest and the estimated neutral position of the chest.

In some implementations, the applicator device is an automated chest compression device. In some implementations, the at least one feedback signal controls the automated chest compression device to modify the ACD CPR treatment. In some implementations, the modification to the ACD CPR treatment comprises the automated chest compression device increasing a magnitude of decompression force applied to the chest. In some implementations, the modification to the ACD CPR treatment comprises the automated chest compression device decreasing a magnitude of decompression force applied to the chest.

In some implementations, the at least one processor is configured to determine a current displacement based on the displacement signals and determine a current force based on the force signals. In some implementations, the current displacement comprises a current downstroke displacement or a current upstroke displacement. In some implementations, the current force comprises a current compression force or a current decompression force.

In some implementations, the at least one processor is configured to determine how the chest of the patient has remodeled based on the estimated neutral position. In some implementations, the at least one feedback signal causes the display to provide an indication of patient chest remodeling.

In some implementations, the system includes a patient monitor including at least one sensor for obtaining physiological data from the patient. In some implementations, the patient monitor comprises the display.

In some implementations, the modification to the ACD CPR treatment comprises the automated chest compression device increasing a magnitude of compression force applied to the chest. In some implementations, the modification to the ACD CPR treatment comprises the automated chest compression device decreasing a magnitude of compression force applied to the chest. In some implementations, the physiological data comprises end-tidal CO2 data, arterial pressure data, volumetric CO2, pulse oximetry data, or carotid blood flow data.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
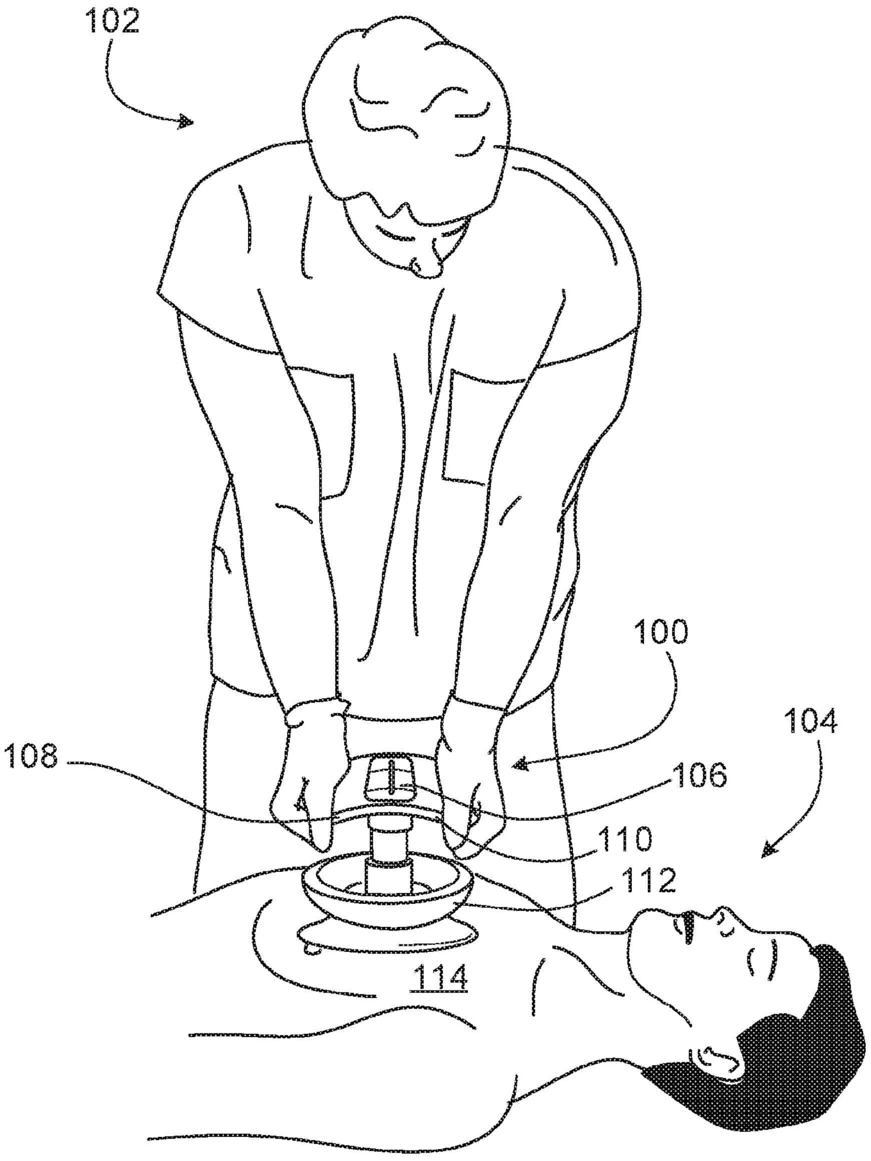
FIG. 1 is shows a device that assists a user with performing active compression-decompression (ACD) CPR on a patient.

In order to increase cardiopulmonary circulation induced by chest compression, a technique referred to as active compression-decompression (ACD) has been developed. According to ACD techniques, an applicator body is interposed between the rescuer's hands and the patient's sternum, the applicator body further being affixed via a suction cup or cups or self-adhesive pad. During the compression phase, the rescuer presses against the applicator pad to compress the patient's sternum, as with standard chest compressions. Unlike standard chest compressions where the chest passively returns to its neutral position during the release phase, with ACD, the rescuer actively pulls upward during release or decompression phase. This active pulling upward, or active decompression, increases the release velocity and results in increased negative intrathoracic pressure, as compared to standard chest compressions, and induces enhanced venous blood to flow into the heart and lungs from the peripheral venous vasculature of the patient. Devices and methods for performing ACD to the patient are described in U.S. Pat. Nos. 5,454,779 and 5,645,522, the contents of each being incorporated herein in entirety by reference.

During ACD chest compression, the patient's sternum is typically pulled upward beyond the neutral position of the sternum during the decompression phase, where "neutral" is defined as the steady-state position of the sternum when no force—either upward or downward—is applied by the rescuer. As will be described below with respect to FIG. 3, both the compression phase and decompression phase will both have a portion of their motion during which the sternum is pulled upward beyond the neutral position—what we term the "Elevated" phase. There are thus 4 phases: Compression: Elevated (CE); Compression: Non-elevated (CN); Decompression: Elevated (DE); Decompression: Non-elevated (DN). It is beneficial to be able to provide real-time feedback to the rescuer on these different phases of the Active Compression Decompression cycle.

During the time-course of a resuscitation, the patient's chest wall will "remodel" as a result of the repetitive forces applied to the chest wall—sometimes exceeding 100 lbs. of force needed to sufficiently displace the sternum for adequate blood flow—and the resultant repetitive motion. Chest compliance will typically increase significantly as the sternum/cartilage/rib biomechanical system is substantially flexed and stressed. Thus the amount of force needed to displace the sternum to the proper compression and decompression depths will also change significantly. During the course of chest wall remodeling, the anterior-posterior diameter—the distance between the sternum and the spine—will also very frequently alter substantially, meaning the neutral position will change over the course of the resuscitation. An accurate measure of the neutral position is needed at all times during the course of the resuscitation; thus, taking an initial position measurement at the beginning of the resuscitation and assuming a constant neutral position over the course of the resuscitation will not be sufficient to generate accurate estimations of the motion parameters of the CE, CN, DE and DN phases of the compression cycle. For instance, it is of particular value to be able to measure the motion parameters and forces delivered during the DE phase and CN phases independently from each other and to the exclusion of the CE and DN phases.

Some ACD systems use a force sensor interposed between the rescuer's hands and the patient's sternum, where compressions are being delivered, to monitor the relaxation phase of the chest compression. However, the sternal force for a chest compression may not completely correlate well to blood flow, nor completely correlate with sternal motion or chest wall dynamics. Each patient requires a unique amount of force to achieve the same compression of the sternum and the cardiopulmonary system due to the widely varying compliances of individual patients' chests. Further, a force sensor is generally not able to measure motion of the sternum—a key parameter for understanding the quality of the chest compression delivered and the amount of venous return.

Other chest compression monitoring systems that utilize motion-sensing systems such as accelerometers; for instance, the ZOLL Medical RealCPRHelp (Chelmsford MA), are able to measure motion parameters such as velocity and displacement. However, because of the way that ACD compressions are delivered, existing systems are limited in their ability to distinguish between the motions of the Elevated and Non-elevated phases.

FIG. 1 shows a device 100 that assists a user 102 with performing active compression-decompression (ACD) CPR on a patient 104 who is being rescued from a cardiac event. The device 100 includes a user interface 106 that provides feedback to the user 102 (sometimes referred to as a rescuer) about the effectiveness of the CPR that the user 102 is administering. The feedback is determined based on part on information about chest compliance of the patient 104 (sometimes referred to as a victim) as measured by the device 100 (sometimes referred to as an ACD device).

Chest compliance is a measure of the ability of the chest to absorb an applied force and change shape in response to the force. In the context of CPR, information about chest compliance can be used to determine how force can be applied to the chest of a patient in a way that will be effective at resuscitating the patient. Ideally, the force applied to the patient will be sufficient to create a vacuum within the heart that causes blood to flow. However, if the force is not sufficient to create this vacuum, CPR will not be effective and the patient will die or otherwise deteriorate. Further, if the force is not applied correctly or is too great, then the patient may be injured. Feedback provided to the user 102 can be enhanced by determining a neutral position of chest compression and using information about the administration of the CPR treatment to give the user 102 guidance that will improve the chances of success of the CPR treatment.

The neutral position location or other phase transition points may be determined by methods described herein. The neutral position may also be considered the position at which zero force or pressure is exerted by the rescuer during ACD compressions.

Because of so-called chest remodeling that occurs during chest compressions, this zero-force neutral position may change over the course of resuscitation efforts, as the anterior/posterior diameter of the patient will decrease after multiple compression cycles. Alternatively, the neutral position location may be simply the initial position of the sternum prior to initiation of chest compressions.

In some implementations, the device 100 determines (e.g., calculates) a chest compliance relationship that is then used to determine what feedback to provide the user. For example, the device 100 may calculate a mathematical relationship between two variables, such as displacement and force, related to chest compliance. The device 100 can then identify one or more features of this relationship that can be used to determine information about the CPR treatment. Once the information about the CPR treatment is determined, the device 100 can determine what feedback to provide to the user, e.g., feedback about the progress of the CPR treatment, feedback related to chest compression depth when in the non-elevated portion of the chest compression cycle or feedback related to the force when in the elevated portion of the chest compression cycle.

In some examples, the information about the CPR treatment can include information about the patient such as a neutral position of chest compression. In some implementations, the chest compliance relationship can be thought of or represented as a curve, e.g., a curve of a graph representing the relationship. In some implementations, the chest compliance relationship can be stored as data such as a table of measured values (e.g., values for displacement and force at multiple time indices).

As shown in FIG. 1, the device 100 has handles 108, 110 that the user 102 grips to apply force. The device 100 also has a suction cup 112 that tends to keep the device 100 in contact with the chest 114 of the patient 104. When the user applies upward force using the device 100, the chest 114 of the patient will be pulled upward in response due to the suction of the suction cup 112. This upward force creates a negative pressure within the thorax of the patient during the release phase of a CPR treatment. A device that creates a negative pressure in this way is sometimes referred to as an impedance threshold device (ITD).

In some examples, the feedback given to the user 102, e.g., on the user interface 106, guides the user in the way that the user 102 is compressing the chest using the device 100. For example, the user interface 106 can include a visual indication of the effectiveness of the upward and downward portions of the compression cycle. Parameters for which feedback can be provided include compression depth and compression release velocity. In this way, the user 102 can adjust the various elements of their compression activity in response to the feedback.

As a real-world example, the user interface 106 may display a graph that shows whether the upward or downward forces are too strong, or not strong enough, and then the user 102 can adjust accordingly. For example, if the device 100 determines that the depth of the compression phase is not sufficient for an effective CPR treatment, the device 100 can display feedback indicating that the depth of the downward motion is not meeting a threshold of effectiveness. In some implementations, the device 100 can determine whether the upward or downward forces are too strong or not strong enough based on an estimate of the neutral position of chest compression of the patient 104. The neutral position of chest compression of the patient 104 serves as an inflection point that can be used to differentiate the movement of the chest on upward strokes from movement of the chest on downward strokes and generate specific measurements for the CE, CN, DN and DE phases of the compression cycle.

Because the user 102 manually delivers a compression, the ACD device 100 shown here is an example of a manual ACD device. Other types of mechanical ACD devices can be used with the techniques described below, e.g., the techniques for determining a neutral position of chest compression. Although the ACD device 100 shown here includes a handle and a suction cup, other types of ACD devices used with the techniques described below need not include these elements. For example, other types of ACD devices may include a first element configured to be affixed to a surface of a patient's body and a second element configured to be coupled to a hand of a rescuer. In these examples, the first element allows for pulling upward on the patient's body surface while maintaining contact with the patient's body surface. Further, in these examples, the second element enables the rescuer to push on the chest and pull up the chest.

A suction cup and handle are examples of the first element and the second element, respectively, but are not the only types of these elements that can be used. For example, the first element could include one or more assemblies of multiple suction cups, or the first element could be a surface partially or fully covered by an adhesive (e.g., adhesive gel) that affixes to a patient's chest, or the first element could be a combination of any of these things. Examples of assemblies of multiple suction cups are described in U.S. Pat. No. 8,920,348, titled "Method and Device for Performing Alternating Chest Compression and Decompression," incorporated by reference in its entirety. The second element could include one or more straps or brackets that hold the rescuer's hand tightly against the ACD device, instead of or in addition to the handle described above.

Figure 2:
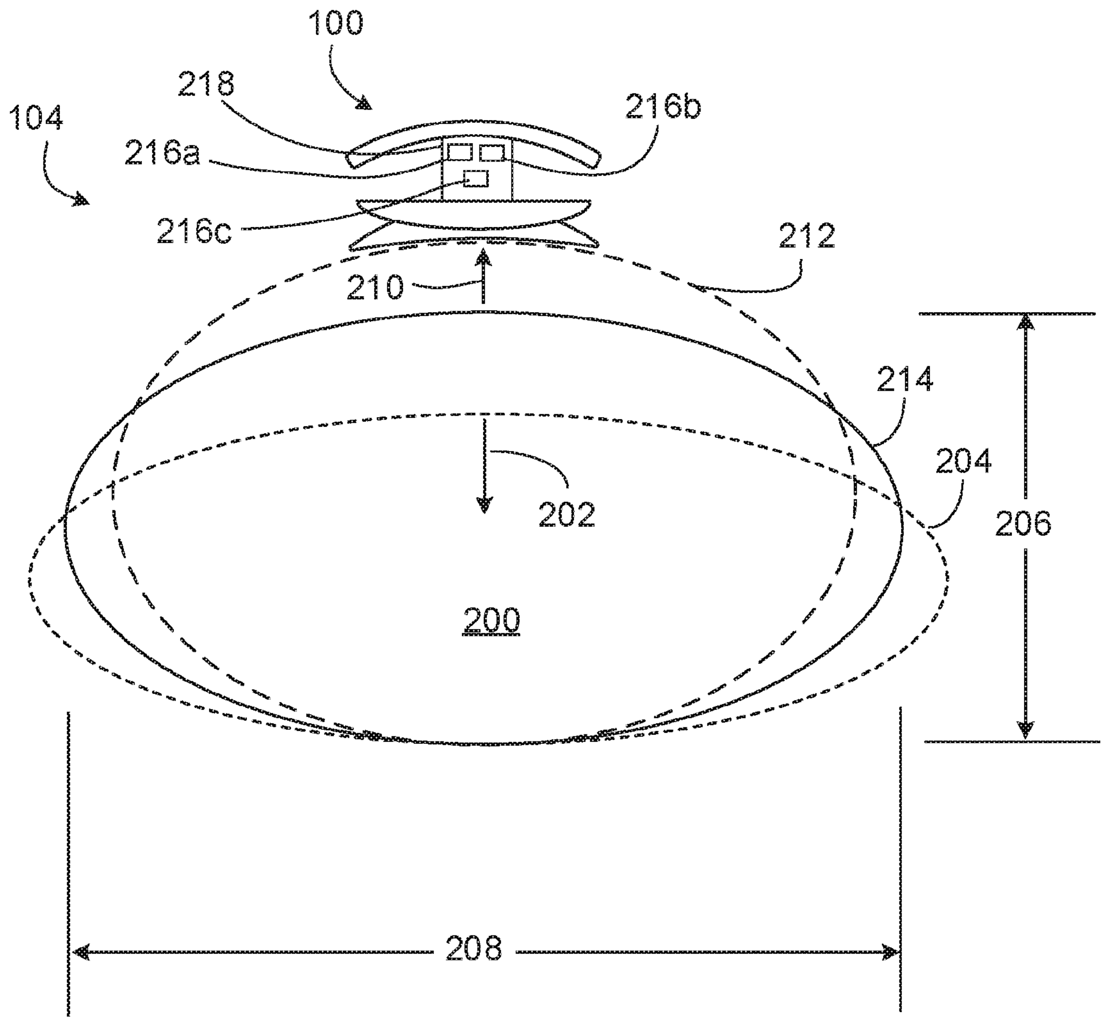
FIG. 2 represents the change in shape of the chest of a patient.

FIG. 2 represents the change in shape of the chest 200 of a patient 104 as the ACD device 100 is used to perform ACD CPR. Because the chest 200 of a human being is not rigid, the chest will change shape in response to forces applied. When the sternum is compressed downward 202 in the CN phase, the chest 200 tends to exhibit a shape 204 that is compressed in the anterior-posterior (AP) dimension 206 and extended in the lateral dimension 208. This shape 204 is sometimes referred to as a compression shape. During the DE phase 210, the chest 200 tends to exhibit a shape 212 that is extended in the AP dimension 206 and narrower in the lateral dimension 208. This shape 212 is sometimes referred to as a decompression shape. The chest 200 exhibits a shape 214 corresponding to a neutral position of chest compression, when no force is applied either upwards or downwards. In other words, the shape 214 corresponds to the natural position of the chest when its shape is not substantially affected by a force applied, e.g., during CPR chest compressions.

Figure 3:
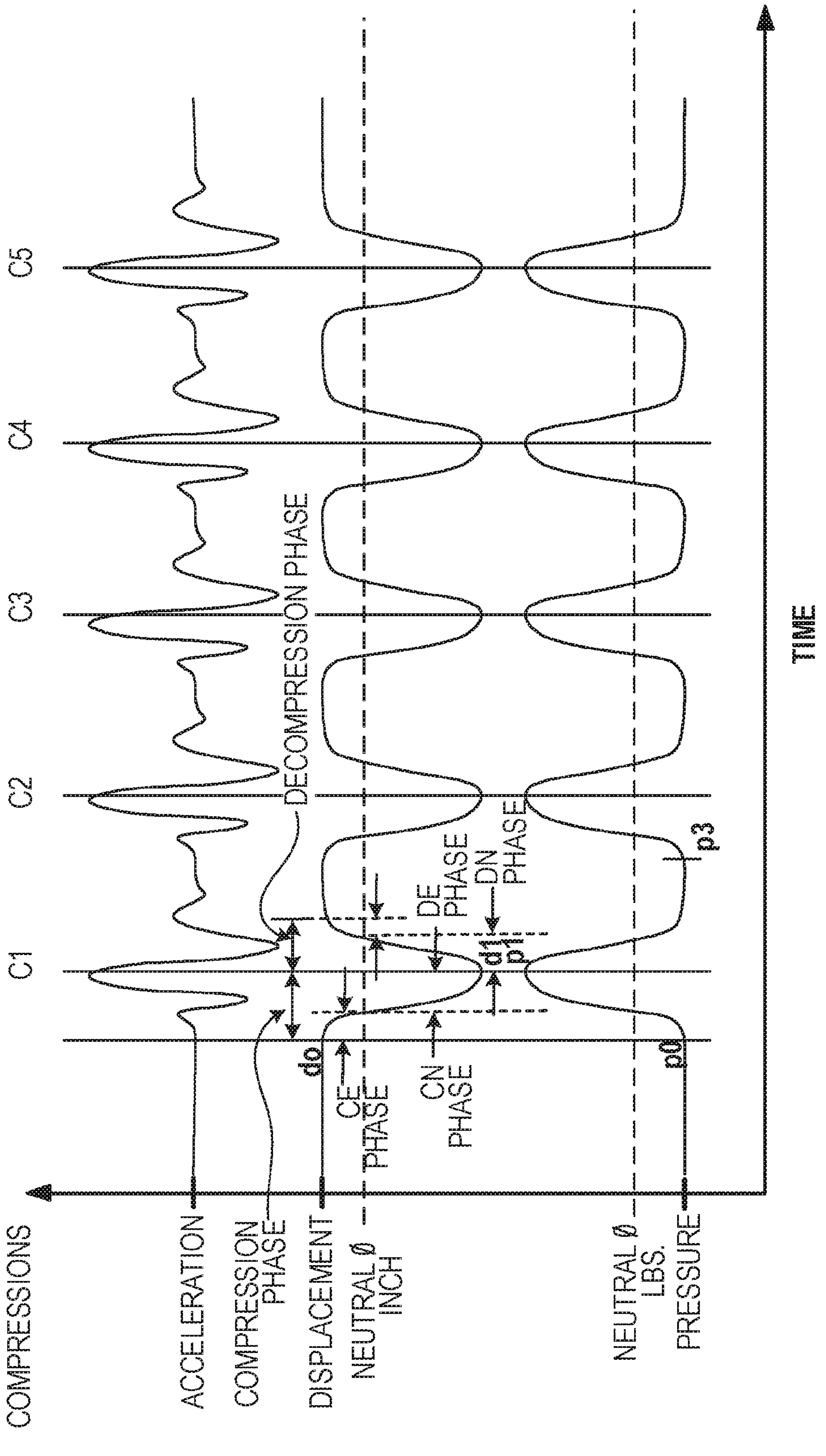
FIG. 3 represents signals recorded during CPR
Figure 5:
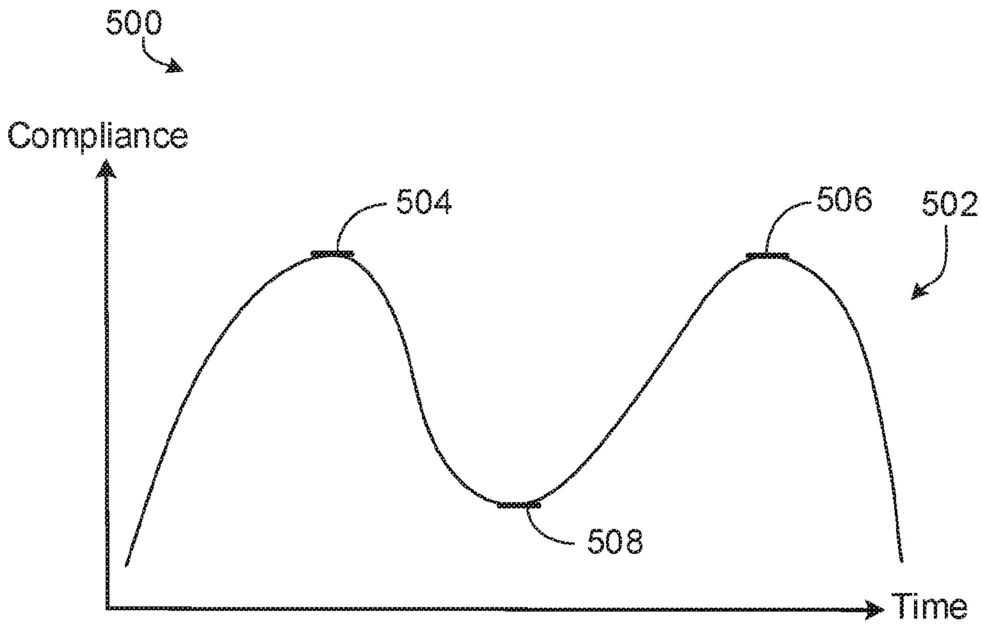
FIG. 5 shows an example graph including a chest compliance curve.

Chest compliance is the mathematical description of this tendency to change shape as a result of an applied force. It is the inverse of stiffness. It is the incremental change in depth divided by the incremental change in force at a particular instant in time. In the case of a chest compression cycle, the compliance may be plotted with time on the abscissa as shown in FIG. 3, or alternatively, the compliance may be plotted as a loop with depth as the independent variable and the time variable implied in the loop trajectory, as shown in FIGS. 5 and 6. If a patient's chest exhibits relatively little change in shape in response to a particular change of force, the patient has relatively low chest compliance. In contrast, if the patient's chest exhibits relatively high change in shape in response to a particular change of force, the patient has relatively high chest compliance. In addition, chest compliance varies as the chest is compressed as a result of the structural changes of the thoracic cavity due to positional/conformational changes as the chest is compressed downwards and pulled upwards. This is described below with respect to FIGS. 5 and 7. For example, as the chest is compressed downward, the compliance of the chest decreases as the chest approaches the limits of its flexibility, e.g. region 508 or the flat region on the right side of the curve of FIG. 7.

For each point in time, n, for which a displacement measurement is taken by the system, a force measurement is also taken, resulting in a displacement/force vector-pair for each sample time n, $[d_n, f_n]$. In general, compliance, c, equals the change in displacement divided by the change in pressure, compared to a reference time point: $c=\Delta d/\Delta p$.

"Instantaneous Compliance" (IC) may comprise a reference time point, $t_0$, which is adjacent or nearly adjacent to the time point, $t_n$, and is thus more a measure of the slope of the displacement-force curve, at a particular point in time. For instance, the reference time point, $t_0$, may be the sample time point immediately preceding time, $t_n$. The reference time point may be composed on multiple sample points immediately preceding time, $t_n$, for instance using a moving average, weighted moving average or low pass filter, known to those skilled in the art. There may be a small gap in time between the reference time point and time, $t_n$, for instance 1 second or less. In some versions, the reference time point may be chosen to be the beginning of a segment, for instance the beginning of the compression for Slope 1 (the first segment in the compression, and thus the segment start is also the compression start) in FIG. 6B or the dotted line for reference time to for Slope 2 in the same figure. For example, in some implementations, the Instantaneous Compliance $InC_n$ is calculated as shown:

$$InC_n=|(d_n-d_r)/(p_n-p_r)|$$

where $InC_n$ is the estimate of the slope of the distance/pressure curve at a point in time, $t_n$; do is the displacement at time, $t_n$; $p_p$ is the pressure at time $t_n$; and $d_r$ and $p_r$ are the distance and pressure at the reference time, $t_r$, respectively.

"Absolute Compliance" (AC), on the other hand, may comprise a reference point, to, which uses an absolute reference such as the pressure and displacement at the very start of a group of chest compressions. During CPR, there may be what are termed "rounds" of chest compressions which are periods of approximately 1-3 minutes where chest compressions are delivered, and then at the end of the time period, compressions are halted and various other therapeutic actions may be performed, such as analyzing the patients ECG, delivering a defibrillation shock or delivering a drug such as epinephrine or amiodarone. Thus for determination of AC, reference point, $t_0$, prior to the beginning of any of the rounds of chest compressions, including prior to the first round of compression, i.e. at the beginning of CPR. In most instances, the pressure will be zero at this point in time, and the displacement will be effectively calibrated to zero by the displacement estimation software. The Absolute Compliance of the chest can be estimated from the compression displacement and the related compression pressure. The reference pressure "$p_0$" is the pressure at time, $t_0$, and chest displacement "$d_0$" is the displacement at time, $t_0$. The pressure "$p_n$" is the pressure required to achieve the displacement "$d_n$". The chest compliance is estimated from the following equation:

$$\text{Absolute Compliance}=|(d_p-d_0)/(p_p-p_0)|$$

Where $d_p$ is the displacement at the peak of the compression and $p_p$ is the pressure at the peak of the compression.

The compliance and compression depth of the chest 200 can be measured by sensors 216*a-c* in the device 100. For example, a force sensor 216*a* and a motion sensor such as an accelerometer 216*b* can be used. In some implementations, the force sensor 216*a* and the accelerometer 216*b* are placed in a housing 218 of the device 100. The accelerometer senses the motion of the chest during CPR and the force sensor measures the force or pressure applied. The accelerometer signal is integrated (e.g., doubly integrated) to determine the displacement of the housing 218, and the output of the force sensor is converted to standard pressure or force units.

In some implementations the accelerometer is in a separate housing, for example a housing placed on the sternum of the patient, and the force sensor is in a housing, e.g. housing 218 of the device 100. In such an implementation the housing containing the accelerometer and the device with the force sensor may be configured to be attached or connected during CPR.

In some implementations, multiple accelerometers 216*b*, 216*c* can be used. For example, the second accelerometer 216*c* can be placed on the patient's sternum in the inner perimeter or near the suction cup 112. The second accelerometer may be contained in a separate assembly of self-adhesive foam such as the ZOLL CPR Stat-Padz (Chelmsford, MA). In this way, the first accelerometer 216*b* tends to measure acceleration experienced by the rescuer's hands 102 (FIG. 1), and the second accelerometer 216*c* tends to measure acceleration of the patient's sternum 104. Put another way, the first accelerometer 216*a* may be configured to measure movement arising from an applied upward force, e.g., because the first accelerometer 216*a* is proximate or otherwise mechanically coupled to the suction cup 112, it provides a suitable indication of force applied as the suction cup 112 pulls up on the patient's sternum. Further, the second accelerometer 216*b* may measure movement arising from an applied downward force, e.g., because the second accelerometer 216*b* is proximate or otherwise mechanically coupled to the handle of the device 100, the second accelerometer 216*b* provides a suitable indication of downward force applied by the rescuer's hand. In this fashion, the system can detect if the is insufficient adherence between the ACD device and the patient's sternum and alert the rescuer to re-apply the ACD device to the patient's chest.

FIG. 3 represents signals recorded during CPR, e.g., using the sensors 216*a-c* shown in FIG. 2. Though Absolute Compliance may be used to determine the neutral position, IC will provide a more accurate measure of the neutral position.

Compressions (C1-C5) can be detected from the displacement signal. The compression rate is calculated from the interval between compressions (e.g. (time of C2−time of C1)), and compression depth is measured from the compression onset to peak displacement (e.g. (d1−d0)). The onset and peak compression values are saved for each compression. The pressures at the compression onset and offset are used to determine the force used to achieve a given compression depth.

Chest compliance is further described in U.S. Pat. No. 7,220,235, titled "Method and Apparatus for Enhancement of Chest Compressions During CPR," issued May 22, 2007, and is hereby incorporated by reference in its entirety. Compression velocity and displacement can be estimated via such methods as described in U.S. Pat. Nos. 8,862,228. 6,827,695, and 6,390,996, each hereby incorporated by reference in its entirety.

Figure 4:
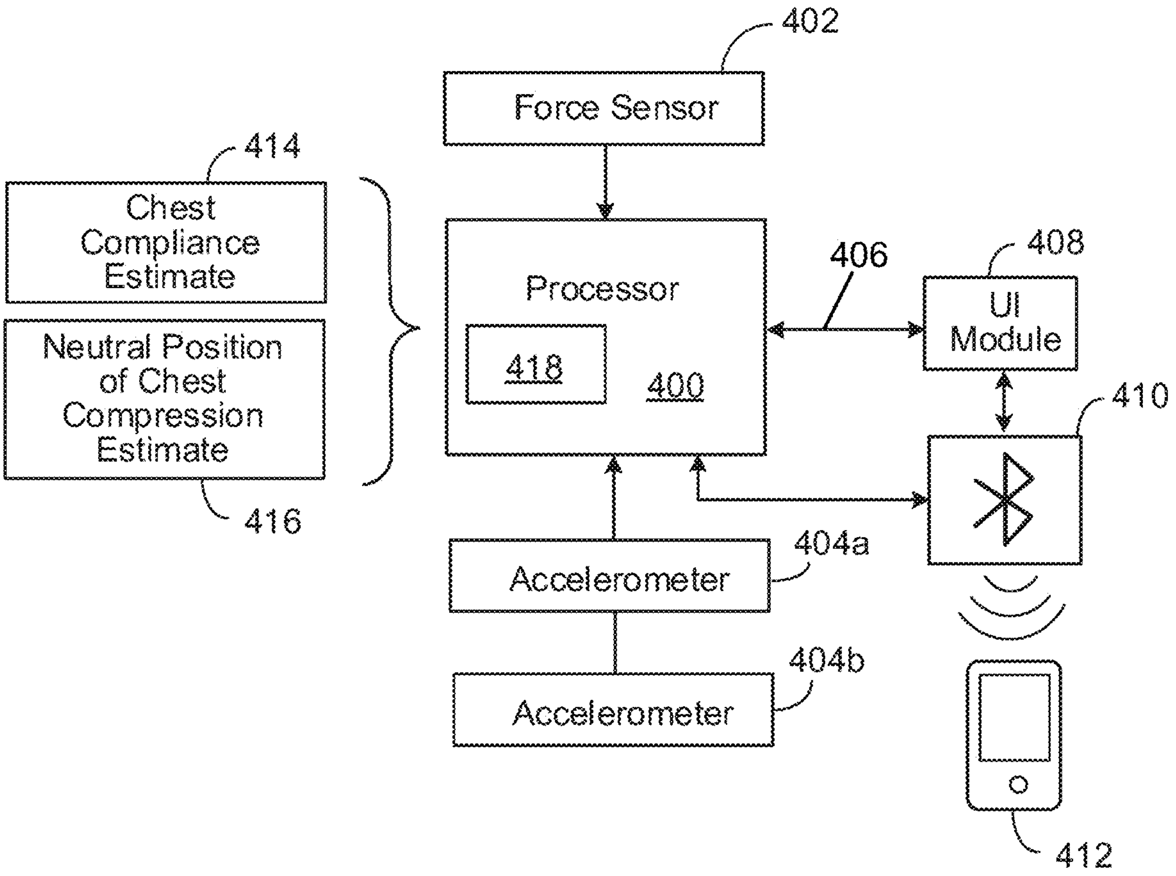
FIG. 4 is a block diagram of components of the ACD device shown in FIG. 1.

FIG. 4 is a block diagram of components of the ACD device 100 shown in FIG. 1. The device includes a processor 400, e.g., an electronic component such as a microprocessor that carries out instructions, e.g., processes input data to generate output data, and communicates data to and from other components of the device 100. For example, the processor 400 receives signals from sensors such as the force sensor 402 and motion sensors such as accelerometers 404*a*, 404*b* (or, in some implementations, a single accelerometer). Other types of motion sensors may include magnetic induction based systems such as described in U.S. Pat. No. 7,220,235, mentioned above.

The processor 400 also communicates output information 406 to a user interface module 408. The output information 406 is indicative of the effectiveness of a CPR treatment and is determined by the processor 400 in part based on signals received from the sensors, e.g., force sensor 402 and accelerometers 404*a*, 404*b*.

The user interface module 408 can take one of several forms. In some implementations, the user interface module 408 is a combination of software and hardware and includes a display that presents information to a user of the device 100. For example, the information presented can include textual information and graphical information such as graphs and charts. The user interface module can also include other components such as input devices, e.g., buttons, keys, etc. In some implementations, the user interface module includes audio input/output elements, e.g., a microphone, speaker, and audio processing software.

In some implementations, the user interface module 408 causes a user interface to appear on an external device 412, e.g., a device that is capable of operating independent of the ACD device 100. For example, the external device could be a smartphone, tablet computer, or another mobile device. The external device could also be a defibrillator such as the ZOLL Medical Corp X-Series defibrillator (Chelmsford MA) with an accelerometer built into the defibrillation pads (CPR Stat-Padz), or other self-adhesive assembly containing a motion sensor that is adhered to the patient's sternum and measures primarily the motion of the patient's sternum. This assembly may or may not be integrated with the defibrillation electrodes. The defibrillator may receive the acceleration or motion data from the ACD device and compare the motion of the ACD sensor and compare it to the accelerometer or motion information from the accelerometer from the defibrillation pad or other adhered sternal motion-sensing assembly. If the two motions are found to differ by more than 0.25 in., for example, particularly during the decompression phase of the compression cycle, the rescuer may be prompted to reapply the ACD device.

In some implementations, the external device 412 communicates with the ACD device 100 using a wireless communication technique such as Bluetooth. In this example, the ACD device 100 has a wireless communication module 410. For example, the user interface module 408 may communicate signals to and from the external device 412 using the wireless communication module 410. Although Bluetooth is used as an example here, other wireless communications techniques could be used, such as WiFi, Zigbee, 802.11, etc.

In some implementations, the processor 400 can perform calculations to determine an estimate of chest compliance 414, e.g., using the equations described above with respect to FIG. 2.

In some implementations, the processor 400 can perform calculations to determine if a patient's chest was substantially released between two compressions (i.e., released sufficiently to create a pressure in the chest that facilitates venous filling of the heart). The user interface module 408 can cause a user interface 106 (FIG. 1) of the device 100 to display messages that give guidance or other feedback to the user 102 (FIG. 1), e.g., to more completely release the chest between compressions and/or to push harder on the chest during compression.

The processor 400 can further calculate an estimated neutral position of chest compression 416, e.g., based on data such as the estimated depth of chest compression and the estimate of chest compliance 414. The calculation can be based in part on a feature of a compliance relationship as described below in further detail with respect to FIGS. 5 and 6.

The output information 406 can include information determined based on the estimate of chest compliance 414 and the neutral position of chest compression 416. For example, the output information 406 could include information such as a compression non-elevated (CN) depth or decompression elevated (DE) height. The output information 406 can also include feedback to the user about adjusting the user's actions in a way that would increase the effectiveness of a CPR treatment. Examples are described below with respect to FIG. 8.

In some implementations, the processor 400 compares signals received by the first accelerometer 404*a* and the second accelerometer 404*b*. As described above with respect to FIG. 2, the first accelerometer 404*a* can be placed in or near a housing of the ACD device 100, and the second accelerometer 404*b* can be placed in or near a suction cup 112 of the ACD device 100. In this way, the first accelerometer 216*b* tends to measure acceleration experienced by the user 102 (FIG. 1), and the second accelerometer tends to measure acceleration experienced by the patient 104. In some implementations, multiple accelerometers 216*b*, 216*c* can be used. For example, the second accelerometer 216*c* can be placed on the patient's sternum in the inner perimeter or near the suction cup 112. The second accelerometer may be contained in a separate assembly of self-adhesive foam such as the ZOLL CPR Stat-Padz (Chelmsford, MA). In this way, the first accelerometer 216*b* tends to measure acceleration experienced by the rescuer's hands 102 (FIG. 1), and the second accelerometer 216*c* tends to measure acceleration of the patient's sternum 104. In this fashion, the system can detect if there is insufficient adherence between the ACD device and the patient's sternum and alert the rescuer to re-apply the ACD device to the patient's chest.

In some implementations, the processor 400 includes or has access to a memory 418 that can store data. The memory 418 can take any of several forms and may be integrated with the processor 400 (e.g., may be part of the same integrated circuit) or may be a separate component in communication with the processor 400 or may be a combination of both. In some implementations, the memory 418 stores data such as values for the estimate of chest compliance 414 and the neutral position of chest compression 416 as they are calculated by the processor 400. In some implementations, the processor 400 uses the memory 418 to store data for later retrieval, e.g., stores data during an administration of CPR for retrieval later during the same administration of CPR or for retrieval later during a different administration of CPR FIG. 5 shows an example graph 500 including a chest compliance curve 502. In some implementations, the compliance curve 502 is a representation of data calculated by the processor 400 (FIG. 4) based on input received from sensors, e.g., a force sensor and/or accelerometer(s). The graph 500 shown in FIG. 5 includes an x-axis representing time (e.g., in seconds) and a y-axis representing chest compliance. The curve 502 exhibits a sinusoidal shape. This kind of compliance curve 502 is sometimes called a non-hysteresis compliance curve.

In practical terms, when a rescuer is performing CPR on a victim using an ACD device (e.g., the device 100 shown in FIG. 1), the rescuer causes downward and upward forces to be exerted on the chest of the victim. The victim's chest compliance will be lowest as the forces cause the shape of the chest to approach its natural limits. In other words, the victim's chest compliance approaches a lower limit as it is pulled up or pulled down. In some scenarios, when the chest compliance approaches this lower limit it is an indication that the tensile strength of the ribs have been reached, and that if additional force is exerted, one or more ribs have an elevated risk of fracturing. In some versions of the system, a warning may be provided in the form of audio, visual or tactile/haptic prompts indicating that the compliance has been reduced below some threshold level.

Figure 6A:
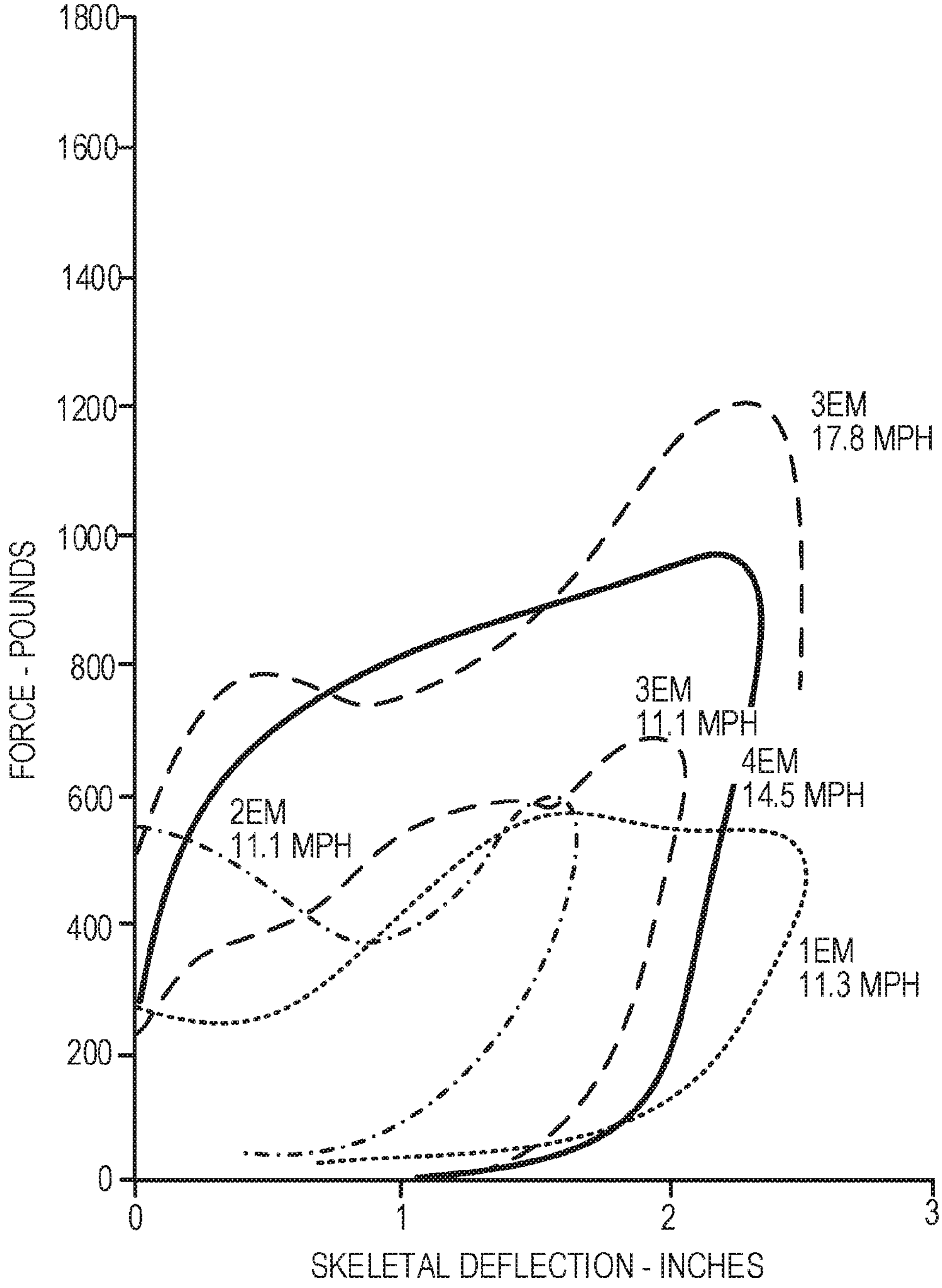
FIGS. 6A and 6B show graphs of stiffness curves.
Figure 6B:
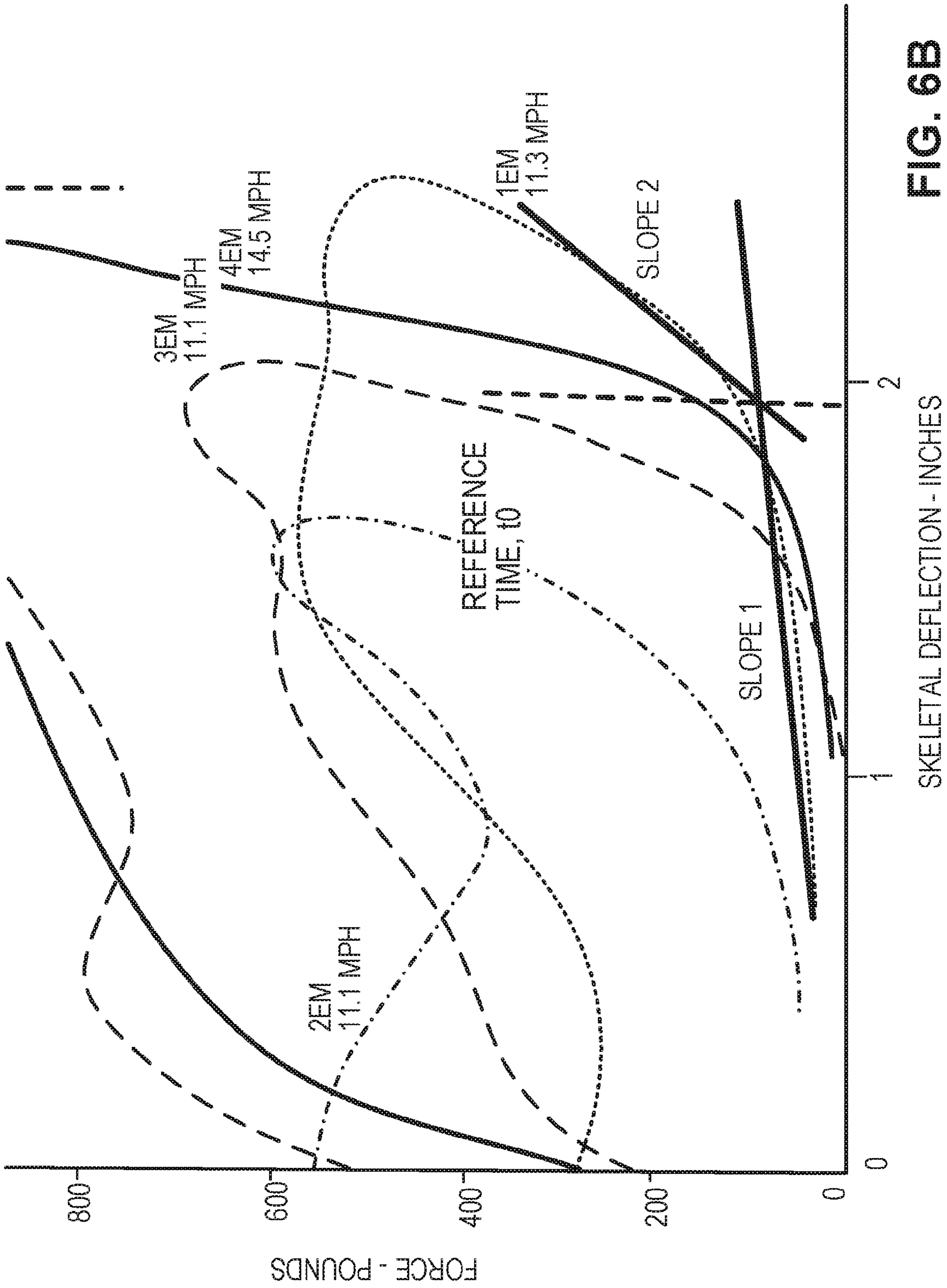

FIG. 6A shows representative stiffness curves for sternal impact, and FIG. 6B shows stiffness regions of the curves. Referring to these figures, the slopes of the representative curves are the stiffness (e.g., the inverse of compliance). Each of the loops is the curve for a different subject. Slope 1 in FIG. 6B is the stiffness for the CN phase of the compression; it is a lower slope value and less stiff (and thus higher compliance). Though the slopes for the CN phase of compression for each subject varies as seen in the multiple loops in the figure, in most if not all cases, there will be a change in slope to a second, steeper slope (lower compliance, and more stiff) at some inflection point during the compression, represented by the shift to Slope 2.

At the inflection point represented by the intersection of the two lines, Slope 1 and Slope 2 in the figure, the risk of fracturing is still relatively low. Once the inflection point has been detected, the system can prompt the rescuer to maintain that compression depth, as it is still in the safe range. This patient-specific compression depth will likely be different that AHA/ILCOR Guidelines (e.g. more than 2 inches). For instance, initially at the start of the resuscitation efforts, the patient's chest may be much stiffer, particularly for elderly patients, where their sternal cartilage attaching the sternum to the ribs has calcified and stiffened. If the rescuer were to try and deliver compressions at a depth recommended by the AHA/ILCOR Guidelines, they would likely cause rib fractures in the patient. In fact, in the Guidelines statement themselves, it is acknowledged that rib fractures are a common occurrence using existing chest compression methods. "Rib fractures and other injuries are common but acceptable consequences of CPR given the alternative of death from cardiac arrest." (From the 2005 International Consensus Conference on Cardiopulmonary Resuscitation and Emergency Cardiovascular Care Science with Treatment Recommendations, hosted by the American Heart Association in Dallas, Texas, Jan. 23-30, 2005.) Aside from the discomfort of the nosocomial rib fractures, an unfortunate side effect of the rib fractures is that they result in reduced resilience of the chest wall and thus a reduction in the natural recoil of the chest during the decompression phase resulting in a reduced venous return and degraded chest compression efficacy. It is desirable to minimize or eliminate rib fractures for these reasons. By detecting changes in the chest wall compliance, and prompting the rescuer as a result of those detections, chest compression depth will not exceed the injury threshold of ribs and sternum.

Because the neutral position as well as the overall compliance of the chest varies over the course of the resuscitation effort, the depth to which the rescuer is being guided by the real-time prompting of the system will also vary using this approach. A phenomena known as chest-wall remodeling occurs during the initial minutes subsequent to the initiation of chest compressions. AP diameter may decrease by as much as 0.5-1 inch, and compliance of the chest wall will increase as the sternal cartilage is gradually softened. By staying within the safety limits in a customized fashion for each individual patient for each compression cycle as the chest gradually softens, injuries are reduced, but more importantly, the natural resilience of the chest wall is maintained and more efficacious chest compressions are delivered to the patient.

Generally speaking, methods for detecting the change in slope can include determining initial statistical characteristics of the slope of the CE phase, and then analyzing the slope for any significant, sustained increase in slope. For instance, techniques can be used such as change point analysis such as that described by Basseville (Basseville M, Nikiforov IV. Detection of Abrupt Changes: Theory and Application. Engelwood, N.J.: Prentice-Hall 1993) or Pettitt (Pettitt AN) A simple cumulative sum type statistic for the change point problem with zero-one observations. (Biometrika 1980; 67:79-84.) Other methods such as Shewhart control charts may be employed for first detecting changes in the slope and then assessing whether the change detected is both an increase and of a sufficient magnitude to generate a prompt to the rescuer indicating that the depth of compression is too deep, and in some way to compress less deeply for future compressions. In simpler versions, prompting may be initiated when the compliance decreases below some percentage threshold below the initial compliance values at the start of a particular compression, e.g. 15% reduction in compliance. The initial compliance value may be averaged over more than one compression phase; it may be used as a comparative value for multiple compression cycles.

In some embodiments, separate tests may be performed on compliance to determine risk of injury during both the DE phase and the CN phase (i.e. at the top of the decompression portion [DN and DE phases] of the compression cycle and the bottom of the compression portion [CE and CN phases] of the compression cycle.)

In contrast, when the victim's chest is at a neutral position of chest compression (generally corresponding to the natural resting position of the chest), chest compliance tends to be at its highest point. Thus, in the curve 502 shown in FIG. 5, the points 504, 506 corresponding to the highest chest compliance (e.g., the peaks of the sinusoid) tend to correspond to the neutral position of chest compression. In contrast, the points 508 correspond to the lowest chest compliance (e.g., the troughs of the sinusoid) tend to correspond to the limits of the chest's compression shape or decompression shape.

In some implementations, the processor 400 (FIG. 4) can use a feature of the non-hysteresis compliance curve 502 to calculate an estimate of the neutral position of chest compression 416 (FIG. 4). For example, the processor 400 can use peaks 504, 506 of the curve 502 to calculate an estimate of the neutral position of chest compression.

Figure 7:
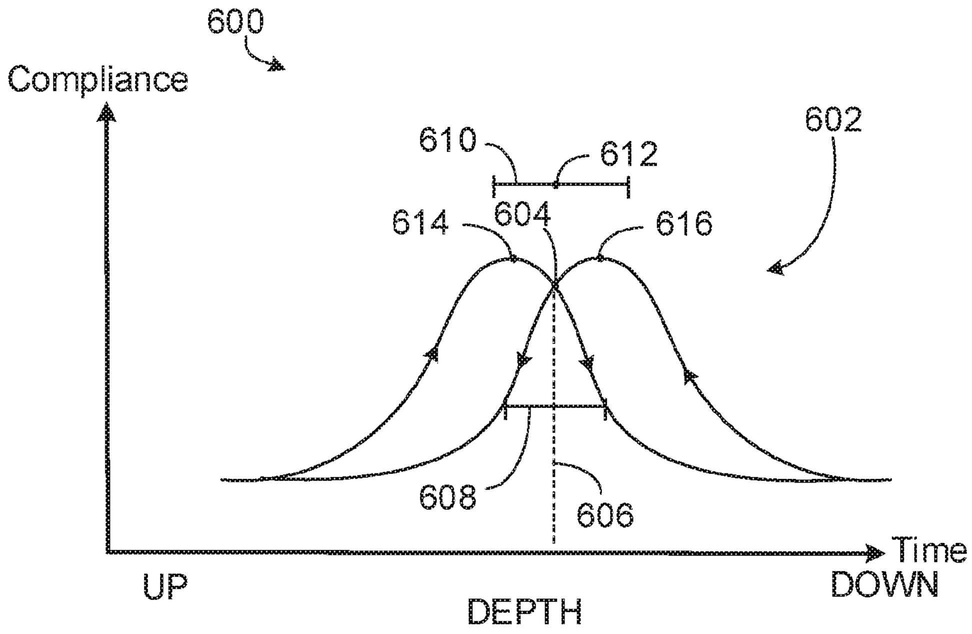
FIG. 7 shows an example graph including a chest compliance curve that forms a hysteresis loop.

FIG. 7 shows an example graph 600 including a chest compliance curve 602 that forms a hysteresis loop. This kind of compliance curve 602 is sometimes called a hysteretic compliance curve. In some implementations, the compliance curve 602 is a representation of data calculated by the processor 400 (FIG. 4) based on input received from sensors, e.g., a force sensor and/or motion sensor(s), e.g. accelerometer(s). The graph 600 shown in FIG. 7 includes an x-axis representing depth (e.g., in centimeters) and a y-axis representing chest compliance. The arrows on the curve show the progress of time during the course of one compression cycle, and represent the motion of the ACD device 100 (FIG. 1), for instance, the portion of the curve with the arrows pointing to the right show the instantaneous compliance (IC) for the compression portion (CE and CN) of the compression cycle, and the portion of the curve with leftward-facing arrows show the instantaneous compliance (IC) for the decompression portion (DE and DN) of the compression cycle. For example, when the ACD device 100 moves from a high depth to a low depth, chest compliance increases (as the chest approaches a neutral position of compression) and then decreases (as the chest becomes more compressed). Then, when the ACD device 100 moves from its lowest depth back to a high depth, chest compliance again increases (as the chest approaches a neutral position of compression) and again decreases (as the chest becomes more decompressed).

In some implementations, the processor 400 (FIG. 4) can use a feature of the hysteresis compliance curve 602 to calculate an estimate of the neutral position of chest compression 416 (FIG. 4). One of several features could be used.

For example, the point 604 of intersection of the hysteresis compliance curve 602 can be used to estimate the neutral position of chest compression 416. This point 604 represents a depth (e.g., as a coordinate of the x-axis) that may correspond to the neutral position of chest compression.

As another example, a point 612 approximately halfway between two peaks 614, 616 of the hysteresis compliance curve 602 can be used to estimate the neutral position of chest compression 416. The point 612 can be determined, for example, by measuring the distance 610 between the peaks 614, 616 and determining the point corresponding to the center of the distance 610. Alternative, the neutral position may be a point corresponding to a predefined percentage of the distance 610.

As another example, a point 606 approximately halfway between other features of the hysteresis compliance curve 602 can be used to estimate the neutral position of chest compression 416. For example, the processor could identify a distance 608 between two points of the hysteresis compliance curve 602 having the same value for compliance and then the point 606 can be calculated by determining the point corresponding to the center of the distance 608.

Figure 8:
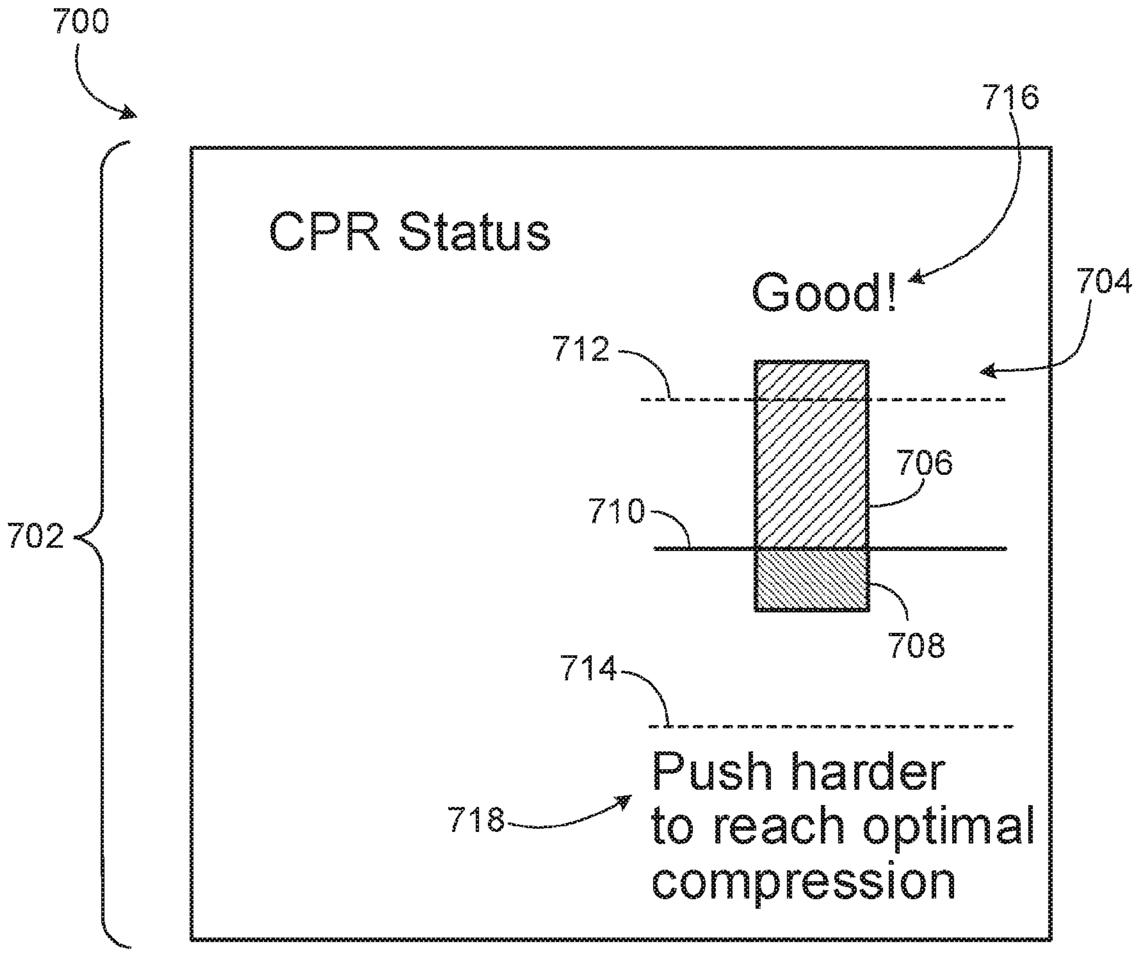
FIG. 8 shows an example of a user interface.

FIG. 8 shows an example of a user interface 700. For example, the user interface 700 may be an example of the user interface 106 of the ACD device shown in FIG. 1. Further, the user interface 700 may be controlled by the user interface module 408 shown in FIG. 4.

The user interface 700 displays information 702 representing effectiveness of a CPR treatment. The information 702 is displayed in a manner that enables a user 102 of the ACD device 100 (FIG. 1) to administer the CPR treatment effectively. The user interface 700 can be a portion of the ACD device or another device (e.g., patient monitor, defibrillator, portable computing device, other computing device) that is used for processing of ACD related information.

The information 702 includes a graph 704 representing the DE height 706 and CN depth 708 of the CPR treatment. The depth and height are separated by a boundary 710. In some implementations, the DE height 706 and CN depth 708 are determined by the processor 400 (FIG. 4). For example, the DE height 706 and CN depth 708 can be calculated using information the accelerometer(s) 404*a*-404*b* and knowing the time of occurrence of the peak heights and depths along with the neutral position. Alternatively, DE height and CN depth can be estimated from the force sensor 402 including calculated information such as the estimate of chest compliance 414 and the neutral position of chest compression 416 determined by the processor 400. Alternatively, the DE portion 706 of the display feedback or the CN portion 708 may display measurements of pressure rather than displacement. For instance, in one embodiment, the DE portion 706 may display a measure of pressure or force, DE force, while the CN portion 708 may display a measure of displacement, CN depth.

Figure 9:
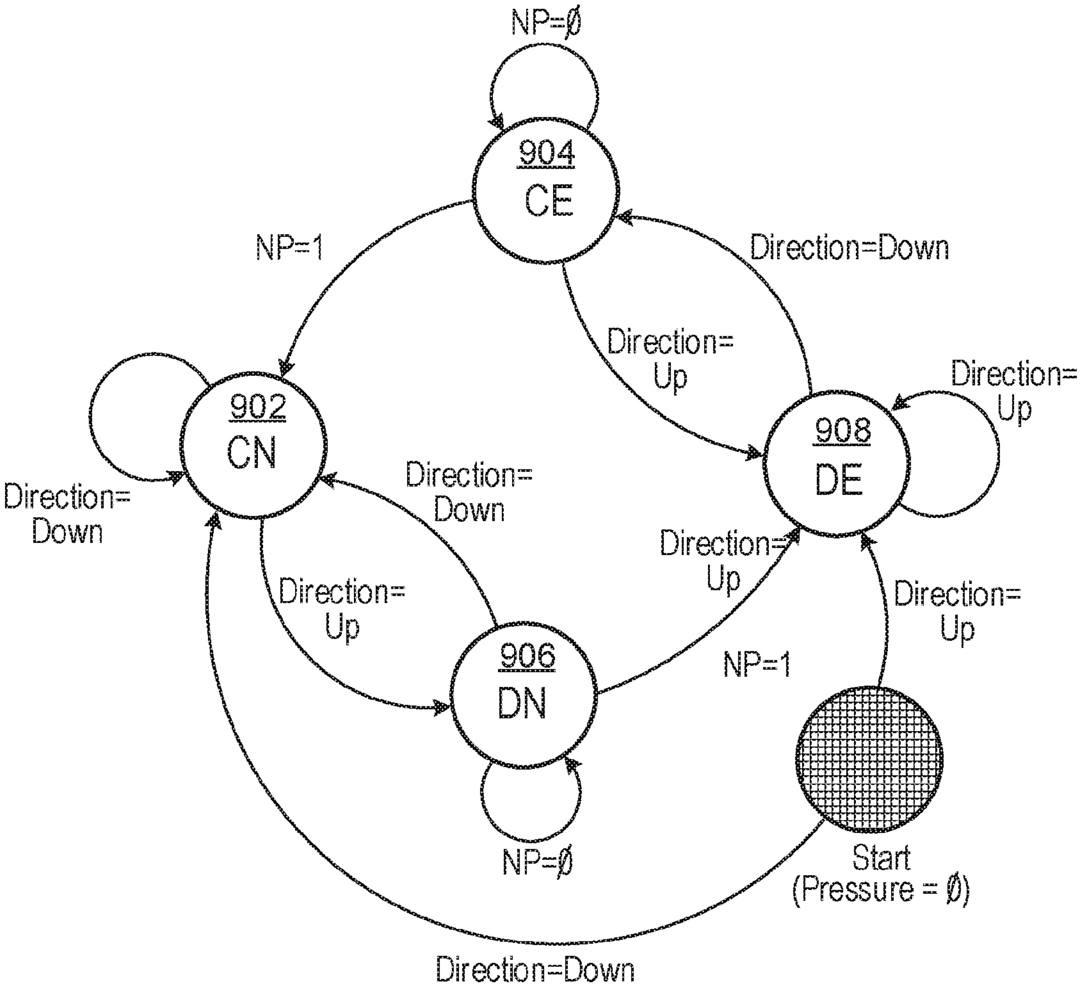
FIG. 9 shows a state transition diagram of a chest compression cycle.

Referring to FIG. 9, in some examples, a state transition diagram may be used to determine the phases of the compression cycle (e.g. CN, DN, DE and CE phases) based on inputs of compression direction (i.e. DE or CN) and whether the neutral position 416 has been reached. Transitions from CE 904 to CN 902 phases and DN 906 to DE 908 phases with the detection of a neutral position (NP). Upon transition to either CN 902 or DE 908, NP is reset to 0, i.e. the transition is edge sensitive. Transitions on direction are level sensitive. Transitions from CN 902 to DN 906 and DE 908 to CE 904 occur on change in direction. Parameters descriptive of the motion, such as velocity, distance, average velocity, peak velocity, etc., may be calculated knowing the time of occurrence of the transition between the compression phase states. In some versions, information 702 may also include other motion information may be displayed, such as velocity occurring during the decompression phase. More specifically, the velocity at the time that the neutral position occurs may be displayed, or otherwise communicated to the rescuer (e.g. tones, verbal, etc.). Alternatively, the velocity communicated to the rescuer may be an average or other statistical representation of the motion during a significant portion of the decompression phase (both elevated and non-elevated portions).

Referring to FIG. 8, the graph 704 also includes a DE height threshold indicator 712 and a CN depth threshold indicator 714. These indicators provide information to a user of the device about whether either or both of the DE height and CN depth is too shallow or too deep. For example, if the user sees that the DE height 706 does not meet the threshold indicator 712, the user can adjust his or her motion to increase the DE height (e.g., by pulling the ACD device with greater force during the DE motion). Similarly, if the user sees that the DE height indicator 706 passes the threshold indicator 712, the user can adjust his or her motion to decrease the DE height (e.g., by pulling the ACD device with less force during the DE motion). The user can similarly adjust the force during the CN motion if the user sees that the CN depth 708 does not meet the threshold indicator 714.

Further, the information 702 can include guidance displayed to the user based on the thresholds represented by the indicators 712, 714. For example, if either the DE depth or CN depth is not within a certain range of the threshold (e.g., more than 10% greater or 10% less than the threshold), then the user interface 700 can display messages guiding the user. In the example shown in FIG. 8, the CN depth indicator 708 indicates that the CN depth falls far short of the CN threshold indicator 714. In response, the user interface 700 displays a message 718 to the user indicating that he or she should push harder to reach optimal compression. A similar message could be displayed (with respect to optimal decompression) if the DE height indicator 706 fell short of its respective threshold. Similarly, if the DE height 706 or the CN depth 708 passed its respective threshold by a substantial amount (e.g., more than 10% past the threshold indicator), the user interface 700 could display a warning message (e.g., "reduce CN force to avoid injuring the patient").

Alternatively, a miniature vibrator such as used in all cell phones, may be included in the assembly in physical contact with the rescuer's hands, and haptic feedback about correct CN depth and DE height can be communicated, e.g. it vibrates when the thresholds are achieved.

In the example shown in FIG. 8, the DE height indicator 706 is close to the DE 10 threshold indicator 712. Thus, the user interface 700 displays a message 718 indicating that the user is not using an appropriate amount of force on DE motions.

In some implementations, the threshold indicators 712, 714 are displayed based on thresholds that are static values. For example, the memory 418 of the processor 400 (FIG. 4) may store static values, e.g., based on experimental data about DE height and CN depth in patients. The static values could be used directly, or the values may be modified by a variable measured with respect to the patient receiving the CPR treatment.

In some implementations, the threshold indicators 712, 714 are displayed based on thresholds calculated by a processor, e.g., the processor 400 shown in FIG. 4. In some examples, the calculated thresholds are based on a calculation of chest compliance, e.g., the estimate of chest compliance 414 shown in FIG. 4. For example, referring to the compliance curve 602 shown in FIG. 7, values of depth corresponding to the lowest values of chest compliance may correspond to the maximum DE height and maximum CN depth.

Figure 10:
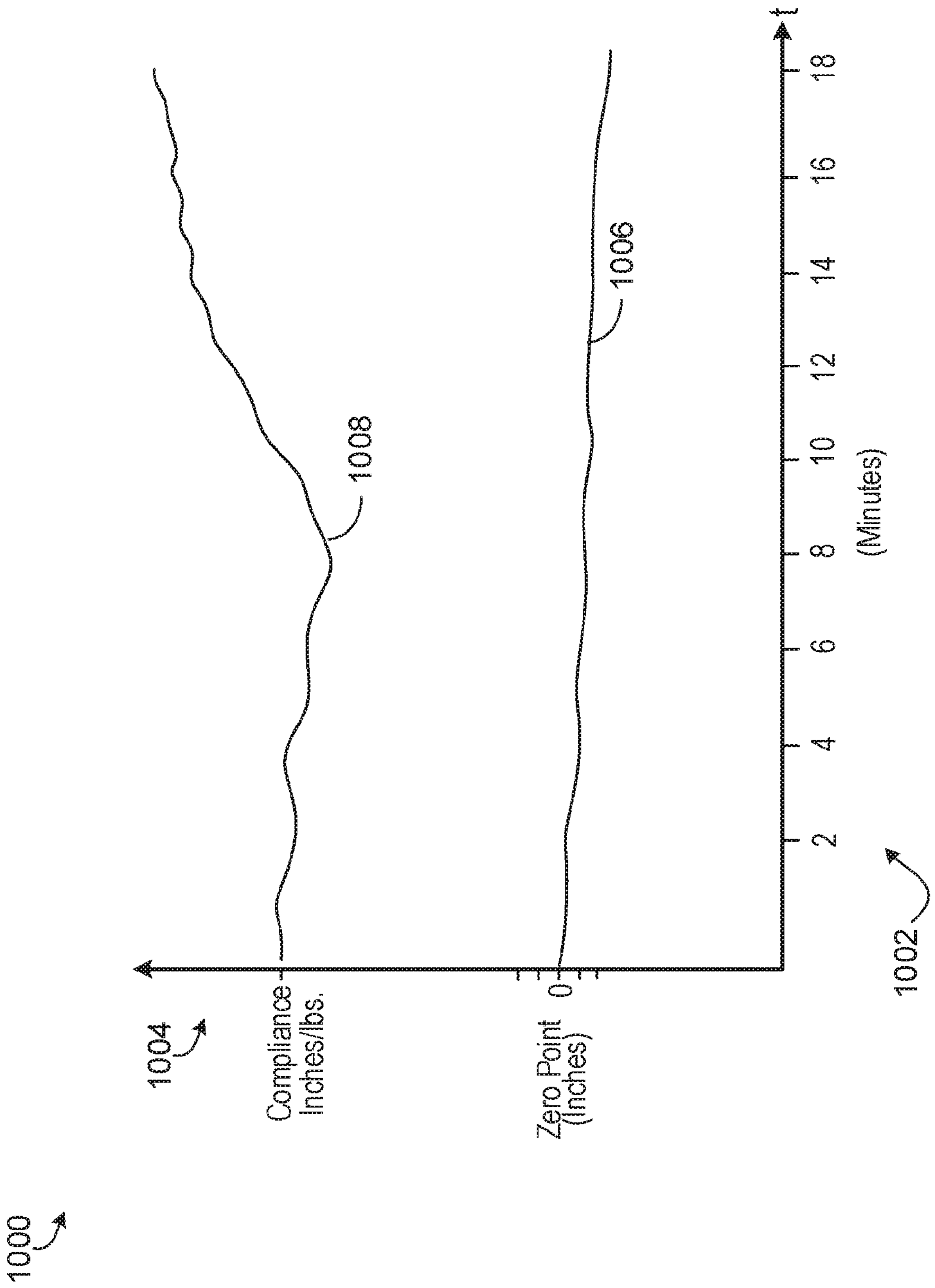
FIG. 10 shows a trend graph of chest remodeling.

In some implementations, the user interface 700 shows a trend graph representing chest remodeling. For example, the trend graph can represent what happens to the patient's chest over the course of a CPR treatment. FIG. 10 shows an example of the trend graph 1000 that could be displayed on the user interface 700. The trend graph 1000 has an x-axis 1002 representing time and a y-axis 1004 representing compliance. As shown in the example in the figure, the trend graph 1000 can include a zero point trend line 1006 (e.g., a trend line representing a starting depth of the patient's chest) and a compliance trend line 1008. Over time, the neutral position and the compliance change as a CPR treatment is delivered, as represented by the trend graph.

Figure 11:
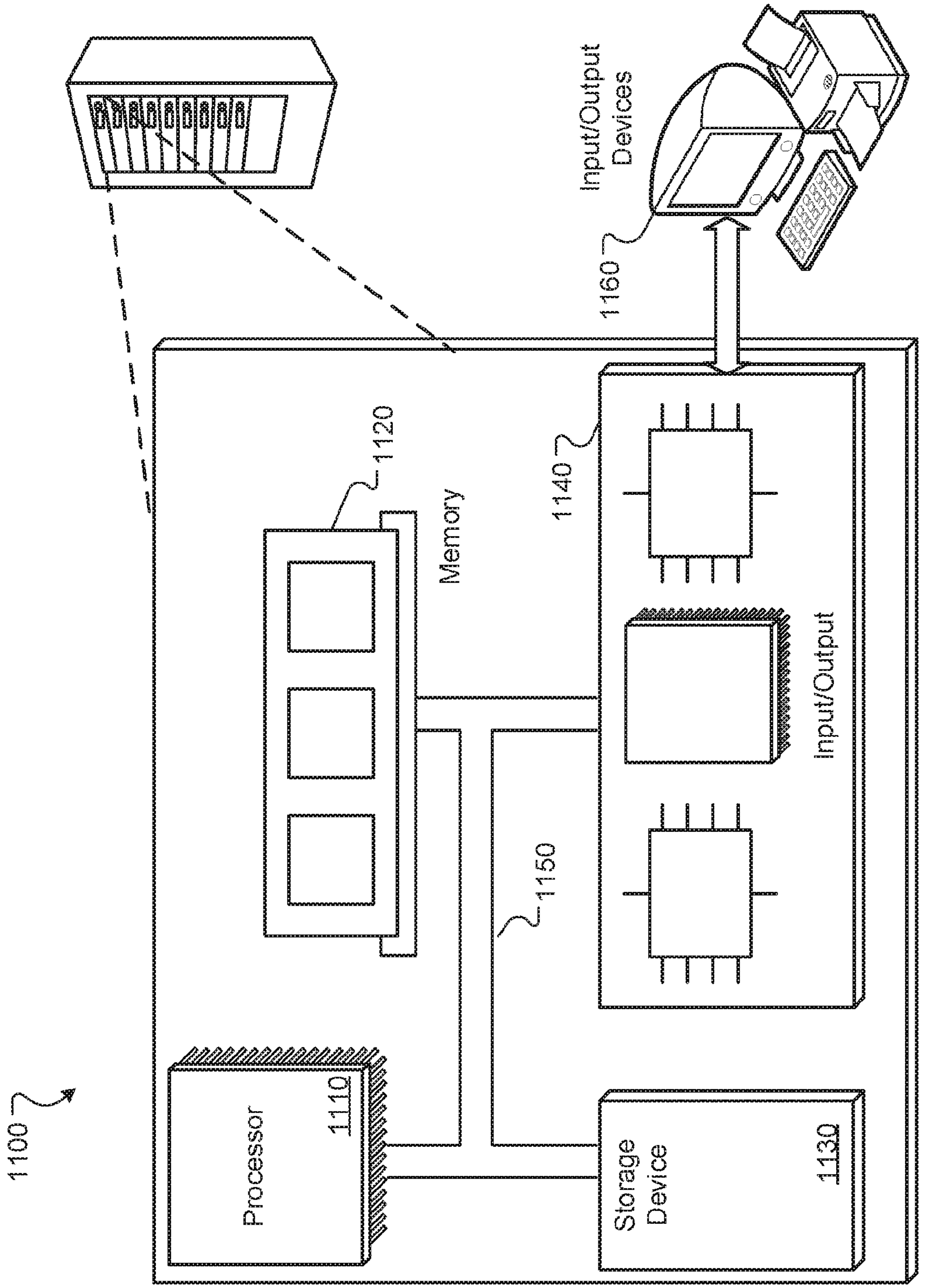
FIG. 11 is a block diagram of an example computer system.

FIG. 11 is a block diagram of an example computer system 1100. For example, referring to FIG. 1, the ACD device 100 could be an example of the system 1100 described here, as could the external device 412 (FIG. 4). The system 1100 includes a processor 1110, a memory 1120, a storage device 1130, and one or more input/output interface devices 1140. Each of the components 1110, 1120, 1130, and 1140 can be interconnected, for example, using a system bus 1150.

The processor 1110 may be an example of the processor 400 shown in FIG. 4 and is capable of processing instructions for execution within the system 1100. The term "execution" as used here refers to a technique in which program code causes a processor to carry out one or more processor instructions. In some implementations, the processor 1110 is a single-threaded processor. In some implementations, the processor 1110 is a multi-threaded processor. In some implementations, the processor 1110 is a quantum computer. The processor 1110 is capable of processing instructions stored in the memory 1120 or on the storage device 1130. The processor 1110 may execute operations such as determining a neutral position of chest compression based at least in part on a feature of a compliance curve.

The memory 1120 stores information within the system 1100. In some implementations, the memory 1120 is a computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 can include, for example, a hard disk device, an optical disk device, a solid-date drive, a flash drive, magnetic tape, or some other large capacity storage device. In some implementations, the storage device 1130 may be a cloud storage device, e.g., a logical storage device including one or more physical storage devices distributed on a network and accessed using a network. In some examples, the storage device may store long-term data. The input/output interface devices 1140 provide input/output operations for the system 1100. In some implementations, the input/output interface devices 1140 can include one or more of a network interface devices, e.g., the wireless communication module 410 shown in FIG. 4, or an Ethernet interface, a serial communication device, e.g., an RS-232 interface, and/or a wireless interface device, e.g., an 802.11 interface, a 3G wireless modem, a 4G wireless modem, etc. A network interface device allows the system 1100 to communicate, for example, transmit and receive data. In some implementations, the input/output device can include driver devices configured to receive input data and send output data to other input/output devices, e.g., keyboard, printer and display devices 1160. In some implementations, mobile computing devices, mobile communication devices, and other devices can be used.

Referring to FIG. 4, steps carried out by the processor 400 can be realized by instructions that upon execution cause one or more processing devices to carry out the processes and functions described above, for example, determining information relevant to a CPR treatment. Such instructions can include, for example, interpreted instructions such as script instructions, or executable code, or other instructions stored in a computer readable medium.

A computer system 1100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 1100 is contained within a single integrated circuit package. A system 1100 of this kind, in which both a processor 1110 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1140.

Although an example processing system has been described in FIG. 11, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server (e.g., is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Systems and methods will now be described in which measures of force applied to the chest and displacement of the chest when the patient is undergoing active compression decompression treatment are used to establish one or more force-displacement relationships from which multiple depths of compression corresponding the force-displacement relationship(s) are used to estimate the neutral position of the chest of the patient. The force-displacement relationship(s) may be based on the estimated instantaneous compliance of the chest, as discussed above. The force-displacement relationship(s) may be based on a first depth of chest compression corresponding to the point at which approximately zero force is applied to the chest of the patient during the compression phase of the ACD compression cycle, and a second depth of chest compression corresponding to the point at which approximately zero force is applied to the chest of the patient during the decompression phase of the ACD compression cycle, as discussed further below. The force-displacement relationship(s) may also be based on a first depth of chest compression corresponding to a first product of force and displacement during the compression phase of the ACD compression cycle, and a second depth of chest compression corresponding to a second product of force and displacement during the decompression phase of the ACD compression cycle, as also discussed below. The neutral position of the chest may then be estimated based on the first depth and the second depth, as determined by the appropriate force-displacement relationship(s).

As described herein, a compression cycle may generally refer to various types of CPR compression therapies. For instance, a compression cycle may refer to a conventional compression in which the patient's chest is pushed downward and released so as to allow for the natural recoil of the chest wall. A compression cycle may also generally refer to an ACD compression cycle in which the chest is pushed downward on compression or downstroke and also actively pulled upward on decompression or upstroke (e.g., using a device for administering ACD therapy), for the purpose of enhancing circulation by affecting the pressure within a patient's thorax.

Systems and methods described herein are applicable to both manual and automated active compression decompression treatment. That is, when ACD treatment is manually applied to the patient, the neutral position of the chest may be estimated at any given time. Similarly, when ACD treatment is applied to the patient via an automated chest compressor, the neutral position of the chest may also be estimated at any given time. This may be particularly useful in providing an indication of how the neutral position of the chest may have changed over the course of ACD treatment, either manually or via an automated system.

Figure 12:
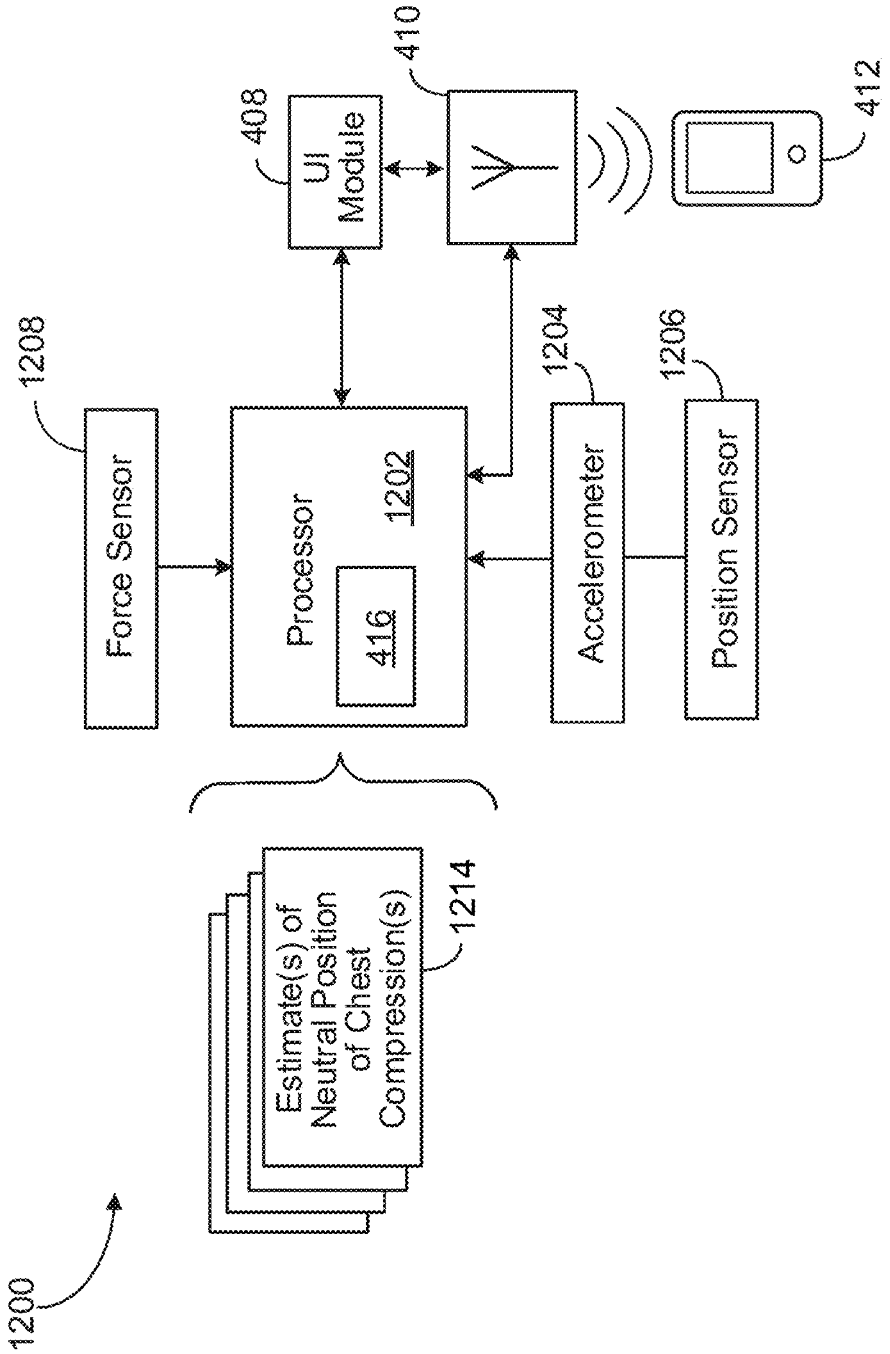
FIG. 12 is a block diagram of components of an example ACD device, such as the ACD device shown in FIG. 1.

FIG. 12 is a block diagram of components of an ACD device 1200, which includes components that are an alternative to or addition to the components shown in FIG. 4. The ACD device 1200 is similar to the ACD device 100 of FIG. 1, with one or more of the differences described below.

The ACD device 1200 includes a processor 1202, which may be substantially similar to processor 400, described above in relation to FIG. 4. In some implementations, the processor 1202 of ACD device 1200 can perform calculations to determine an estimate of a neutral position of a patient's chest during ACD treatment. The processor can calculate one or more neutral position estimates 1214 using a variety of techniques as described below in relation to FIGS. 15-24. The calculation of the one or more neutral position estimates 1214 can be based on a relationship between a force applied on the patient's chest by the ACD device 1200 and the compression distance of the chest during the ACD compression cycle. In various embodiments, while the processor(s) with which calculations described herein are performed may be processor 1202 of the ACD device 1200, alternatively or in addition, other processors may be involved. For instance, information collected from one or more of the force sensor, accelerometer and/or position sensor may be analyzed by another processor, such as a processor of a patient monitor, defibrillator, portable computing device (e.g., tablet), or other computing device, and subsequently output on that same device or to another device.

As stated above, an ACD compression cycle includes a compression phase and a decompression phase. The compression phase refers to the application of a compression force to a patient's chest from a starting point (e.g., a zero point), down to a maximum compression depth, and back to the starting point. The decompression phase generally follows the compression phase and includes decompressing (e.g., lifting) the patient's chest to a maximum decompression height and then lowering the patient's chest back to the starting point. The zero point refers to an initial position (e.g., amount of compression/decompression) of the patient's chest before ACD treatment commences.

The processor 1202, or other processor(s) in communication with the ACD device, is configured to receive data from one or more sensors for estimating the one or more neutral position estimates 1214. For example, the processor 1202 can be in communication with a force sensor 1208 (e.g., load cell), which is substantially similar to the force sensor 402 described above in relation to FIG. 4, an accelerometer 1204, which is substantially similar to accelerometers 404*a*, 404*b* described above in relation to FIG. 4, and a position sensor 1206.

In some implementations, the ACD device 1200 may be configured for automatic application of ACD treatment of a patient. For example, ACD device 1200 can include a force actuator (not shown) for automatically applying compression forces and decompression forces to the patient's chest. The mechanism can include one or more of a compression belt, a piston, an elastic element such as a spring, one or more flexible rods, a string and pulley mechanism, and so forth. The force actuator is configured to compress the patient's chest for a compression portion of the ACD compression cycle and decompress (e.g., lift up) the patient's chest for the decompression portion of the ACD compression cycle.

The position sensor 1206 provides position data of the force actuator of the ACD device 1200. In some implementations, the position sensor 1206 includes one or more of an encoder, capacitive transducer, Hall Effect sensor, potentiometer, range sensor, and so forth. The exact hardware of the position sensor 1206 can depend on hardware used for the force actuator. For example, if a piston is used for the force actuator, then the position sensor 1206 can include an encoder to measure the piston's relative position.

The processor 1202 can receive the position data of the force actuator as measured by the position sensor 1206. The processor 1202 can determine a compression depth and/or decompression depth (hereinafter collectively referred to as "chest displacement") relative to an initial zero point. The position data can be proportional to the chest displacement of the patient caused by the force actuator of the ACD device 1200.

The processor 1208 is configured to receive data from the force sensor 1200, the position sensor 1206, and the accelerometer 1204 in such a way that the processor can relate the force applied by the force sensor to the position of the position sensor 1206, and thus the chest displacement of the patient, for one or more points in time of the ACD compression cycles.

Figure 13:
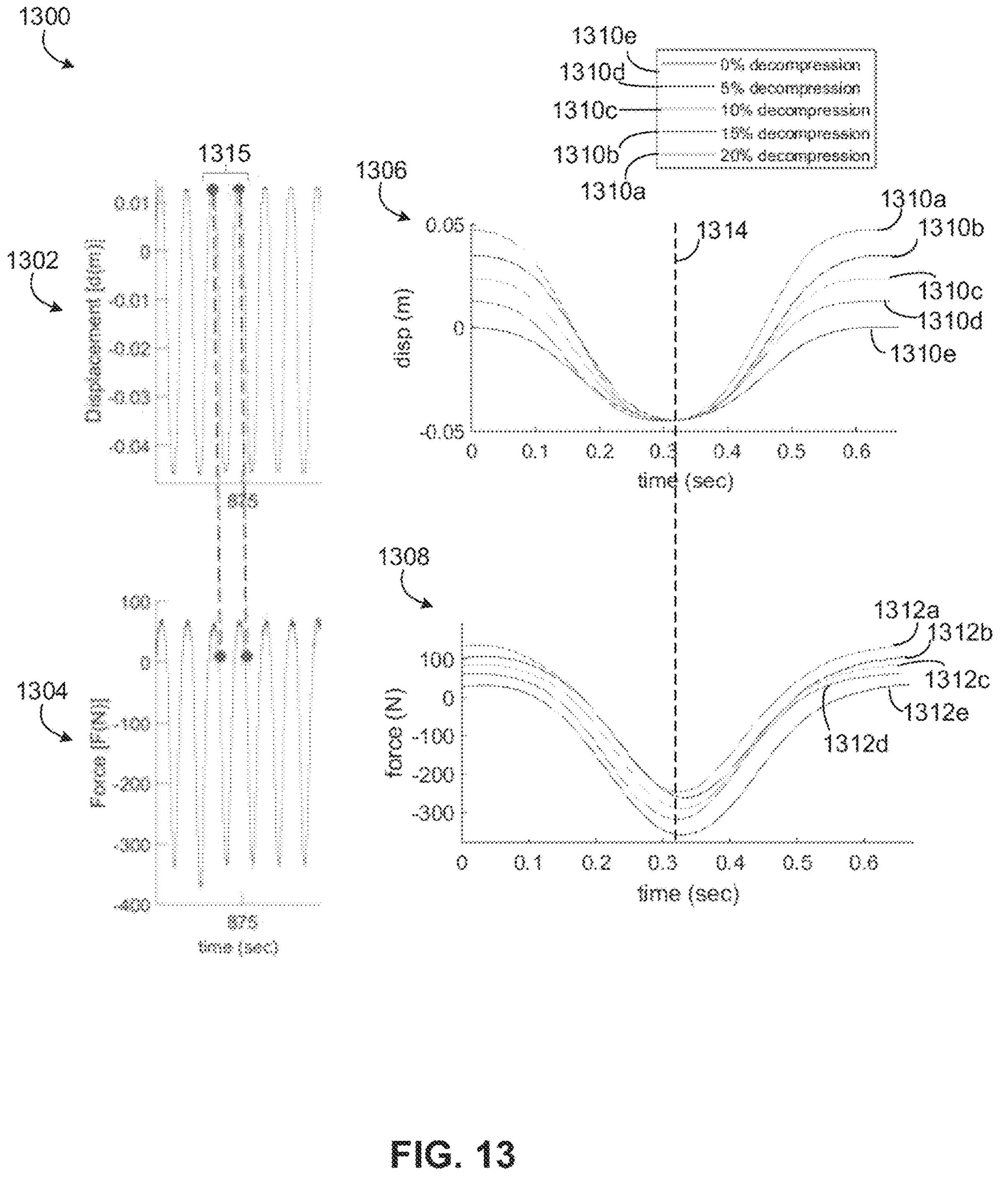
FIG. 13 shows example using a study protocol on pig data of force and displacement during compression cycles of ACD treatment.

Turning to FIG. 13, example treatment data 1300 is shown for tests in a study protocol performed on the chest of a pig subject. It can be appreciated that treatment information gathered from the pig subject shown here may be applicable to the treatment of patients in emergency settings. For example, the methods described herein with respect to identifying or otherwise estimating the neutral position of the chest for any given ACD compression cycle may be used for patients undergoing ACD CPR treatment manually or via an automated ACD system. Treatment data 1300 includes data measured by the sensors (e.g., position sensor 1206, accelerometer 1204, and force sensor 1208) during operation of the ACD device 1200, which was adhered to the subject via an adhesive pad. Example displacement data 1302 and force data 1304 are shown for a series of ACD compression cycles. For example, chest displacement can be determined by the processor 1202 using one or both of the position data and the accelerometer data received from the position sensor 1206 and the accelerometer 1204, respectively. The position data and accelerometer data are converted to a calculated chest displacement position, such as described above.

Systems and methods for estimating displacement or depth from accelerometer data are described in U.S. Pat. No. 9,125,793, entitled "System for determining depth of chest compressions during CPR," which is hereby incorporated by reference in its entirety. In general, acceleration data may be double integrated to obtain displacement. In addition, raw data may be appropriately filtered so as to result in clean results. For example, raw acceleration may be filtered by a filter (e.g., high pass filter, band pass filter, moving average filter, infinite impulse response filter, autoregressive filter, autoregressive moving average filter) to produce a filtered acceleration with most forms of signal noise substantially reduced. However, the integration process may still result in a relatively noisy velocity waveform compared with the acceleration waveform. The filtered acceleration may be integrated to result in velocity. The velocity may then be filtered (e.g., high pass filter, band pass filter, moving average filter, infinite impulse response filter, autoregressive filter, autoregressive moving average filter) to produce a filtered velocity. The filtered velocity may then be integrated to result in displacement. The integration process may still cause the displacement waveform to be slightly noisier than the acceleration and velocity waveforms. Accordingly, the displacement waveform may be filtered (e.g., high pass filter, band pass filter, moving average filter, infinite impulse response filter, autoregressive filter, autoregressive moving average filter) to produce a filtered displacement waveform. Typically, the chest displacement are shown in centimeters (cm) or inches (in), while the force data may be shown in Newtons (N) or another measure of force. However, any distance and force units are applicable.

Additionally, graph 1306 shows displacement data and graph 1308 shows force data. Each of graph 1306 and graph 1308 shows data overlaid for example compression cycles at different percent decompression values. A percent decompression value refers to the percentage of the anterior-posterior distance of the thorax that the subject's chest is decompressed (e.g., lifted) above the zero point during ACD treatment. As stated above, the zero point refers to an initial chest position of the patient when ACD treatment commences. A percent compression value refers to the percentage of the anterior-posterior distance of the thorax that the subject's chest is compressed below the zero point. In the example data shown, a 20% compression refers to approximately 2.0 inches of compression below zero point, 15% compression refers to approximately 1.5 inches of compression below zero point, 10% compression refers to approximately 1.0 inch of compression below zero point, and 5% compression refers to approximately 0.5 inches of compression below zero point. Similarly, a 20% decompression refers to approximately 2.0 inches of decompression above zero point, 15% decompression refers to approximately 1.5 inches of decompression above zero point, 10% decompression refers to approximately 1.0 inch of decompression above zero point, and 5% decompression refers to approximately 0.5 inches of decompression above zero point.

Graph 1306 shows displacement data for five ACD compression cycle depths 1310*a*-1310*e*. For clarity, the graph 1306 shows the ACD compression cycles as beginning at the initiation of downstroke at the maximum height of the chest, which involves compression down to a maximum compression depth, followed by the initiation of upstroke, which involves decompression from the maximum compression depth back up to the maximum height of the chest during the compression cycles. Each of the compression cycles 1310*a*, 1310*b*, 1310*c*, 1310*d*, 1310*e* shown represents the displacement of the subject's chest at 20% compression applied (approximately 2.0 inches below zero point), however, the amount of decompression for each of the compression cycles 1310*a*, 1310*b*, 1310*c*, 1310*d*, 1310*e* differ. The compression cycle depth 1310*a* represents the displacement of the subject's chest for a compression cycle with 200% compression applied (approximately 2.0 inches below zero point) and 20% decompression applied (approximately 2.0 inches above zero point). The compression cycle depth 1310*b* represents the displacement of the subject's chest for a compression cycle with 20% compression applied and 15% decompression applied (approximately 1.5 inches above zero point). The compression cycle depth 1310*c* represents the displacement of the subject's chest for a compression cycle with 20% compression applied and 10% decompression applied (approximately 1.0 inch above zero point). The compression cycle depth 1310*d* represents the displacement of the subject's chest for a compression cycle with 20% compression applied and 5% decompression applied (approximately 0.5 inches above zero point). The compression cycle depth 1310*e* represents the displacement of the subject's chest for a compression cycle with 20% compression applied and 0% decompression applied (e.g., decompression of the chest back to the initial zero point).

Graph 1308 shows force data for five compression cycle forces 1312*a*-1312*e*. For clarity, the graph 1308 shows the compression cycles as beginning at initiation of downstroke at the maximum height of the chest, which involves compression down to a maximum compression depth, followed by the initiation of upstroke, which involves decompression from the maximum compression depth back up to the maximum height of the chest during the compression cycles. Each of the compression cycles 1312*a*, 1312*b*, 1312*c*, 1312*d*, 1312*e* shown represents the force measured at the subject's chest at 20% compression applied (approximately 2.0 inches below zero point), however, the amount of decompression for each of the compression cycles 1312*a*, 1312*b*, 1312*c*, 1312*d*, 1312*e* differ. The compression cycle force 1312*a* represents the force applied to the subject's chest for a compression cycle with 20% compression applied (approximately 2.0 inches below zero point) and 20% decompression applied (approximately 2.0 inches above zero point). The compression cycle force 1312*b* represents the force applied to the subject's chest for a compression cycle with 20% compression applied and 15% decompression applied (approximately 1.5 inches above zero point). The compression cycle force 1312*c* represents the force applied to the subject's chest for a compression cycle with 20% compression applied and 10% decompression applied (approximately 1.0 inch above zero point). The compression cycle force 1312*d* represents the force applied to the subject's chest for a compression cycle with 20% compression applied and 5% decompression applied (approximately 0.5 inches above zero point). The compression cycle force 1312*e* represents the force applied to the subject's chest for a compression cycle with 20% compression applied and 0% decompression applied (e.g., decompression of the chest back to the initial zero point). Compression cycle forces 1312*a-e* correspond to compression cycle displacements 1310*a-e*, respectively.

Line 1314 is a reference showing a comparison, for a point in time of maximum depth for each of compression cycle depths 1310*a-e*, of the applied forces for respective compression cycle forces 1312*a-e*. Generally, the forces 1312*a-e* are the lowest values (e.g., most negative) at maximum compression displacements. The forces 1312*a-e* are generally greatest (e.g., most positive) during maximum decompression displacement. Generally, and for each of compression cycle forces 1312*a-e*, the force value is zero at two points during the compression cycle. These points may represent a transition from a compression phase to a decompression phase, and vice versa. These points can also be used to estimate the neutral position of the subject's chest, as further described below.

The displacement data graph 1302 and the force data graph 1304 are approximately aligned to show a comparison between force and distance values during compression cycles. An example compression cycle is marked by lines 1315.

Figure 14:
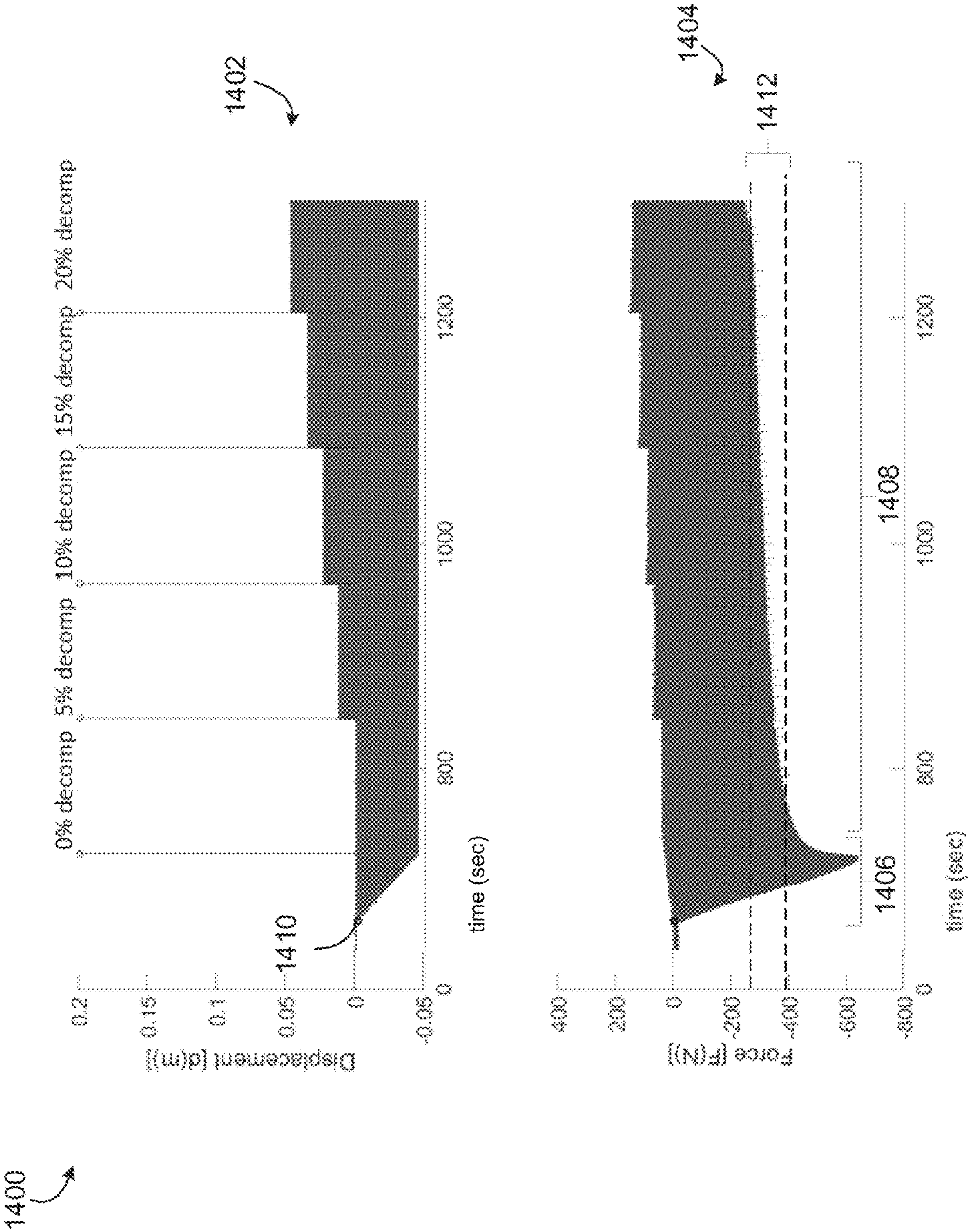
FIG. 14 shows example data of force and displacement during compression cycles of ACD treatment.

As described above, as the subject's chest is subjected to compression cycles, the subject's chest becomes more compliant, meaning that relatively less force is required to compress and/or decompress the subject's chest over time. This is illustrated in FIG. 14, which shows data 1400 representing a series of several compression cycles over time (on the order of approximately half an hour). Displacement data 1402 shows the displacement of the subject's chest over time. The force data 1404 shows a force applied to the subject's chest over time. Point 1410 shows a zero point, which is an initial resting displacement of the subject's chest (set to a displacement of zero).

During an initial period marked by 1406, relatively larger force magnitudes are applied to the subject's chest than during period 1408. This is because organic structures in the subject's chest, such as ribs, may bend, crack, or even break during compressions, resulting in an initial period of significant chest remodeling. Upon inspection of the period 1406, it can be seen that after a short time within the period 1406, upward force is still applied when the ACD device is brought back to the zero point, indicating that the neutral position of the chest has moved downward from the zero point. Over the period of 1408, relatively less force is applied to achieve the same compression displacement as the chest becomes more compliant.

As the subject's chest becomes more compliant over time, a neutral position of the subject's chest may change, depending on how compressions and decompression are applied. The neutral position of the chest refers to a displacement position in which the chest naturally rests when no forces are applied to the chest. Estimation of neutral position allows for more accurate determination of the compression depth and decompression lift of a patient when undergoing ACD CPR therapy and, hence, may allow for better feedback regarding the quality of the administered CPR. Initially, the neutral position is equal to the zero point. However, as the chest becomes more compliant, and as ribs crack and/or break, the neutral position of the chest may change. Typically, the chest wall rests at a lower position relative to the zero point after compressions have been performed on the chest. For example, initially, as the chest is compressed, the neutral position of the chest will naturally migrate downward. However, as decompressions are applied, the neutral position of the chest may rise upward. The combination of downward compressions and upward decompressions may alter the position of the neutral position in real time. The processor 1202 of FIG. 12 is configured to estimate the neutral position of the chest to which ACD treatment is applied. Estimating the neutral position of the chest, and the neutral position estimation(s) can be used to tune or otherwise adjust compression and decompression forces applied to the user as well as compression and decompression displacements of the subject's chest during compression cycles.

The processor 1202 is configured to estimate the neutral position of the chest to which ACD treatment is applied in several different ways, as described below in relation to FIGS. 15-24.

Figure 15:
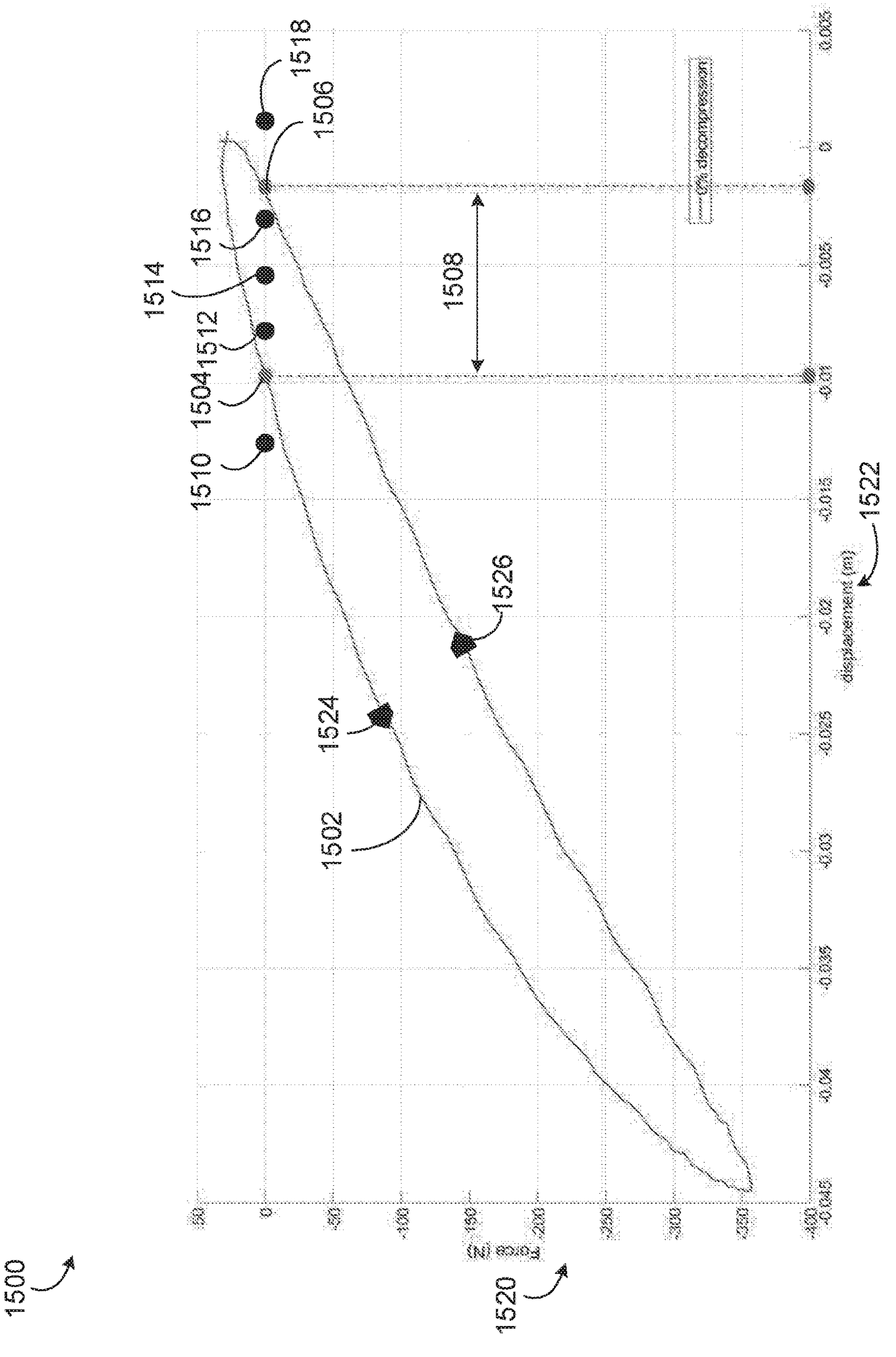
FIG. 15 shows example data of force and displacement during a compression cycle for estimating a neutral position of a patient.

FIG. 15 shows an example graph 1500 of a relationship 1502 between displacement 1522 and force 1520 during a compression cycle. As depicted by the arrows 1524, 1526, the upper portion of the curve shows the compression downstroke represented by arrow 1524 and the lower portion of the curve shows the decompression upstroke represented by arrow 1526. The force-displacement relationship curve 1502 shows that, generally, as displacement values increase, force values increase. During the compression cycle, the amount of force being applied at a given displacement of the chest differs from compression to decompression, and thus the force 1520 is not strictly a function of the displacement 1522 in a mathematical sense. This is because of mechanical hysteresis in the compression cycle. Force values may be lower in magnitude during compression for a given displacement value than that for decompression. In some implementations, the force values 1520 of the force-displacement relationship curve 1502 are measured by a force sensor (e.g., force sensor 1208 of FIG. 12). In some implementations, the displacement values 1522 of the force-displacement relationship curve 1502 are determined based on measurements by a position sensor (e.g., position sensor 1206 of FIG. 12) and/or an accelerometer (e.g., accelerometer 1204 of FIG. 12). It can be appreciated that a similar force-displacement relationship may be obtained during use of an ACD device where manual ACD treatment is applied. In such cases, force values of the force-displacement relationship curve are measured by a force sensor provided with the ACD device, and displacement values of the force-displacement relationship curve are determined based on measurements by a position sensor and/or an accelerometer. For example, a manual ACD device can include the device 100 described in relation to FIGS. 1-10, above.

Referring to the graph 1500, the force-displacement relationship curve 1502 crosses a point where the measured force is zero in two locations, marked by points 1504 and 1506, in which a force being applied to the chest is zero. As shown in the graph 1500, zero force crossing points 1504, 1506 are separated by a distance. In some implementations, the processor 1202 estimates a neutral position (e.g., a displacement value corresponding to the neutral position) of the subject's chest based on the zero force crossing points 1504, 1506. In some implementations, zero force crossing points 1504, 1506 are not equal to zero displacement (e.g., the zero point), but are somewhat less or more than the zero displacement value. This is because of increasing chest compliance or remodeling of the biomechanics of the sternal/thoracic structure during the course of chest compressions, as described above in relation to FIG. 14.

The processor 1202 can be configured to estimate the neutral position of the subject's chest as a function of the two zero force crossing points 1504, 1506. For example, the estimate of the neutral position of the subject's chest can include an average of the displacement values corresponding to the zero force crossing points 1504, 1506. The average of displacement values corresponding to zero force crossing points 1504, 1506 is approximately at point 1514 in graph 1500, or above −0.005 m from the zero point.

In some implementations, the estimate of the neutral position is a weighted function (e.g., a weighted average) of the displacement values corresponding to zero force crossing points 1504, 1506. The weighted function can include a linear function, exponential function, etc. For example, the weighted function can include an expression in which the weights comprise coefficients in a polynomial expression. In one example, the weighting function may be of the form $NP=a_u*x_u+a_d*x_d$, where the weights $a_u$ and $a_d$ adjust the displacement values corresponding to points 1504, 1506, and where $x_d$ corresponds to the crossing point during the upstroke and $x_d$ corresponds to the crossing point during the downstroke, and where the weights are normalized such that the sum of all the weights equals 1.

In an example, weights can be applied to a function relating the zero force crossing points 1504, 1506 to an estimated neutral position. The value of the weights can be based on historical data (e.g., gathered over time from many patients and/or subjects), dynamically tuned based on prior compression cycles of the current patient, manually adjusted (e.g., calibrated), adjusted based, for instance, on hardware being used. The weights can be based on prior experimentation and empirical data to determine predetermined weights that result in an optimal estimation of the neutral position across the widest population of subjects. Alternatively, the predetermined weights may be based on estimates of a particular subject's one or more sternal/thoracic biomechanical parameters, such as compliance, damping, mass, stiffness, viscosity of the chest. Separate models may be estimated for the upstroke and downstroke of the compression cycle. Separate models may be generated for varying depths of compression or decompression. For instance, the weights may be proportional to the relative stiffness, viscosity, damping on the upstroke and downstroke. The weights may be based on the damping at the midpoint of the compression/decompression cycle. The predetermined weights may be further modified by estimates of a particular subject's one or more sternal/thoracic biomechanical parameters In some implementations, the estimated neutral position is a displacement value between the displacement values of zero force crossing points 1504, 1506, or within range 1508. In some implementations, the estimate of the neutral position can be outside range 1508, such as consistently lower than zero force crossing points 1504, 1506, such as approximately point 1510. In some implementations, the estimate of the neutral position can be consistently greater than zero force crossing points 1504, 1506, such as approximately point 1518. In some implementations, the processor 1202 can output a probability that the neutral position is within range 1518 (e.g., 90% probability, 100% probability, or any percentage value). In some implementations, the processor 1202 can provide a probability that the neutral position of the subject's chest is greater than the displacement value at point 1506, less than the displacement value at point 1504, or both. This situation might occur if there has been compression-induced nosocomial injury such as a rib fracture or separation of the sternal cartilage; it may also occur if a ventilation breath is delivered causing a momentary change in mechanical properties during the chest compression cycle.

Figure 16A:
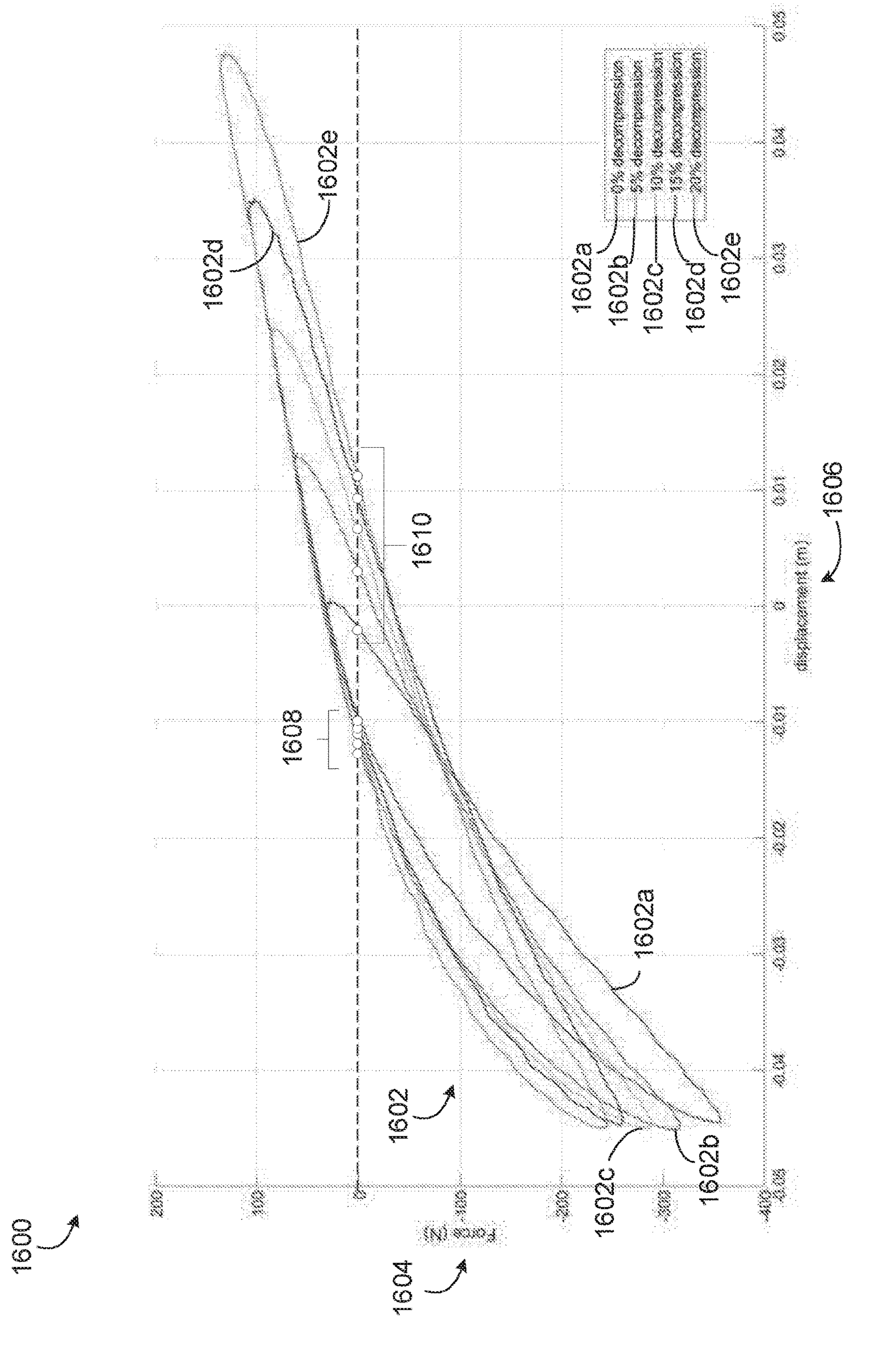
FIGS. 16A-16B show example data of force and displacement during a plurality of compression cycles for estimating a neutral position of a patient.

Turning to FIG. 16A, a graph 1600 includes force-displacement relationship curves 1602*a-e*, similar to force-displacement relationship curve 1502 of FIG. 15. The force-displacement relationship curves 1602*a-e* show a relationship between displacement values 1606 of a subject's chest and corresponding force values 1604 of forces applied to the subject's chest during ACD compression cycles.

Each of the force-displacement relationship curves 1602*a-e* represents the force-displacement relationship for a compression cycle at a different decompression percentage value, with the compression remaining approximately the same at 20% compression (about 2.0 inches depth). Force-displacement relationship curve 1602*a* represents the force-displacement relationship at 20% compression and 0% decompression above the zero point. Force-displacement relationship curve 1602*b* represents the force-displacement relationship at 20% compression and 5% decompression above the zero point. Force-displacement relationship curve 1602*c* represents the force-displacement relationship at 20% compression and 10% decompression above the zero point. Force-displacement relationship curve 1602*d* represents the force-displacement relationship at 20% compression and 15% decompression above the zero point. Force-displacement relationship curve 1602*e* represents the force-displacement relationship at 20% compression and 20% decompression above the zero point.

In some implementations, the force values 1604 of the force-displacement relationship curves 1602*a-e* are measured by a force sensor (e.g., force sensor 1208 of FIG. 12). In some implementations, the displacement values 1606 of the force-displacement relationship curves 1602*a-e* are determined based on measurements by a position sensor (e.g., position sensor 1206 of FIG. 12) and/or an accelerometer (e.g., accelerometer 1204 of FIG. 12).

In graph 1600, zero force crossing points 1608, 1610 are shown. The processor 1202 of FIG. 12 can use the zero force crossing points 1608, 1610 for estimating the neutral position of a subject's chest in a manner similar to the use of the zero force crossing points 1504, 1506 as described above in relation to FIG. 15. Here, points 1610 represent zero force crossing points during the compression phase, and points 1608 represent zero force crossing points during the decompression phase.

Figure 16B:
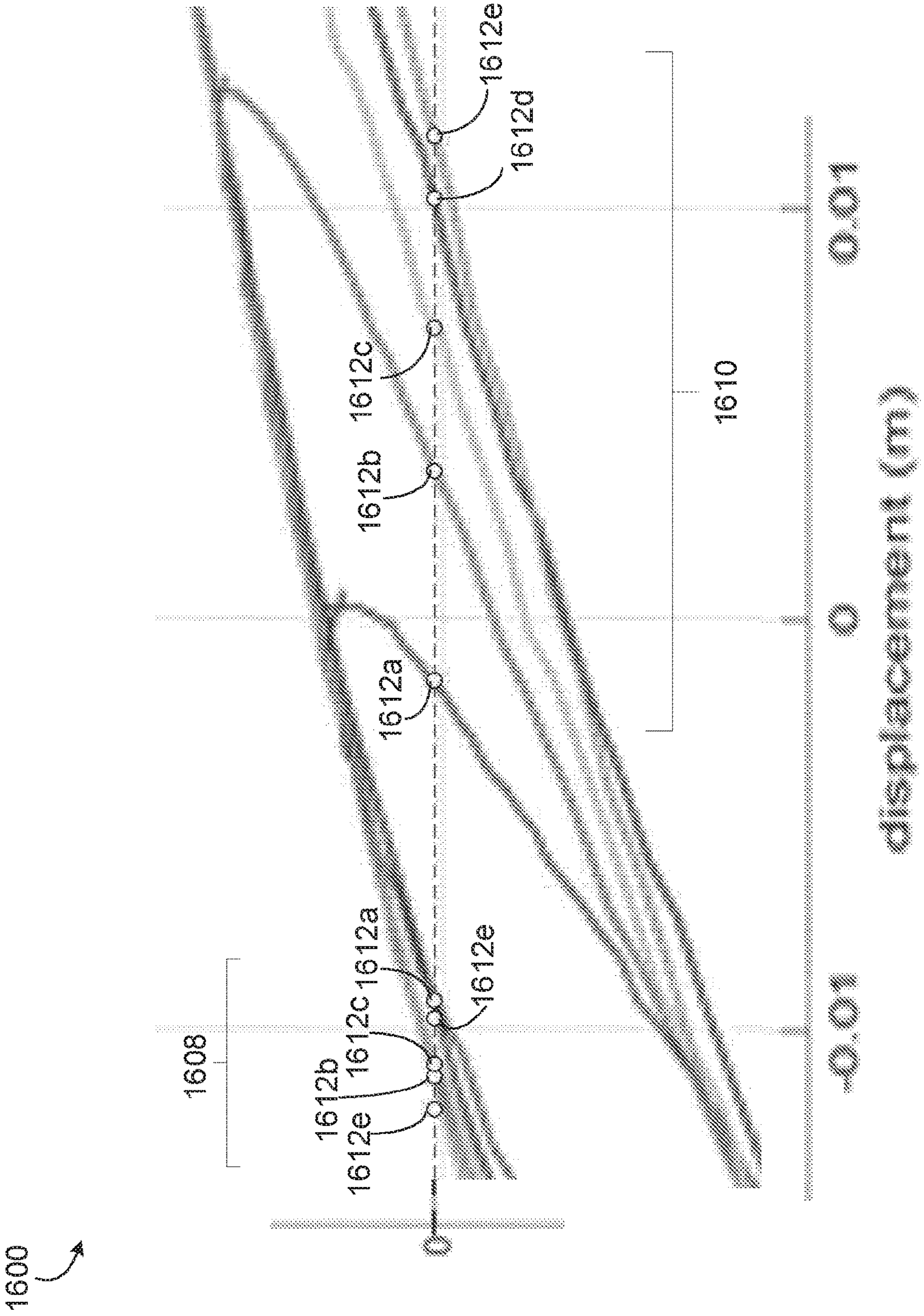

FIG. 16B is a zoomed in portion 1650 of graph 1600. The zero force crossing points 1612*a-e* are marked in pairs for each of the force-displacement relationship curves 1602*a-e*. Zero force crossing points 1612*a* correspond to the force-displacement relationship curve 1602*a*. Zero force crossing points 1612*b* correspond to the force-displacement relationship curve 1602*b*. Zero force crossing points 1612*c* correspond to the force-displacement relationship curve 1602*c*. Zero force crossing points 1612*d* correspond to the force-displacement relationship curve 1602*d*. Zero force crossing points 1612*e* correspond to the force-displacement relationship curve 1602*e*.

In this example, for force-displacement relationship curve 1602*a-e*, the corresponding zero force crossing points 1612*a-e* are relatively further apart, in terms of corresponding chest displacement, as the percent decompression increases. Further, the zero force crossing points 1608 and 1610 vary more asymmetrically, as the zero crossing points 1610 for compression change more as percent decompression is increased than the relative positions of the zero force crossing points 1608 as percent decompression is increased. In some implementations, this trend can be accounted for in estimations of the neutral position of the subject's chest performed by the processor 1202. For example, the processor 1202 can be configured to use different weighting values for estimating the neutral position of the subject's chest based on the percent decompression associated with the measured zero force crossing points 1608, 1610. Similar to that described above with respect to FIG. 15, various weighting factors and/or other calculations may be applied to the zero force crossing points to estimate the neutral position of the chest.

Figure 17A:
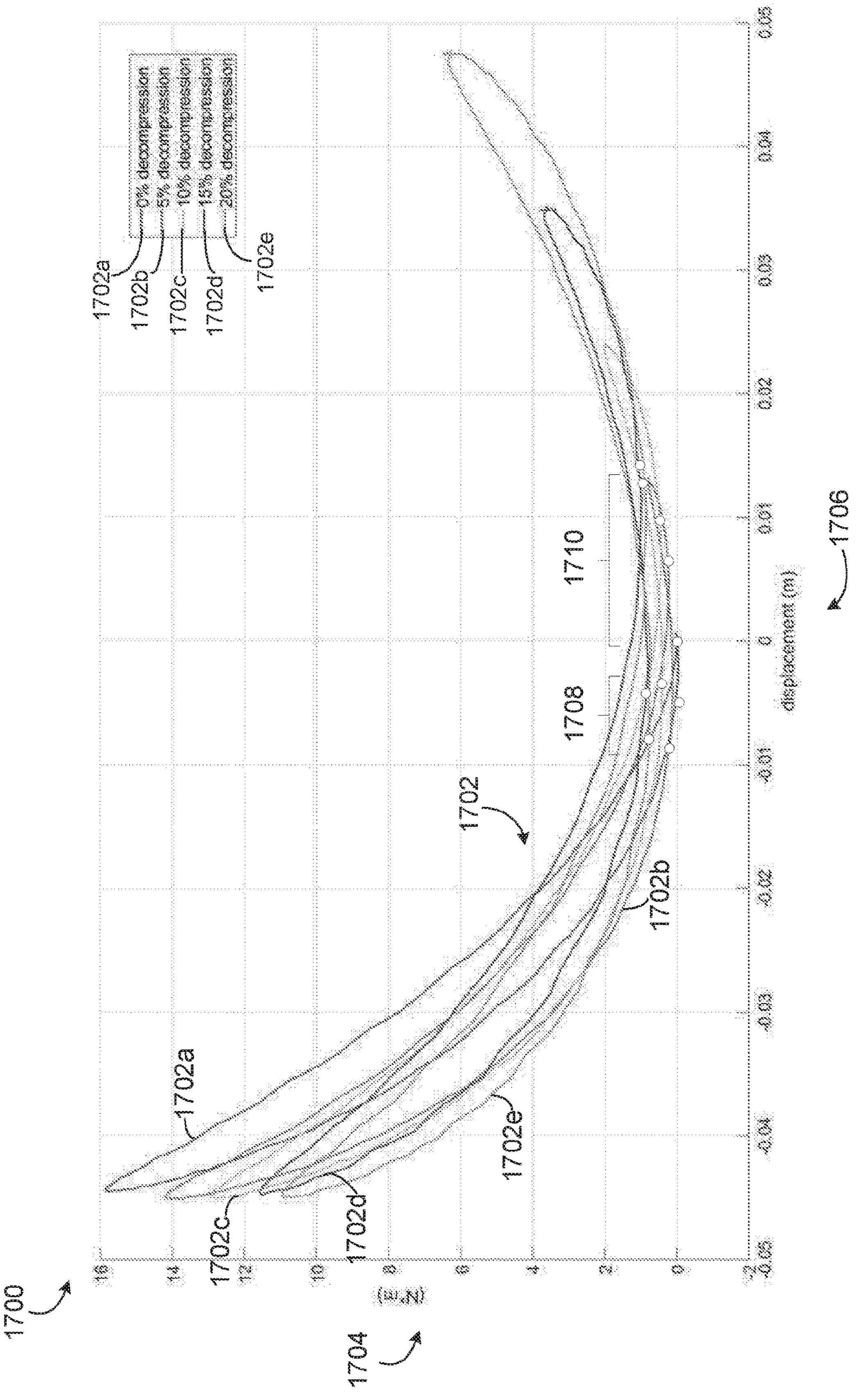
FIGS. 17A-17B show example graphs depicting relationships between work and displacement during a plurality of compression cycles for estimating a neutral position of a patient.

Turning to FIG. 17A, a graph 1700 includes relationship curves 1702*a-e* that show displacement on the x-axis and the product of force and displacement on the y-axis. The product-displacement relationship curves 1702*a-e* show a relationship between displacement values 1706 of a subject's chest and corresponding force-displacement product values 1704 of forces applied to the subject's chest during ACD compression cycles. For clarity below, the force-displacement product value 1704 may be referred to as the product value, or simply product value 1704. In some implementations, the force-displacement product can be referred to as effort or an effort value. The effort value can represent a physical effort (e.g., by a rescuer, device, etc.) for holding a chest of the subject at a particular displacement position. The effort is at a minimum when the chest of the subject is at a neutral position. In some implementations, the effort increases approximately parabolically as a compression displacement or a decompression displacement value increases from the neutral position.

Each of the product-displacement relationship curves 1702*a-e* represents the product-displacement relationship for a compression cycle at a different decompression percentage value. Product-displacement relationship curve 1702*a* represents the product-displacement relationship at 20% compression and 0% decompression above the zero point. Product-displacement relationship curve 1702*b* represents the product-displacement relationship at 20% compression and 5% decompression above the zero point. Product-displacement relationship curve 1702*c* represents the product-displacement relationship at 20% compression and 10% decompression above the zero point. Product-displacement relationship curve 1702*d* represents the product-displacement relationship at 20% compression and 15% decompression above the zero point. Product-displacement relationship curve 1702*e* represents the product-displacement relationship at 20% compression and 20% decompression above the zero point.

In some implementations, the product values 1704 of the product-displacement relationship curves 1702*a-e* are determined based on measurements from a force sensor (e.g., force sensor 1208 of FIG. 12). In some implementations, the displacement values 1706 of the product-displacement relationship curves 1702*a-e* are determined based on measurements by a position sensor (e.g., position sensor 1206 of FIG. 12) and/or an accelerometer (e.g., accelerometer 1204 of FIG. 12).

In some implementations, the processor 1202 of FIG. 12 is configured to estimate the neutral position of the subject's chest based on local minima of the product value 1704 when measured for displacement values 1706 as shown in graph 1700. In some implementations, the local product minima are referred to as points of minimum effort.

Local product minima 1708 represent minimum product values respectively for each of product-displacement relationship curves 1702*a-e* during the compression phase. Local product minima 1710 represent minimum product values respectively for each of product-displacement relationship curves 1702*a-e* during the decompression phase.

Figure 17B:
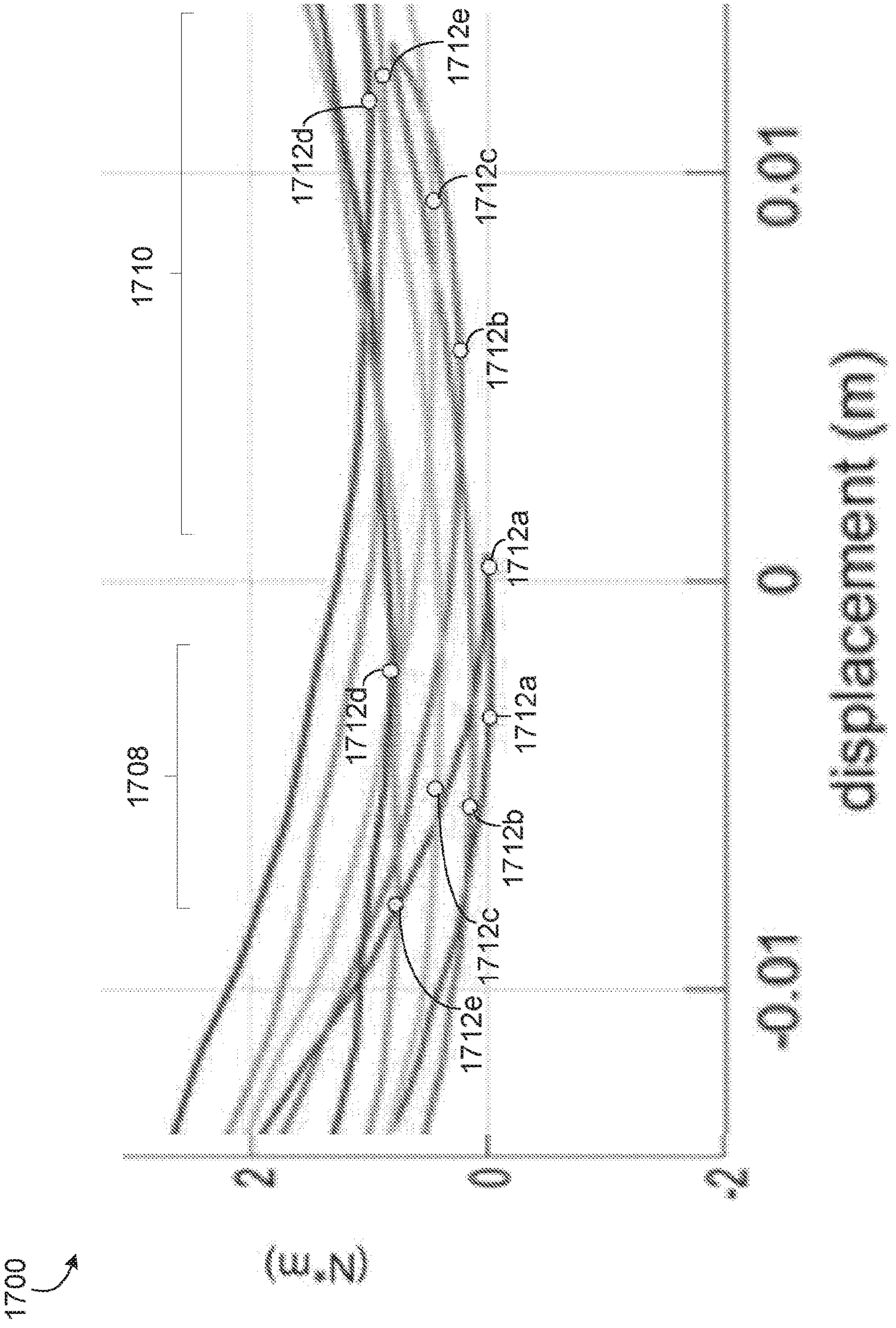

FIG. 17B is a zoomed in portion 1750 of graph 1700. The local product minima 1712*a-e* are marked in pairs for each of the product-displacement relationship curves 1702*a-e*. Local product minima 1712*a* correspond to the product-displacement relationship curve 1702*a*. Local product minima 1712*b* correspond to the product-displacement relationship curve 1702*b*. Local product minima 1712*c* correspond to the product-displacement relationship curve 1702*c*. Local product minima 1712*d* correspond to the product-displacement relationship curve 1702*d*. Local product minima 1712*e* correspond to the product-displacement relationship curve 1702*e*.

In some implementations, the processor 1202 can be configured to estimate the neutral position of the subject's chest as a function of the pair of local minima 1708, 1710, for each of product-displacement relationship curves 1702*a-e*. For example, the estimate of the neutral position of the subject's chest can include an average displacement values corresponding to the local product minima 1712*a-e*, respectively, for each product-displacement relationship curve 1702*a-e*. The average of displacement values corresponding to of local product minima 1712*a-e* are each different in graph 1750. For example, the average of displacement values corresponding to local product minima 1712*a* is slightly less than Om displacement. The average of displacement values corresponding to local product minima 1712*b* is approximately Om displacement. The averages of displacement values corresponding to local product minima 1712*c-e* are slightly greater than 0 m displacement.

In some implementations, the estimate of the neutral position is a weighted function (e.g., a weighted average) of averages of displacement values corresponding to local product minima 1712*a-e*. The weighted function can include a linear function, exponential function, etc. For example, the weighted function can include an expression in which the weights comprise coefficients in a polynomial expression. In one example, the weighting function may be of the form $NP=a_u*x_u+a_d*x_d$, where the weights $a_u$ and $a_d$ adjust the displacement values corresponding to crossing points 1712*a-e*, and where $x_d$ corresponds to the crossing point during the upstroke and $x_d$ corresponds to the crossing point during the downstroke, and where the weights are normalized such that the sum of all the weights equals 1.

For example, weights can be applied to a function relating the local product minima 1712*b* to an estimated neutral position. The value of the weights can be based on historical data (e.g., gathered over time from many patients), dynamically tuned based on prior compression cycles of the current patient, manually adjusted (e.g., calibrated), adjusted based on hardware being used, and so forth.

The weights can be based on prior experimentation and empirical data to determine predetermined weights that result in the best estimation of the neutral position across the widest population of subjects. Alternatively, the predetermined weights may be based on estimates of a particular subject's one or more sternal/thoracic biomechanical parameters, such as compliance, damping, mass, stiffness, viscosity of the chest. Separate models may be estimated for the upstroke and downstroke of the compression cycle. Separate models may be generated for varying depths of compression or decompression. For instance, the weights may be proportional to the relative stiffness, viscosity, damping on the upstroke and downstroke. The weights may be based on the damping at the midpoint of the compression/decompression cycle. The predetermined weights may be further modified by estimates of a particular subject's one or more sternal/thoracic biomechanical parameters.

In some implementations, the estimated neutral position is a displacement value between the displacement values of pairs of local minima 1708, 1710. In some implementations, the estimate of the neutral position can be consistently lower than local minima 1708. In some implementations, the estimate of the neutral position can be consistently greater than local minima 1710. In some implementations, the processor 1202 can output a probability that the neutral position is between local minima 1708, 1710 (e.g., 90% probability, 100% probability, or any percentage value). In some implementations, the processor 1202 can provide a probability that the neutral position of the subject's chest is greater than the displacement value near local minima 1708, less than the displacement value at local minima 1710, or both.

This situation might occur if there has been compression-induced nosocomial injury such as a rib fracture or separation of the sternal cartilage; it may also occur if a ventilation breath is delivered causing a momentary time during the chest compression cycle. Ventilation-induced neutral position variability may be measured and characterized statistically such as by measures such as mean and standard deviation, and a probability that the neutral position is between the local minima can be calculated.

The estimated neutral position values 1214 using the product-displacement local minima 1712*a-e* can be different from the estimated neutral position values using the force-displacement zero force crossing points 1612*a-e*. In some implementations, the neutral position estimations 1214 generated using product-displacement local minima 1708, 1710 and force-displacement zero force crossing points 1612*a-e* can be combined into another function to increase the accuracy of the estimations 1214. For example, the product-displacement local minima 1708, 1710 can be associated with a first weight and the force-displacement zero force crossing points 1612*a-e* can be associated with a second weight, and the neutral position can be a function of both the first and second weights.

Figure 18A:
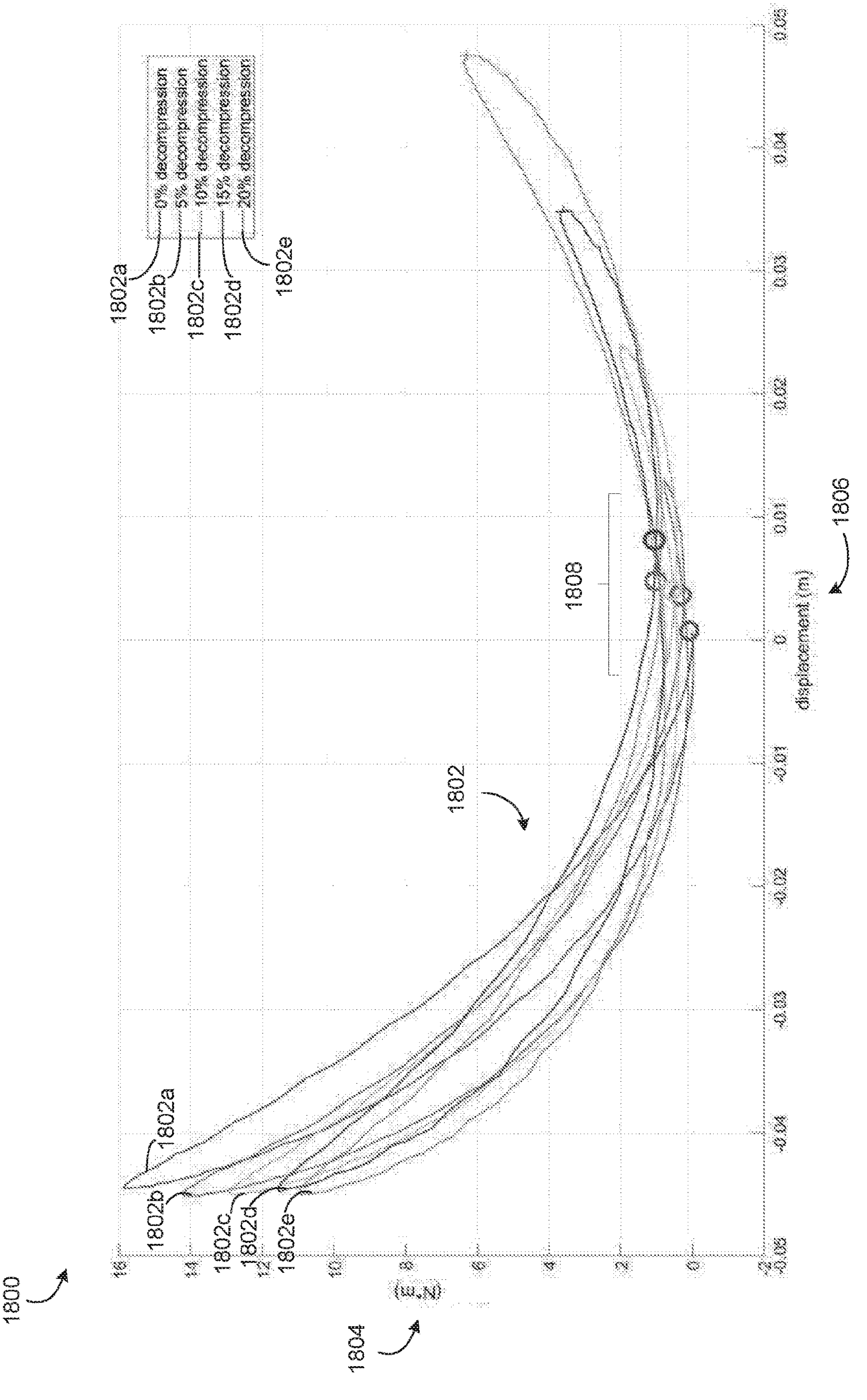
FIGS. 18A-18B show example graphs depicting relationships between work and displacement during a plurality of compression cycles for estimating a neutral position of a patient.

Turning to FIG. 18A, a graph 1800 includes product-displacement relationship curves 1802*a-e*. The product-displacement relationship curves 1802*a-e* show a relationship between displacement values 1806 of a subject's chest and corresponding product values 1804 of forces applied to the subject's chest during ACD compression cycles. In other words, the product-displacement relationship curves 1802*a-e* each the amount of effort at each displacement value of the chest of the subject. At a particular displacement value for each decompression percentage value, the effort is equal for both decompression and compression. This is shown at crossing points 1808 of FIG. 18A and can be referred to as the equal-effort value.

Each of the product-displacement relationship curves 1802*a-e* represents the product-displacement relationship for a compression cycle at a different decompression percentage value. Product-displacement relationship curve 1802*a* represents the product-displacement relationship at 20% compression and 0% decompression above the zero point. Product-displacement relationship curve 1802*b* represents the product-displacement relationship at 20% compression and 5% decompression above the zero point. Product-displacement relationship curve 1802*c* represents the product-displacement relationship at 20% compression and 10% decompression above the zero point. Product-displacement relationship curve 1802*d* represents the product-displacement relationship at 20% compression and 15% decompression above the zero point. Product-displacement relationship curve 1802*e* represents the product-displacement relationship at 20% compression and 20% decompression above the zero point.

In some implementations, the product values 1804 of the product-displacement relationship curves 1802*a-e* are determined based on measurements from a force sensor (e.g., force sensor 1208 of FIG. 12). In some implementations, the displacement values 1806 of the product-displacement relationship curves 1802*a-e* are determined based on measurements by a position sensor (e.g., position sensor 1206 of FIG. 12) and/or an accelerometer (e.g., accelerometer 1204 of FIG. 12).

In some implementations, the processor 1202 of FIG. 12 is configured to estimate the neutral position of the subject's chest based displacement values corresponding to crossing points 1808 of the product-displacement relationship curves 1802*a-e*, as shown in graph 1800. The crossing points 1808 represent displacement values where the force applied to the subject's chest is the same for a particular displacement value during both compression and decompression phases.

Figure 18B:
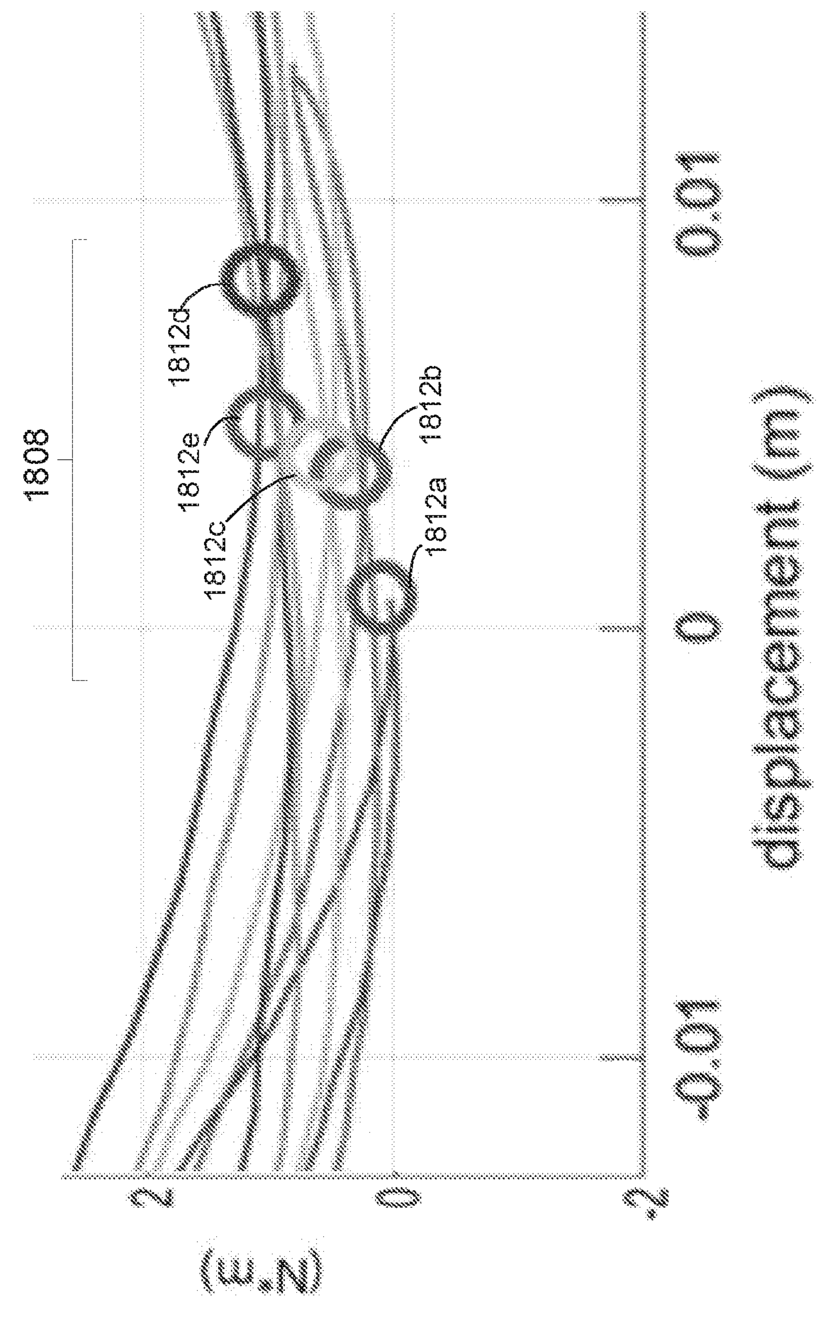

FIG. 18B is a zoomed in portion 1850 of graph 1800. The crossing points 1812*a-e* are marked for each of the product-displacement relationship curves 1802*a-e*. Crossing point 1812*a* corresponds to the product-displacement relationship curve 1802*a*. Crossing point 1812*b* corresponds to the product-displacement relationship curve 1802*b*. Crossing point 1812*c* corresponds to the product-displacement relationship curve 1802*c*. Crossing point 1812*d* corresponds to the product-displacement relationship curve 1802*d*. Crossing point 1812*e* corresponds to the product-displacement relationship curve 1802*e*.

In some implementations, the processor 1202 can be configured to estimate the neutral position of the subject's chest as a function of the crossing points 1812*a-e*, for each of product-displacement relationship curves 1802*a-e*. For example, the estimate 1214 of the neutral position of the subject's chest can include a displacement value corresponding each of the crossing points 1812*a-e*, respectively, for each product-displacement relationship curve 1802*a-e*. The corresponding displacement values for each of crossing points 1812*a-e* are each different in graph 1850. For example, the displacement value corresponding to crossing point 1812*a* is slightly greater than 0 m displacement. The displacement values corresponding to crossing points 1812*b*, 1812*c*, and 1812*d* are approximately 0.005 m displacement. The displacement value corresponding to crossing point 1812*e* is slightly less than 0.01 m displacement.

In some implementations, the estimate 1214 of the neutral position includes a weighted function (e.g., a weighted average) of displacement values corresponding to crossing points 1812*a-e*. For example, weights can be applied to a function relating the crossing point 1812*b* to an estimated neutral position. The value of the weights can be based on historical data (e.g., gathered over time from many patients), dynamically tuned based on prior compression cycles of the current patient, manually adjusted (e.g., calibrated), adjusted based on hardware being used, and so forth.

The weights can be based on prior experimentation and empirical data to determine predetermined weights that result in the best estimation of the neutral position across the widest population of subjects. Alternatively, the predetermined weights may be based on estimates of a particular subject's one or more sternal/thoracic biomechanical parameters, such as compliance, damping, mass, stiffness, viscosity of the chest. Separate models may be estimated for the upstroke and downstroke of the compression cycle. Separate models may be generated for varying depths of compression or decompression. For instance, the weights may be proportional to the relative stiffness, viscosity, damping on the upstroke and downstroke. The weights may be based on the damping at the midpoint of the compression/decompression cycle. The predetermined weights may be further modified by estimates of a particular subject's one or more sternal/thoracic biomechanical parameters.

In one example, the weighting function may be of the form $NP=a_u*x_u+a_d*x_d$, where the weights $a_u$ and $a_d$ adjust the displacement values corresponding to crossing points 1812*a-e*, and where $x_d$ corresponds to the crossing point during the upstroke and $x_d$ corresponds to the crossing point during the downstroke, and where the weights are normalized such that the sum of all the weights equals 1.

In some implementations, the estimate of the neutral position can be consistently greater than or less than local crossing points 1812*a-e*. In some implementations, the processor 1202 can output a probability that the neutral position is greater than or less than one or more of crossing points 1812*a-e* or a function of crossing points 1812*a-e* (e.g., 90% probability, 100% probability, or any percentage value). In some implementations, the processor 1202 can provide a probability that the neutral position of the subject's chest is greater than the displacement value near crossing points 1808, less than the displacement value near crossing points 1808, or both.

The estimated neutral position values 1214 using the crossing values 1812*a-e* can be different than the estimated neutral position values using the force-displacement zero crossing points 1612*a-e* and/or the product-displacement local minima 1712*a-e*. In some implementations, the neutral position estimations 1214 generated using product-displacement local minima 1712*a-e*, force-displacement zero crossing points 1612*a-e*, and crossing values 1812*a-e* can be combined into another function to increase the accuracy of the estimations 1214. In one example, the function is a weighting function as describe above.

Figure 19A:
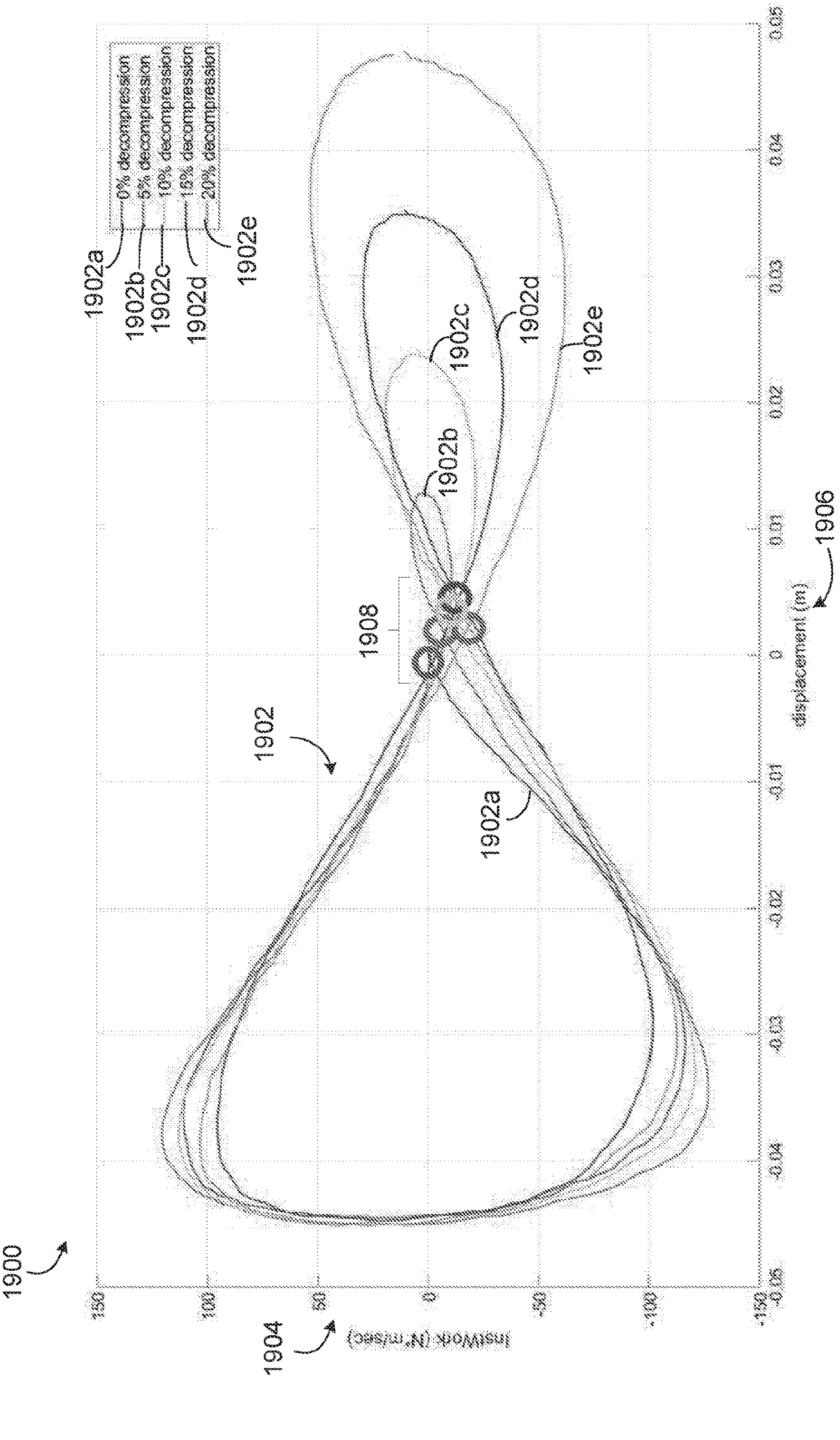
FIGS. 19A-19B show example graphs depicting a relationship between instantaneous work and displacement during a plurality of compression cycles for estimating a neutral position of a patient.

Turning to FIG. 19A, a graph 1900 includes relationship curves 1902*a-e* that involve the displacement and the time derivative of the force-displacement product (or instant force-displacement product), which may be referred to as differential product-displacement relationship curves. The instant product-displacement relationship curves 1902*a-e* show a relationship between displacement values 1906 of a subject's chest and corresponding instantaneous force-displacement product values 1904 of forces applied to the subject's chest during ACD compression cycles. In other words, the product-displacement relationship curves 1902*a-e* each represent a change in the amount of effort at each displacement value of the chest of the subject. At a particular displacement value for each decompression percentage value, the change in effort is equal for both decompression and compression. This is shown at crossing points 1908 of FIG. 19A and can be referred to as the equal-effort rate value.

Each of the instant product-displacement relationship curves 1902*a-e* represents the instant product-displacement relationship for a compression cycle at a different decompression percentage value. Instant product-displacement relationship curve 1902*a* represents the instant product-displacement relationship at 20% compression and 0% decompression above the zero point. Instant product-displacement relationship curve 1902*b* represents the instant product-displacement relationship at 20% compression and 5% decompression above the zero point. Instant product-displacement relationship curve 1902*c* represents the instant product-displacement relationship at 20% compression and 10% decompression above the zero point. Instant product-displacement relationship curve 1902*d* represents the instant product-displacement relationship at 20% compression and 15% decompression above the zero point. Instant product-displacement relationship curve 1902*e* represents the instant product-displacement relationship at 20% compression and 20% decompression above the zero point.

In some implementations, the product values 1904 of the instant product-displacement relationship curves 1902*a-e* are determined based on measurements from a force sensor (e.g., force sensor 1208 of FIG. 12). In some implementations, the displacement values 1906 of the product-displacement relationship curves 1902*a-e* are determined based on measurements by a position sensor (e.g., position sensor 1206 of FIG. 12) and/or an accelerometer (e.g., accelerometer 1204 of FIG. 12).

In some implementations, the processor 1202 of FIG. 12 is configured to estimate the neutral position of the subject's chest based displacement values corresponding to crossing points 1908 of the product-displacement relationship curves 1902*a-e*, as shown in graph 1900. The crossing points 1908 represent displacement values where the time derivative of the force-displacement product applied to the subject's chest is the same for a particular displacement value during both compression and decompression phases.

Figure 19B:
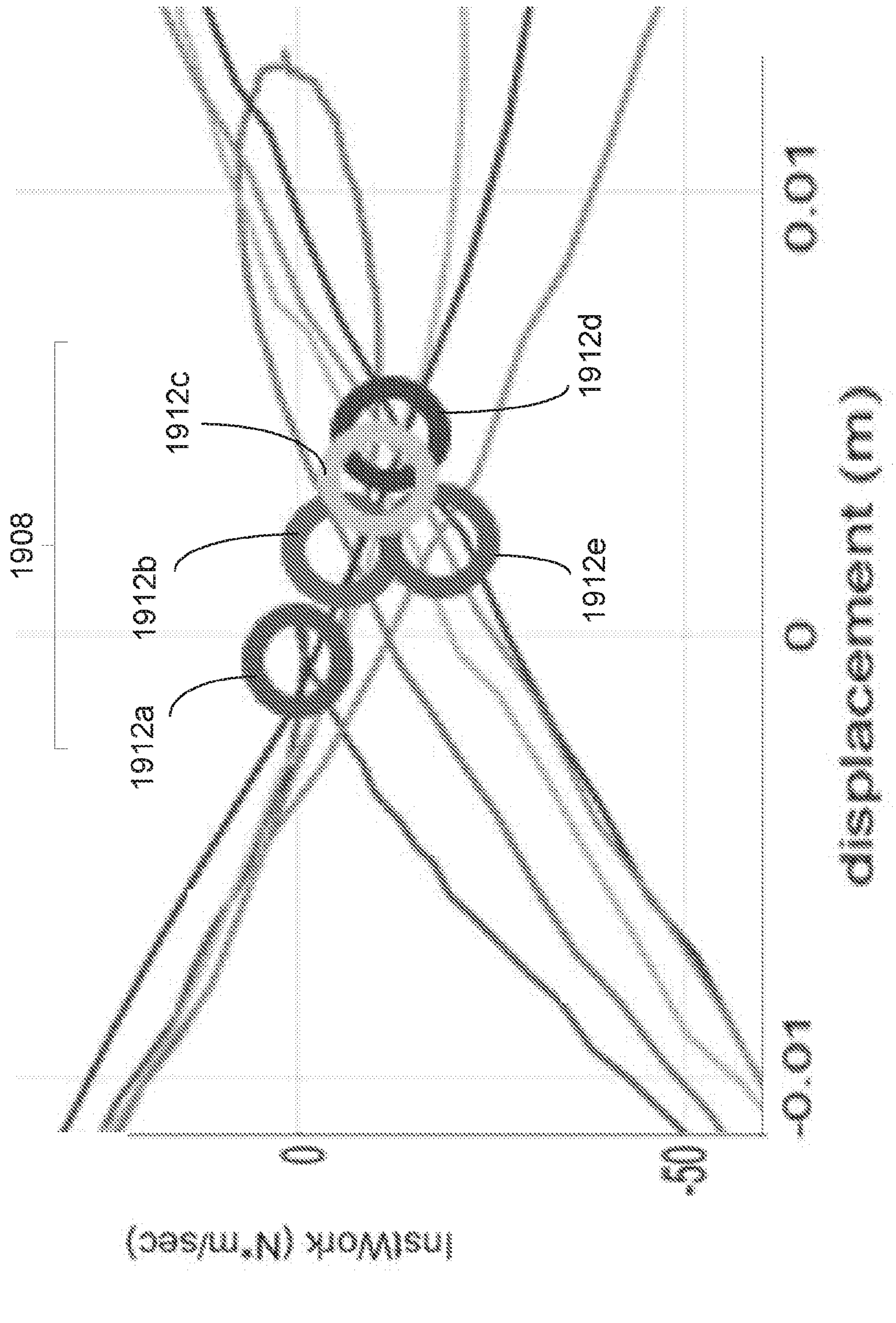

FIG. 19B is a zoomed in portion 1950 of graph 1900. The crossing points 1912*a-e* are marked for each of the instant product-displacement relationship curves 1902*a-e*. Crossing point 1912*a* corresponds to the instant product-displacement relationship curve 1902*a*. Crossing point 1912*b* corresponds to the instant product-displacement relationship curve 1902*b*. Crossing point 1912*c* corresponds to the instant product-displacement relationship curve 1902*c*. Crossing point 1912*d* corresponds to the instant product-displacement relationship curve 1902*d*. Crossing point 1912*e* corresponds to the instant product-displacement relationship curve 1902*e*.

In some implementations, the processor 1202 can be configured to estimate the neutral position of the subject's chest as a function of the crossing points 1912*a-e*, for each of instant product-displacement relationship curves 1902*a-e*. For example, the estimate 1214 of the neutral position of the subject's chest can include a displacement value corresponding each of the crossing points 1912*a-e*, respectively, for each instant product-displacement relationship curve 1902*a-e*. The corresponding displacement values for each of crossing points 1912*a-e* are each different in graph 1950. For example, the displacement value corresponding to crossing point 1912*a* is slightly less than 0 m displacement. The displacement values corresponding to crossing points 1912*b-e* are slightly greater than 0 m displacement. In such a case, the neutral position is estimated at a point at which the rate of change in the administered effort (product of force and displacement) is independent of direction and hence is equal in the compression and decompression phases of an ACD cycle.

In some implementations, the estimate 1214 of the neutral position includes a weighted function (e.g., a weighted average) of displacement values corresponding to crossing points 1912*a-e*. For example, weights can be applied to a function relating the crossing point 1912*b* to an estimated neutral position. The value of the weights can be based on historical data (e.g., gathered over time from many patients), dynamically tuned based on prior compression cycles of the current patient, manually adjusted (e.g., calibrated), adjusted based on hardware being used, and so forth.

The weights can be based on prior experimentation and empirical data to determine predetermined weights that result in the best estimation of the neutral position across the widest population of subjects. Alternatively, the predetermined weights may be based on estimates of a particular subject's one or more sternal/thoracic biomechanical parameters, such as compliance, damping, mass, stiffness, viscosity of the chest. Separate models may be estimated for the upstroke and downstroke of the compression cycle. Separate models may be generated for varying depths of compression or decompression. For instance, the weights may be proportional to the relative stiffness, viscosity, damping on the upstroke and downstroke. The weights may be based on the damping at the midpoint of the compression/decompression cycle. The predetermined weights may be further modified by estimates of a particular subject's one or more sternal/thoracic biomechanical parameters.

In one example, the weighting function may be of the form $NP=a_u*x_u+a_d*x_d$, where the weights $a_u$ and $a_d$ adjust the displacement values corresponding to crossing points 1912*a-e*, and where $x_d$ corresponds to the crossing point during the upstroke and $x_d$ corresponds to the crossing point during the downstroke, and where the weights are normalized such that the sum of all the weights equals 1.

In some implementations, the estimate of the neutral position can be consistently greater than or less than local crossing points 1912*a-e*. In some implementations, the processor 1202 can output a probability that the neutral position is greater than or less than one or more of crossing points 1912*a-e* or a function of crossing points 1912*a-e* (e.g., 90% probability, 100% probability, or any percentage value).

This situation might occur if there has been compression-induced nosocomial injury such as a rib fracture or separation of the sternal cartilage; it may also occur if a ventilation breath is delivered causing a momentary time during the chest compression cycle. Ventilation-induced neutral position variability may be measured and characterized statistically such as by measures such as mean and standard deviation, and a probability that the neutral position is between the local minima can be calculated.

The estimated neutral position values 1214 using the crossing values 1912*a-e* can be different than the estimated neutral position values using the force-displacement zero crossing points 1612*a-e*, the product-displacement local minima 1712*a-e*, and/or the crossing values 1812*a-e*. In some implementations, the neutral position estimations 1214 generated using product-displacement local minima 1712*a-e*, force-displacement zero crossing points 1612*a-e*, crossing values 1812*a-e*, and crossing values 1912*a-e* can be combined into another function to increase the accuracy of the estimations 1214. In one example, the function is a weighting function as describe above.

Figure 20:
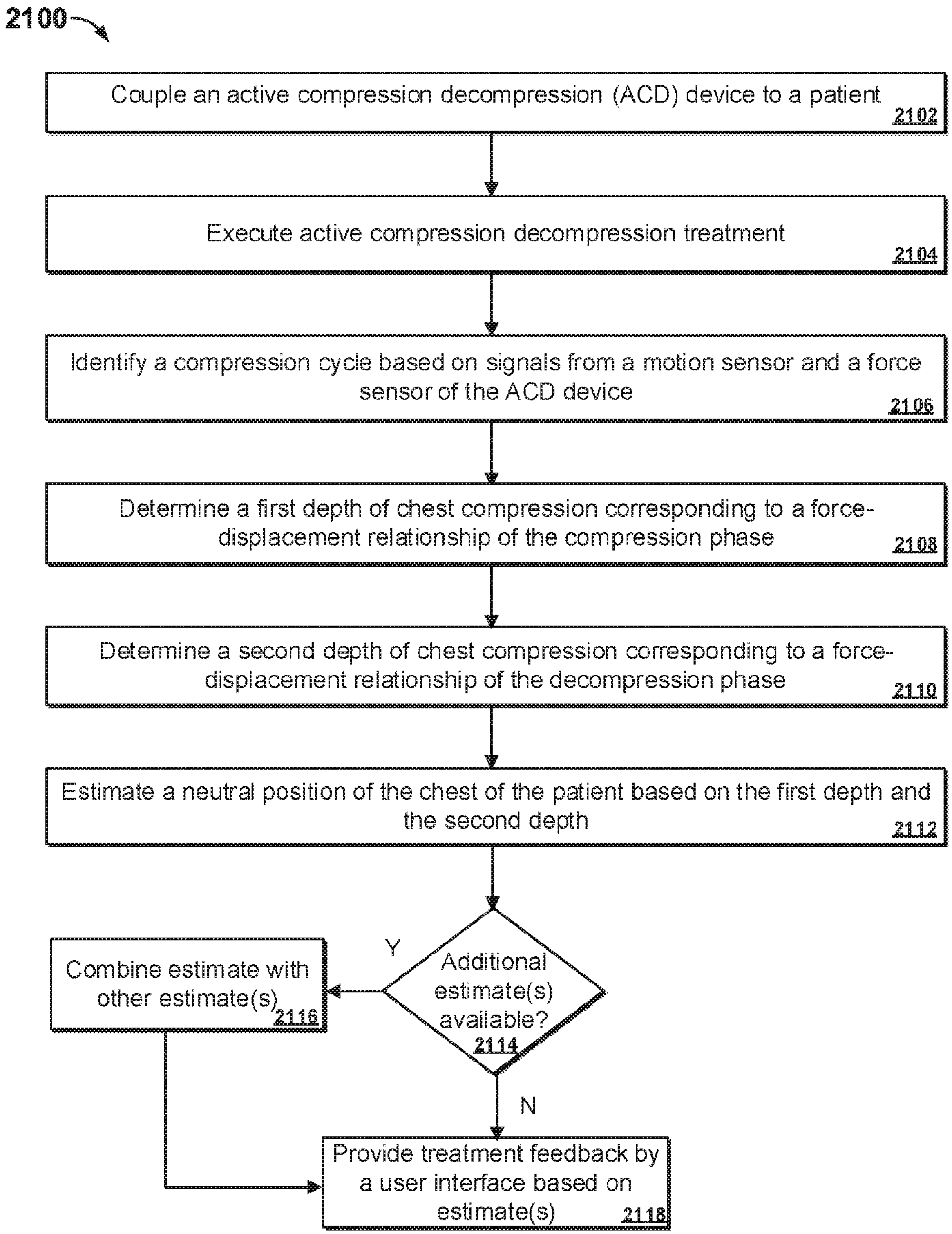
FIGS. 20-23 show flow diagrams of example processes for estimating a neutral position by an ACD device.

FIG. 20 shows an example process 2100 for estimating a neutral position of a patient during ACD treatment using relationship between a force applied to the patient's chest and a displacement of the patient's chest during compressions. Such a process may be applicable for ACD treatment that is manually applied to a patient via a caregiver, and ACD treatment that is automatically applied to the patient without the manual effort of ACD applied by a caregiver. The ACD device 1200 is coupled (2102) to the patient. Then, processor 1202 is configured to estimate the neutral position of the patient. Processor 1202 is configured to execute (2104) active compression decompression treatment on the patient including compression cycles. The processor 1202 is configured to identify (2106) a compression cycle based on signals from a motion sensor and a force sensor of the ACD device. The processor 1202 is configured to determine (2108) a first depth of chest compression corresponding to a force-displacement relationship of the compression phase. The processor 1202 is configured to determine (2110) a second depth of chest compression corresponding to a force-displacement relationship of the decompression phase. The processor 1202 is configured to estimate (2112) a neutral position of the chest of the patient based on the first depth and the second depth (e.g., a first displacement and a second displacement). In some implementations, the first and second displacements can correspond to any one or combination of points 1612*a-e*, 1712*a-e*, 1812*a-e*, and/or 1912*a-e*. The processor 1202 is configured to determine (2214) whether additional estimate(s) available (e.g., prior estimates over time using process 2100 or other processes or both). If so, the processor 1202 is configured to combine (2216) the estimate with other estimate(s) (e.g., a running average, sliding average, etc.). The processor 1202 is configured to provide (2218) treatment feedback by a user interface based on the estimate(s).

Figure 21:
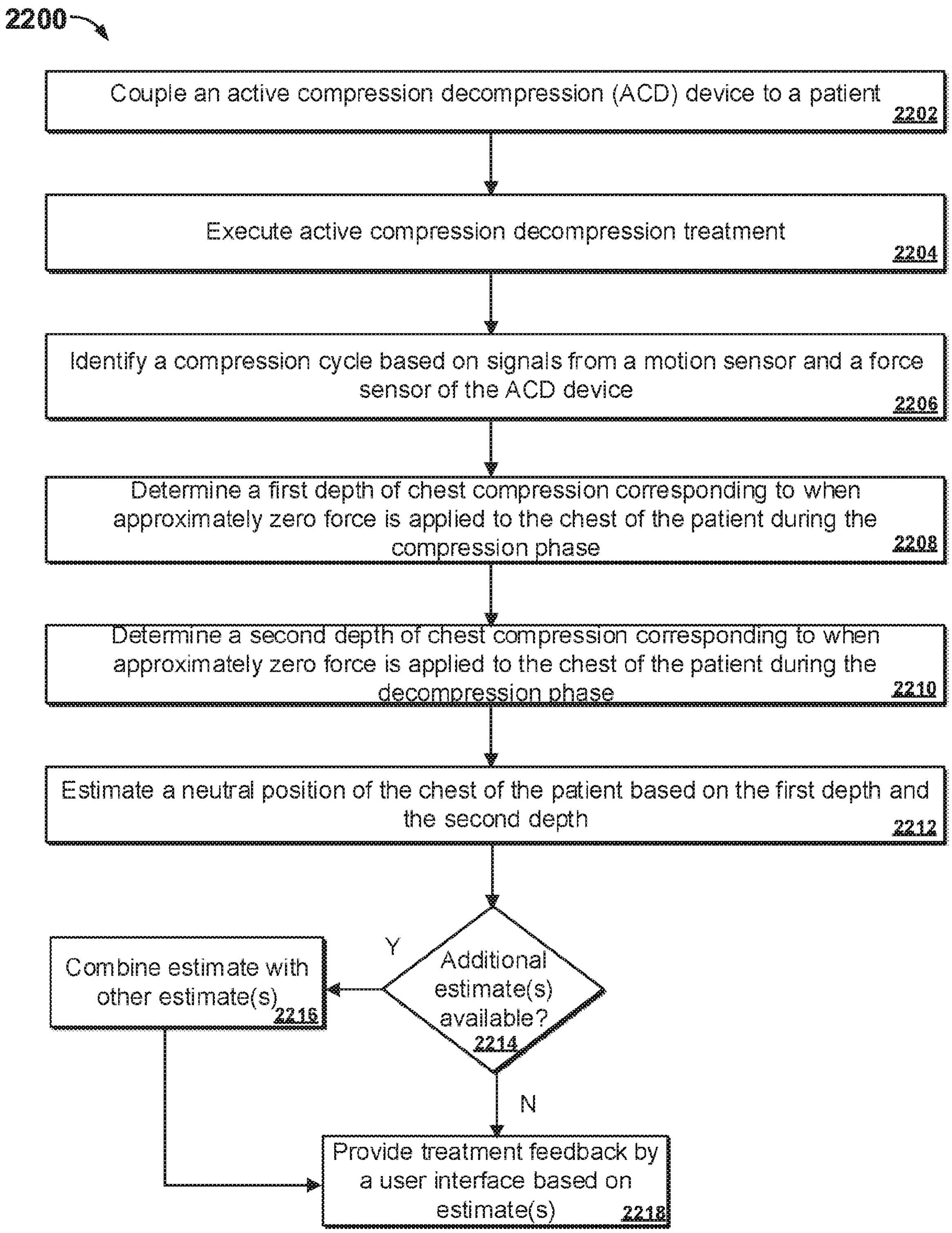

FIG. 21 shows an example process 2200 for estimating a neutral position of a patient during ACD treatment based on forces applied to the patient's chest during compressions, specifically relating to when the force applied to the chest of the patient is approximately zero. As discussed herein, this process may be applicable for ACD treatment that is manually applied to a patient via a caregiver, and ACD treatment that is automatically applied to the patient without the manual effort of ACD applied by a caregiver. The ACD device 1200 is coupled (2202) to the patient. Then, processor 1202 is configured to estimate the neutral position of the patient. Processor 1202 is configured to execute (2204) active compression decompression treatment on the patient including compression cycles. The processor 1202 is configured to identify (2206) a compression cycle based on signals from a motion sensor and a force sensor of the ACD device 1200. The processor 1202 is configured to determine (2208) a first depth of chest compression corresponding to when approximately zero force is applied to the chest of the patient during the compression phase. The processor 1202 is configured to determine (2210) a second depth of chest compression corresponding to when approximately zero force is applied to the chest of the patient during the decompression phase. The processor 1202 is configured to estimate (2212) a neutral position of the chest of the patient based on the first depth and the second depth (e.g., a first displacement and a second displacement). In some implementations, the first and second displacements can correspond to any one of points 1612*a-e*. The processor 1202 is configured to determine (2214) whether additional estimate(s) available (e.g., prior estimates over time using process 2200 or other processes or both). If so, the processor 1202 is configured to combine (2216) the estimate with other estimate(s) (e.g., a running average, sliding average, etc.). The processor 1202 is configured to provide (2218) treatment feedback by a user interface based on the estimate(s).

Figure 22:
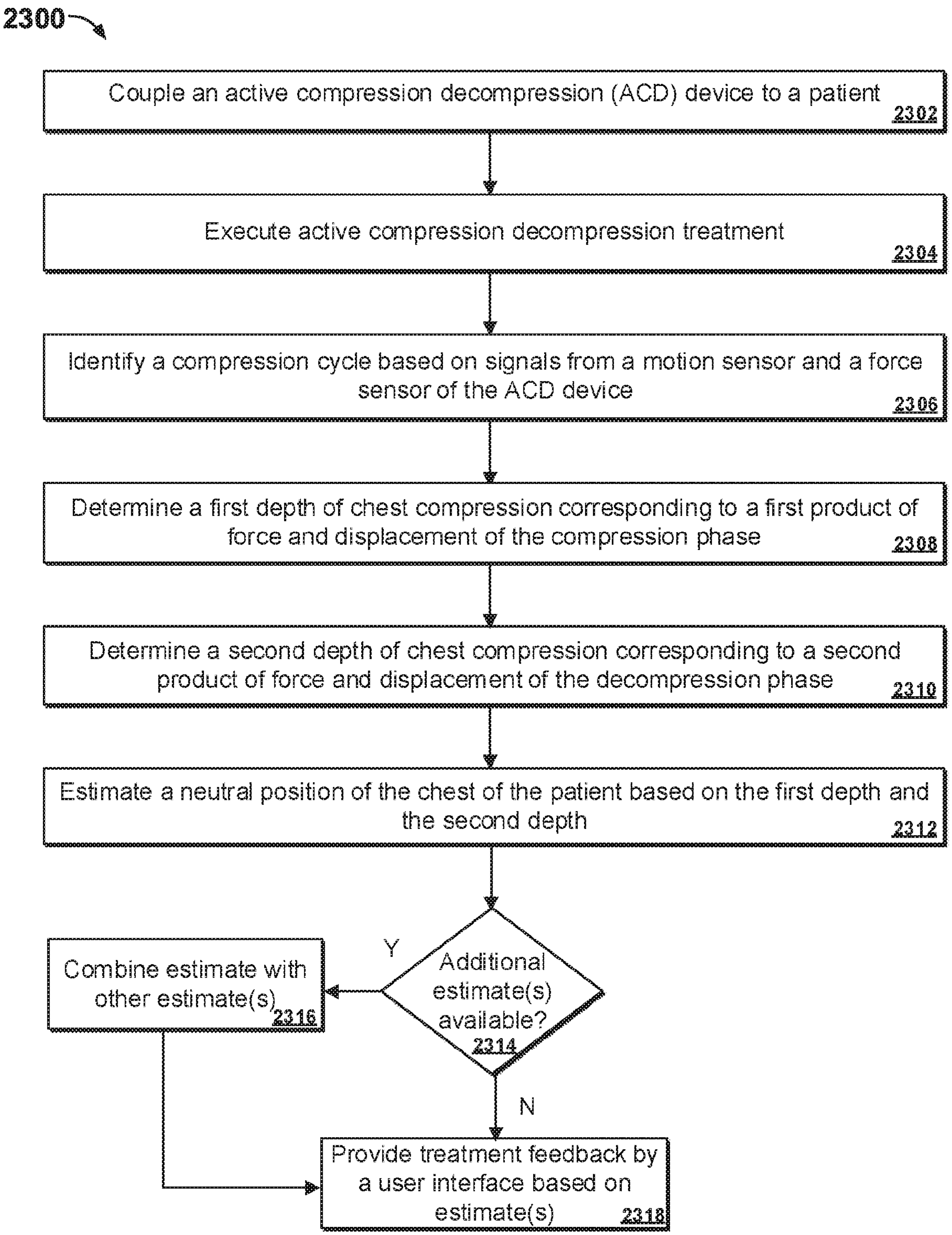

FIG. 22 shows an example process 2300 for estimating a neutral position of a patient during ACD treatment based on a product of a force value of a force applied to the chest of the patient and a displacement value of the displacement of the patient's chest. This process may be applicable for ACD treatment that is manually applied to a patient via a caregiver, and ACD treatment that is automatically applied to the patient without the manual effort of ACD applied by a caregiver. The ACD device 1200 is coupled (2302) to the patient. Then, processor 1202 is configured to estimate the neutral position of the patient. Processor 1202 is configured to execute (2304) active compression decompression treatment on the patient including compression cycles. The processor 1202 is configured to identify (2306) a compression cycle based on signals from a motion sensor and a force sensor of the ACD device 1200. The processor 1202 is configured to determine (2308) a first depth of chest compression corresponding to a first product of force and displacement of the compression phase. The processor 1202 is configured to determine (2310) a second depth of chest compression corresponding to a second product of force and displacement of the decompression phase. The processor 1202 is configured to estimate (2312) a neutral position of the chest of the patient based on the first depth and the second depth (e.g., a first displacement and a second displacement). In some implementations, the first and second displacements can correspond to any one of points 1712*a-e* and/or points 1812*a-e*. The processor 1202 is configured to determine (2314) whether additional estimate(s) available (e.g., prior estimates over time using process 2300 or other processes or both). If so, the processor 1202 is configured to combine (2316) the estimate with other estimate(s) (e.g., a running average, a sliding average, etc.). The processor 1202 is configured to provide (2318) treatment feedback by a user interface based on the estimate(s).

Figure 23:
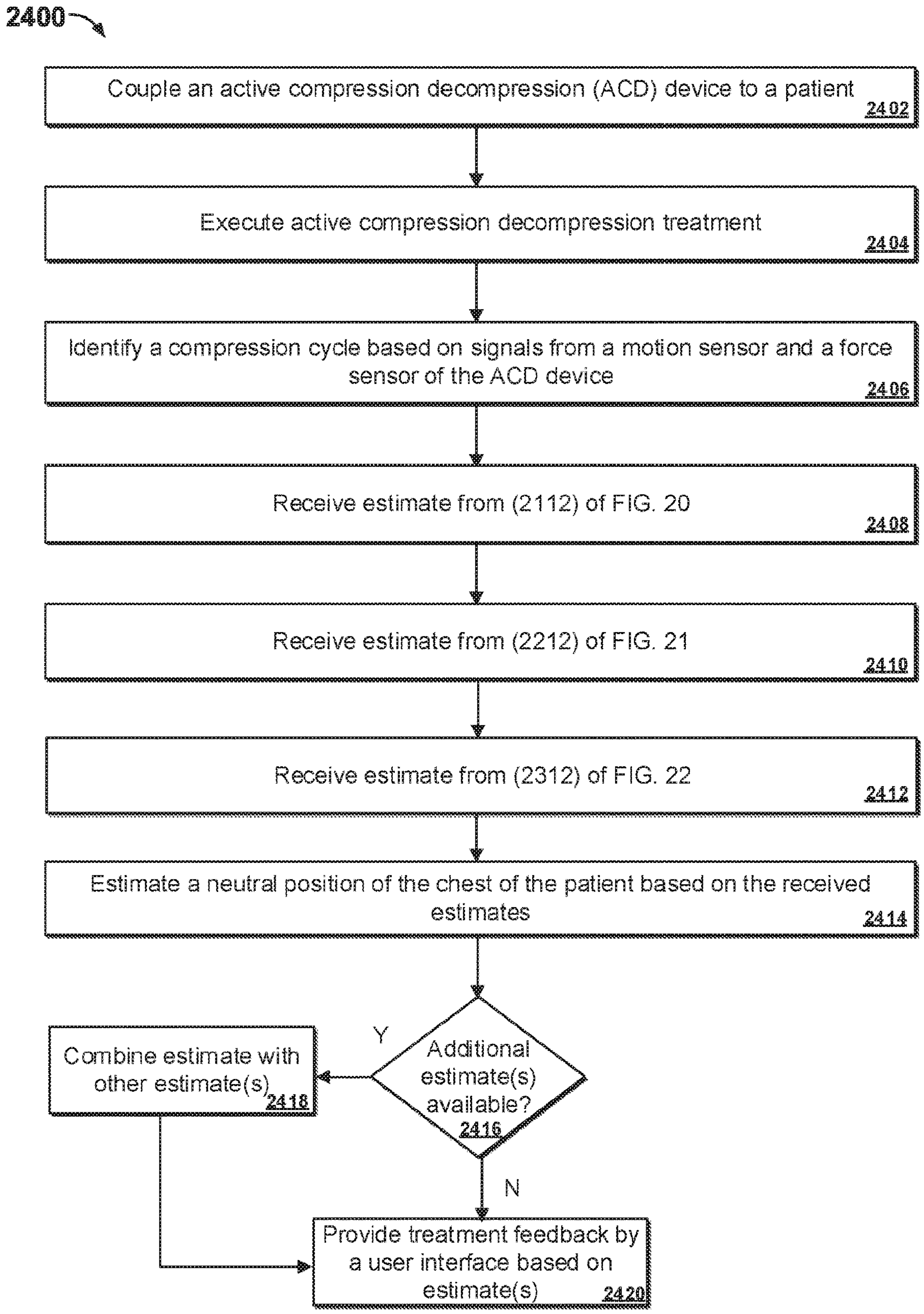

FIG. 23 shows an example process 2400 for estimating a neutral position of a patient during ACD treatment based on a combination of the processes 2000, 2100, and 2200 described in relation to FIGS. 20-22. The ACD device 1200 is coupled (2402) to the patient. Then, processor 1202 is configured to estimate the neutral position of the chest of the patient. Processor 1202 is configured to execute (2404) active compression decompression treatment on the patient including compression cycles. The processor 1202 is configured to identify (2406) a compression cycle based on signals from a motion sensor and a force sensor of the ACD device 1200.

The processor 1202 is configured to receive (2408) an estimate calculated at step 2112 of FIG. 20. The processor 1202 is configured to receive (2410) an estimate calculated at step 2212 of FIG. 21. The processor 1202 is configured to receive (2412) an estimate calculated at step 2312 of FIG. 22. The processor 1202 is configured to estimate (2414) a neutral position of the chest of the patient based on the received estimates at steps 2408, 2410, and 2412, such as by using an average, a weighted average, or other function to combine the estimates. The processor 1202 is configured to determine (2416) whether additional estimate(s) available (e.g., prior estimates over time using process 2400 or other processes or both). If so, the processor 1202 is configured to combine (2418) the estimate with other estimate(s) (e.g., a running average, a sliding average, etc.). The processor 1202 is configured to provide (2420) treatment feedback by a user interface based on the estimate(s).

Discussed herein, as the chest undergoes significant forces during CPR, during the application of compressions and decompressions, the chest will undergo remodeling and, hence, the neutral position of the chest generally can change. For example, when repetitive chest compressions are applied to the chest, the neutral position of the chest will naturally move downward, and so it may be clinically desirable for the manner in which CPR is applied to be adjusted depending on how the neutral position shifts.

As embodiments of the present disclosure describe methods in which the neutral position of the chest may be estimated during the course of CPR (e.g., via displacement and force sensing), the estimated neutral position may be used to determine at least one target displacement range (e.g., target depth range on compression downstroke, target lift range on decompression upstroke) while CPR is being administered. That is, the target downstroke displacement (also called compression depth) and/or target upstroke displacement (also called decompression displacement or decompression lift) may be adjusted in a suitable manner using the estimated neutral position as an input for the target(s).

The estimated neutral position may also be used to determine at least one target force range (e.g., target force range on compression downstroke, target force range on decompression upstroke) while CPR is being administered. For example, the target downstroke force and/or target upstroke force may be adjusted using the estimated neutral position as an input for the target(s). In some embodiments, the feedback that is given to the user may be for the user to use more or less force on upstroke or downstroke depending on whether the target displacement and/or force ranges are met. Or, the feedback may prompt the user to achieve deeper or shallower displacements on upstroke or downstroke depending on whether the target displacement and/or force ranges are met. For example, if the compression depth is too shallow (less in magnitude than the target compression depth), then the user may be prompted to press harder. Or, if the decompression lift displacement is too small, then the user may be prompted to lift with a greater force.

Accordingly, the target(s) for compression depth and the decompression lift may be updated repeatedly as the estimated neutral position is updated. For instance, if the neutral position of the chest becomes significantly depressed (i.e., moves significantly downward), it may be advisable for the chest to be lifted or decompressed more than would otherwise be the case. As an example, it may be desirable for the ACD treatment to be modified so that the neutral position is brought back toward the estimated zero point of the chest when compressions had initially begun. This added decompression may have an effect to further enhance circulation, possibly by allowing for balanced flow to and from the heart. Or, if the neutral position of the chest moves upward past a point of natural resting equilibrium of the chest (e.g., due to significant upward force exerted on the chest), then it may be preferable for more compression or less decompression to be applied to the chest.

The compression depth and the decompression lift can be determined independent of methods described above with respect to determining the neutral position of the chest of the patient. For example, the compression depth and the decompression lift can be determined by measuring a compression force and a decompression force applied to the patient during a compression cycle. Using the measured compression force(s) and the measured decompression force(s), the ACD device (e.g., ACD device 100, ACD device 1200, etc.) can be configured to determine what fraction of a total displacement of the chest of the patient corresponds to the depth of compression of the patient's chest. This also determines what fraction of the total displacement of the chest of the patient corresponds to the decompression displacement or lift of the patient's chest, which is a corresponding value to the compression displacement.

The ACD device, or corresponding processing system such as a patient monitor, defibrillator, portable computing device, other computing device that is used for processing of ACD related information, is configured to multiply the compression fraction by the total travel to obtain compression depth. The compression force and the decompression force can be measured using a force sensor (e.g., force sensor 402, force sensor 1208, etc.). The force sensor can include a load cell that is coupled to signal processing and filtering circuitry and the Analog-to-Digital Converter (ADC) device. The total displacement can be measured by a displacement sensor, such as an optical encoder, linear potentiometer, laser interferometer, magnetic field-based distance sensor or other distance encoding sensor. In some implementations, the displacement can be approximated by using a motion sensor (e.g., accelerometer, velocity sensor), as previously described.

More specifically, the compression depth and the decompression lift can be determined by determining a maximum compression force applied to the patient's chest during a chest compression and determining a maximum decompression force applied to the patient's chest during a chest decompression. Generally, force applied during active compression decompression of the chest of the patient reaches a maximum compression value (in magnitude) when the chest is at a maximum compression depth, and force applied reaches a maximum decompression value (in magnitude) when to the chest is at a maximum decompression lift. For some implementations, the maximum force values (for each of compression force and decompression force) are static and not influenced by any variability in the stiffness of the mechanical system, such as the variability introduced by an elastic plunger of the ADC device.

The value of the peak force at maximum decompression lift and at maximum compression depth may be correlated to the stiffness of the chest. If a patient's chest has increased stiffness (e.g., relative to another stiffness of a patient's chest), the greater the maximum (e.g., peak) compression and decompression forces will be at a given chest displacement.

Figure 24A:
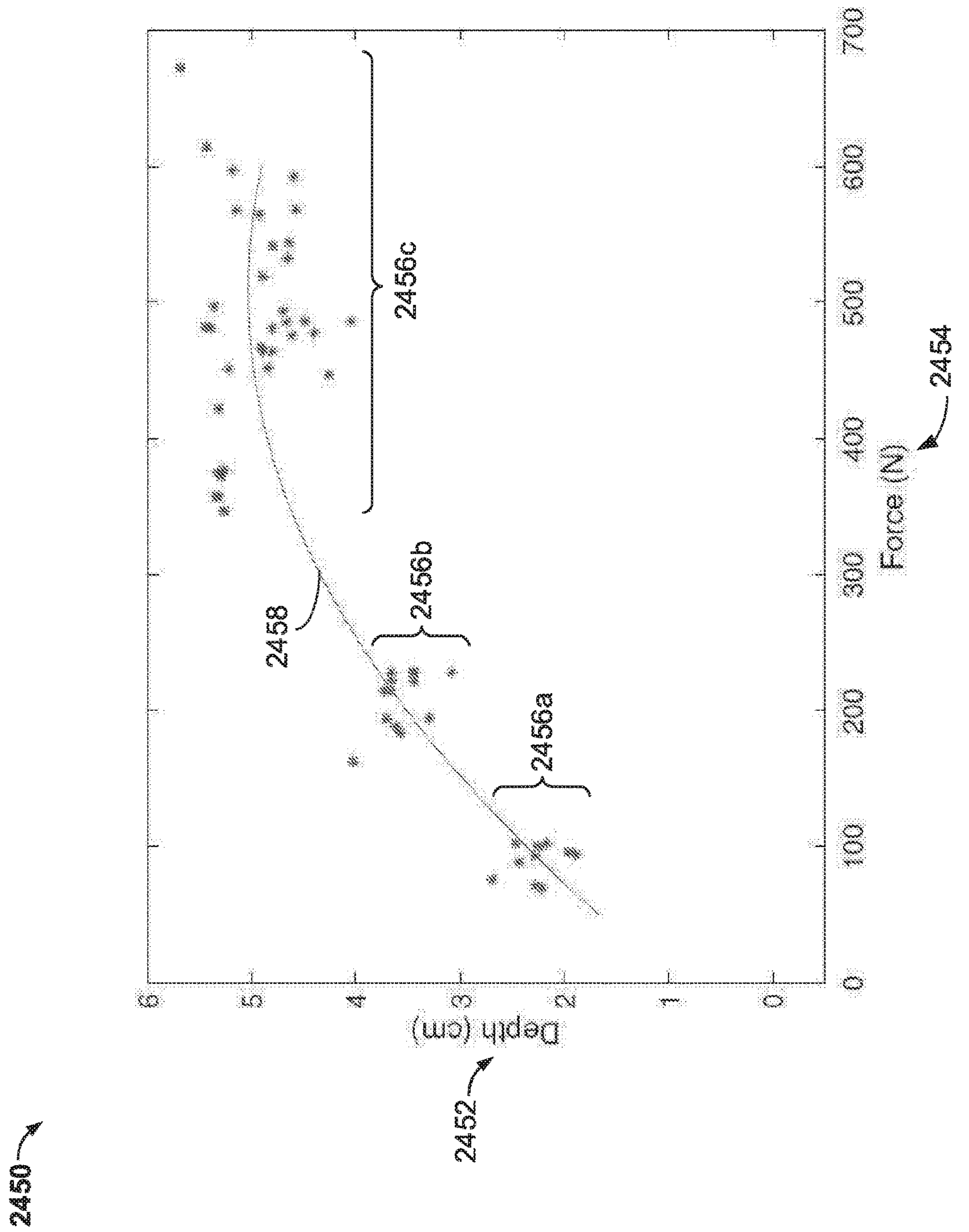
FIGS. 24A-24B show graphs illustrating peak compression and lift forces associated with ACD chest compressions of a patient.

FIG. 24A shows a graph 2450 illustrating peak compression forces associated with chest compressions of a patient. In the graph 2450, the compression depth ($d_C$) 2452 is shown in centimeters (cm) as a function of maximum compression force ($f_C$) 2454, shown in Newtons (N). The ACD device (or a similar device for generating model data) can be used to compress and decompress the patient's chest to obtain compression force values 2456*a*, 2456*b*, and 2456*c* of the compression force 2454 for different compression depths 2452. The ACD device can include a displacement sensor, such as an encoder, to obtain this data. A function 2458 is generated to model the relationship between the compression force 2454 and the compression depth 2452. In graph 2450, the function 2458 is a quadratic function. However, the function 2458 can be a higher-order function, such as a cubic function, $4^{th}$ degree function, $n^{th}$ degree function, spline or exponential function. Such a function may include constants that are determined by a training model (e.g., curve fitting to the data).

Figure 24B:
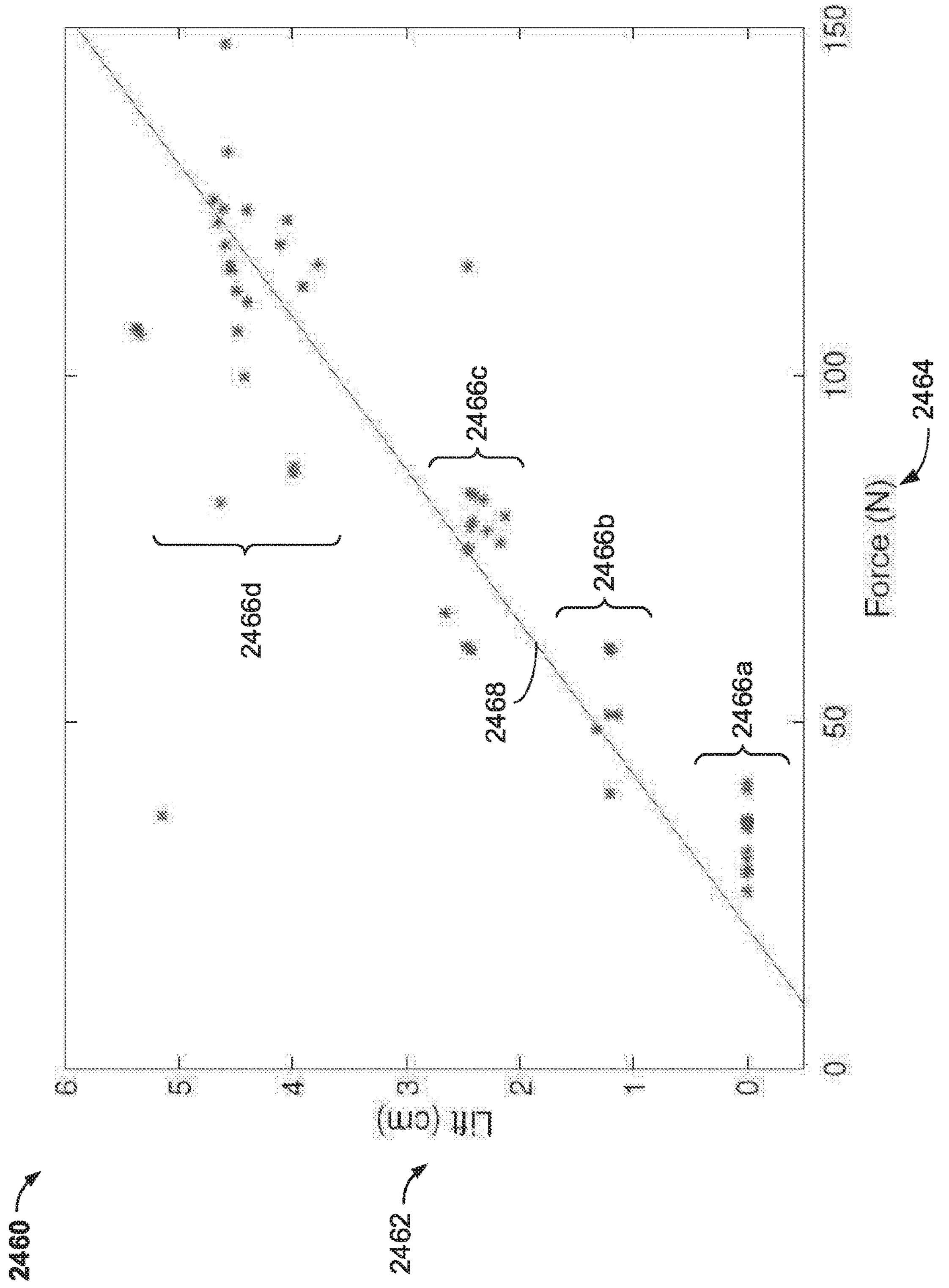

Similarly, FIG. 24B shows a graph 2460 illustrating peak decompression forces associated with chest decompressions of a patient. In the graph 2460, the decompression lift ($d_L$) 2462 is shown in centimeters (cm) as a function of maximum decompression force ($f_L$) 2464, shown in Newtons (N). The ACD device (or a similar device for generating model data) can be used to compress and decompress the patient's chest to obtain decompression force values 2466*a*, 2466*b*, 2466*c*, and 2466*d* of the decompression force 2464 for different lift displacements 2462. The ACD device can include a displacement sensor, such as an encoder, to obtain this data. A function 2468 is generated to model the relationship between the decompression force 2464 and the lift displacement 2462. In graph 2460, the function 2468 is a linear function. However, the function 2468 can be a higher-order function, such as a quadratic function, cubic function, $4^{th}$ degree function, $n^{th}$ degree function, spline or exponential function.

Generally observed, the peak compression forces $f_C$ are greater than peak decompression forces $f_L$ for the same displacement values. Generally observed, the compression force varies non-linearly in relation to compression depth. A statistical model is generated based on these data:

$$d_L(f_L)=a \cdot f_L \tag{1}$$

$$d_C(f_C) = b \cdot f_C^2 + c \cdot f_C \tag{2}$$

where $d_L$ is the decompression lift displacement, $d_C$ is the compression depth, $f_L$ is the force at maximum decompression lift, $f_C$ is the force at maximum compression depth, and a, b, and c are constants. Given the total chest displacement $d_T$ is the sum of compression depth $d_C$ and decompression lift $d_L$, these two models can be used to estimate the fraction ($F_C$) of the total chest travel that corresponds to chest compression as $$F_C = \frac{d_C}{d_T},$$

$$F_C = \frac{d_C(f_C)}{d_L(f_L) + d_C(f_C)}$$

which can be simplified to $$F_C(f_C, f_L) = \frac{df_C^2 + cf_C}{af_L + bf_C^2 + cf_C} \tag{3}$$

The compression depth $d_C$ can then be calculated by multiplying the total chest displacement $d_T$ by the compression fraction $F_C$ on a per-compression basis.

$$d_C=d_T{}^*F_C(f_C,f_L) \tag{4}$$

Equations (3) and (4) together show a relationship between peak (e.g., maximum) compression force $f_C$, peak (e.g., maximum) decompression force $f_L$, and decompression depth $d_C$. The maximum decompression force $f_L$, as stated above, corresponds to the force applied to the chest of the patient during the decompression phase. Similarly, the maximum compression force $f_C$ corresponds to the force applied to the chest of the patient during the compression phase. The forces $f_C$ and $f_L$ will typically occur at or near approximately the time of maximum compression and maximum decompression, respectively, during a compression cycle. In some instances, the maximum compression force ($f_C$) may be calculated by taking an average of a number of force values at or near the time of maximum compression, or a particular value at or near the time of maximum compression. Similarly, the maximum decompression force ($f_L$) may be calculated by taking an average of a number of force values at or near the time of maximum decompression, or a particular value at or near the time of maximum decompression. For example, the maximum compression force and/or maximum decompression force values input into the functions described herein may be approximate estimates of the actual maximum compression force and/or maximum decompression force.

Figure 25:
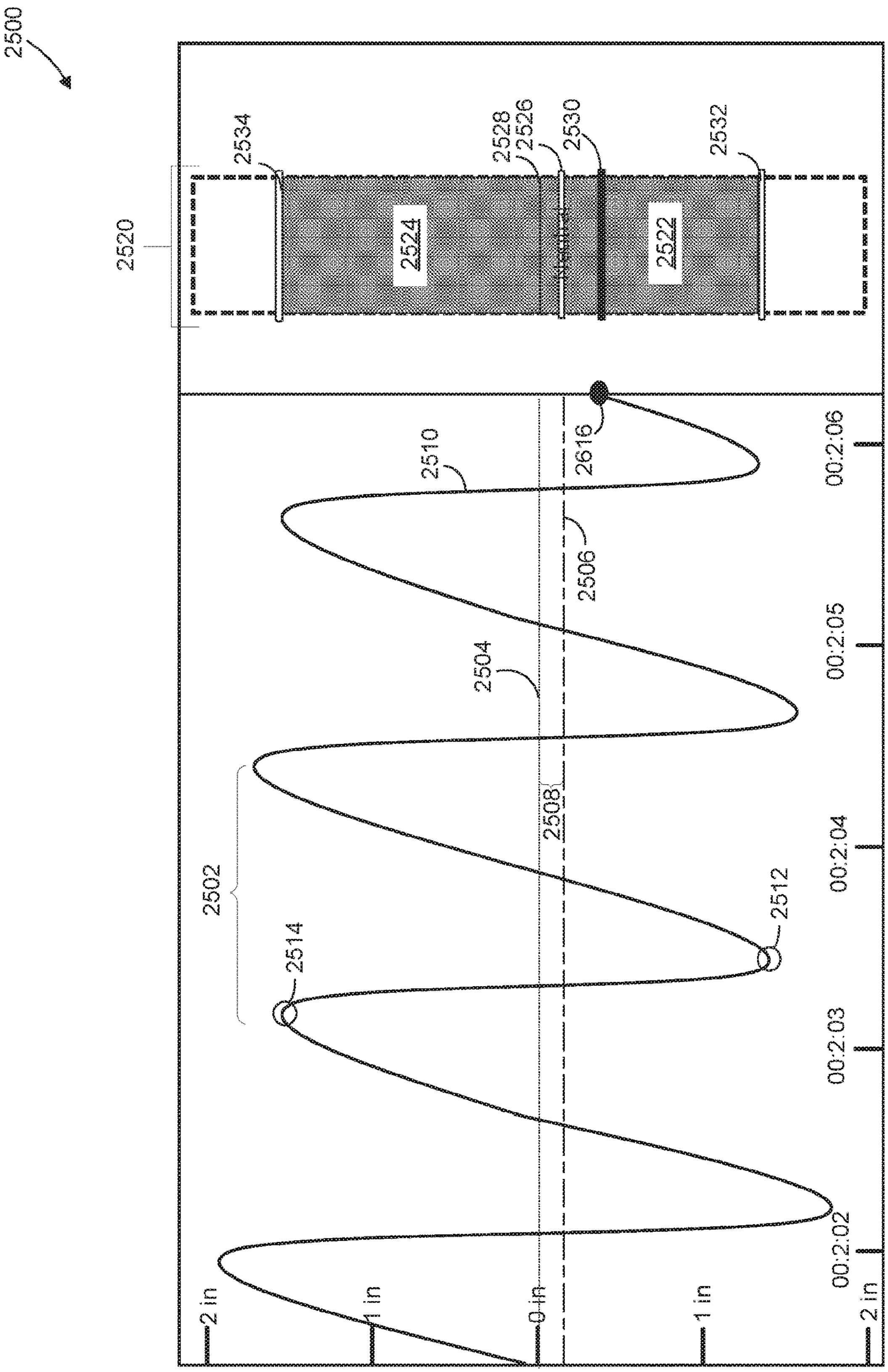
FIGS. 25-26 show examples of user interfaces.

FIG. 25 shows an example of a user interface 2500. The user interface 2500 shows a visual representation of compression cycles, including an example cycle 2502, of active compression decompression treatment. While the cycle 2502 is measured from a peak-to-peak of the maximum decompression lift of the chest of the patient, the compression cycle can be measured from a peak-to-peak of the maximum compression depth, by a crossing of the zero point line 2504, and so forth.

The compression depth represents the portion of the compression cycle corresponding to compressions of the patient's chest. For example, the compression depth is the difference between the position of the chest of the patient at the neutral position 2506 and the position of the chest of the patient when compressed below the neutral position (e.g., any point on the line 2510 under the neutral position line 2506). The maximum compression depth of cycle 2502 is shown at approximately position 2512 on line 2510. As stated previously, the neutral position represents the position of the chest of the patient where the chest rests after natural recoil from the last compression cycle. Generally, the neutral position 2506 of the chest of the patient tends to drift from the zero point (initial neutral position) of the chest of the patient, which is shown by line 2504. An example difference 2508 between the neutral position 2506 and zero point 2504 is shown.

Similarly, the decompression lift represents the portion of the compression cycle corresponding to decompressions of the patient's chest. For example, the compression depth is the difference between the position of the chest of the patient at the neutral position 2506 and the position of the chest of the patient when compressed below the neutral position (e.g., any point on the line 2510 above the neutral position line 2506). The maximum decompression lift of cycle 2502 is shown at approximately position 2514 on line 2510.

The ACD device and/or associated processing device (e.g., defibrillator/monitor, patient monitor, AED, computing device, tablet, feedback device, server, cloud-based computing system, etc.) is configured to determine a total travel distance of the chest (e.g., total chest displacement $d_T$) of the patient during compression cycles. The total travel distance of the chest of the patient for cycle 2502 is the difference between the value of the position of the chest of the patient at point 2514 and the value of the position of the chest of the patient at point 2512 (about 2.5 inches in the example of FIG. 25). A motion sensor (e.g., one of accelerometers 216*a-b*, 404*a-b*, etc.) generates a signal representing motion of the ACD device during compression cycles as previously described. In some implementations, the signal can be double integrated to determine a total travel distance $d_T$ of the sensor. The sensor can be coupled to the chest of the patient, and so the ACD device and/or associated processing device can determine a total travel distance $d_T$ of the patient's chest.

The motion sensor is also used to determine the point 2512 in the compression cycle representing a maximum compression position and the point 2514 representing the maximum decompression position of the patient's chest. For example, when the direction of motion of the chest of the patient changes, the ACD device and/or associated processing device can determine that such an inflection represents a change from compression to decompression or from decompression to compression.

The ACD device and/or associated processing device records a maximum compression force $f_C$ and maximum lift force $f_L$ measurement which occur at or near each of the points of maximum compression point 2512 and the maximum decompression point 2514, respectively. The values of $f_C$ and $f_L$ can be obtained in one or more ways. For example, the ACD device and/or associated processing device can measure a single force value at each of points 2512 and 2514 at each cycle to determine $f_C$ and $f_L$. In some implementations, the ACD device and/or associated processing device can measure a series of force values at or near each of points 2512 and 2514. The ACD device and/or associated processing device can average the values or apply a weighted average (or other function) to the measured force values to estimate the approximate values for $f_C$ and $f_L$. However, it can be appreciated that the compression fraction method described herein offers a simplification in estimating the compression depth during ACD treatment in that it does not require an implementation that achieves exact time synchrony between force and displacement. For example, rather than having to time align the data capture of both force and displacement such as that described in embodiments that track where the force and displacement curves are used to assess whether a particular relationship is achieved (e.g., zero force crossing point for displacement, crossing point at a product-displacement relationship curve, local minima of a product-displacement curve, amongst others), merely values of maximum compression force, maximum decompression force and total displacement may be sufficient to estimate chest compression depth. Accordingly, the measurements and the computations of the force and displacement values provided while using the ACD device need not be time aligned. Rather, the ACD device and/or associated processing device associates particular compression forces of interest (e.g., approximate maximum force, approximate minimum force) and total displacement travel upon compression and decompression with a particular compression cycle and/or multiple compression cycles. Time synchronization/alignment of the force measurements and acceleration values is not required to calculate the compression depth and/or decompression lift. The ACD device and/or associated processing device associates the maximum and minimum forces of a compression cycle with the acceleration values of that cycle on a per-cycle resolution in order to determine the compression depth and decompression lift for each compression cycle.

In some implementations, the ACD device and/or associated processing device can store data representing a sequence of values for $f_C$ and $f_L$ each measured for a compression cycle in a series of compression cycles. Because the forces applied to the chest of the patient do not vary significantly over a few compression cycles (e.g., <5 compression cycles), a moving average can be applied to the values of $f_C$ and $f_L$ for the recent compression cycles to determine an adjusted value for $f_C$ and $f_L$. Alternatively, the individual values of $f_C$ and $f_L$ may be used to calculate compression depth $d_C$ and compression fraction $F_C$ which may then be averaged or smoothed by statistical or signal processing methods such as moving average, median filters, low pass filter, Kalman filter, etc. In some implementations, the ACD device and/or associated processing device (e.g., feedback device, defibrillator/monitor, AED, patient monitor, tablet, server, computing device, cloud-based computing system, etc.) that processes the force and displacement information obtained from the ACD therapy calculates a moving average over several compression cycles of either $d_C$ or $F_C$ to estimate the compression depth and/or decompression lift over the compression cycles. Such a moving average of $d_C$ or $F_C$ compensates for variation in forces $f_C$ and $f_L$ due to variations in depth and/or lift values from one compression cycle to the next of the moving average. Alternatively, or in addition, force and/or displacement outliers may be removed when estimating the compression depth and/or decompression lift, further compensating for significant variations in force or displacement. Performing these statistical or signal processing methods on either $d_C$ or $F_C$ has the advantage that variations in force due to compression depth or lift variation is compensated for.

Once the ACD device or associated processing system/device estimates the approximate values of $f_C$ and $f_L$, the ACD device or associated processing device can determine the compression fraction $F_C$, for example, as provided by in Equation (3). The compression fraction $F_C$ is the portion of the total displacement distance of the chest of the patient that corresponds to compression depth. Equation (3) includes three constants a, b, and c. The values of these constants are determined using training data acquired by the ACD device. The training data is acquired by measuring, at known displacement values, the forces applied by the ACD device on a chest that is physiologically similar to the chest of the patient, as described in relation to FIGS. 27A-27B.

Once the values of a, b, and c are determined, the ACD device and/or associated processing device can determine the compression fraction $F_C$. The ACD device and/or associated processing device uses the value of $F_C$ and the total chest displacement $d_T$ to determine the compression depth $d_C$ (and the decompression lift $d_L$) according to Equation (3). The compression depth $d_C$ and the decompression lift $d_L$ together equal the total chest displacement $d_T$.

The compression depth $d_C$ can be determined independent of using dynamic mechanical data from the compression cycles. The mechanical backlash that may be introduced from the ACD device during compressions can be ignored because Equation (3) relies only on static measurements (the force values $f_C$ and $f_L$). Assuming that the stiffness upon lift is proportional to the stiffness upon compression, the stiffness of the patient is assumed not to affect the determination of the compression fraction.

The ACD device and/or associated processing device uses the values of the compression depth $d_C$ and the decompression lift $d_L$ to generate portions of the user interface 2500 to assist a user in operating the ACD device. The ACD device and/or associated feedback device can show or present on a display an estimation of the compression depth or decompression lift over time, such as when a user is performing compression cycles. For example, line 2510 can be generated based on the estimation of the compression depth $d_C$ and the decompression lift $d_L$.

A compression/decompression meter 2520 shows on the user interface 2500 how much force is being used to compress or lift the ACD device. The compression meter 2520 shows the compression depth 2522 and the decompression lift 2524 applied by the user to the chest of the patient using the ACD device. The meter 2520 includes representations of the neutral position 2526, the zero point 2528 (e.g., if absolute depth is known such as with a laser interferometer or optical encoder), a current chest position 2530, a recent maximum compression depth 2532, and a recent maximum decompression lift 2524. In some implementations, the zero point 2528 need not be known in order to determine or estimate the neutral position 2526. In situations in which an absolute depth is unknown, the zero point 2528 can be estimated as the midpoint between the first compression depth and decompression lift values of the CPR treatment. The total chest displacement $d_T$ is the difference between the values of the maximum compression depth 2532 and maximum decompression lift 2534. The compression depth $d_C$ is calculated as described above and approximates the difference between the values of the neutral position 2526 and the maximum compression depth 2532. For example, the neutral position 2526 can be determined/estimated once the compression depth $d_C$ is determined. To refresh the meter 2520 for new compression cycle, the marker 2532 can be set to match the previous compression cycle depth (or trough). The neutral point 2526 can be calculated as the prior compression depth 2532 in the meter plus the newly calculated compression displacement, essentially splitting the meter into the two fractions of lift and depth. This results in the display of the neutral point 2526 moving up or down the meter 2520 as the neutral point changes when compression cycles are performed. In some implementations, to refresh the meter 2520 for new compression cycles, the neutral point 2526 is pinned in place in the meter 2520 and the lift 2534 and depth 2532 markers move in response to changes in compression depth and decompression lift from the neutral position 2526. In some examples, the neutral position 2526 may be estimated based on the maximum compression depth 2532 plus compression depth $d_C$. Other similar examples for displaying the neutral position 2526, decompression lift 2524, and compression depth 2532 can be used.

The ACD device and/or associated processing device can determine whether either of the compression depth $d_C$ or the decompression lift $d_L$ are outside acceptable ranges. As seen in user interface 2600 of FIG. 26, the most recent compression displacement value that was reached 2624 is shown by shaded area 2610, and the most recent decompression value 2622 reached is shown by shaded area 2608. Regions 2608 and 2610 are updated as the next cycle begins. In some implementations these regions are presented as a "ghost" on the bar, and appear faded or deemphasized compared to the current displacement measurement, so as to show to the user that they are past downstroke and upstroke measurements. As the current displacement bar 2606 moves up and down the displacement meter 2620, the shaded areas 2608, 2610 are redrawn, and the old areas fade away or otherwise disappear from the user interface if they are too far into the past. The current displacement can also be referred to as the current upstroke displacement, the current downstroke displacement, the updated upstroke displacement, the updated downstroke displacement, and so forth.

The ranges 2602*a*, 2602*b* can be updated by the ACD device 1200 and/or associated feedback/processing device in response to a variety of detected circumstances. For example, the ACD device and/or associated feedback/processing device can adjust at least one of the target downstroke displacement range 2602*b* and the target upstroke displacement range 2602*a* based on the updated estimate of neutral position. The ACD device 1200, or other associated feedback/processing device can adjust the target downstroke displacement range 2602*b* from an initial target downstroke displacement range to an updated target downstroke displacement range based on whether the downstroke displacement 2610 falls within the target downstroke displacement range, and/or based on the updated estimated of neutral position. Similarly, the ACD device 1200 and/or associated feedback/processing device can adjust the target upstroke displacement range 2602*a* from an initial target upstroke displacement range to an updated target upstroke displacement range based on based on whether the upstroke displacement 2608 falls within the target upstroke displacement range, and/or based on the updated estimated of neutral position.

In some implementations the updated target downstroke displacement range 2602*b* is adjusted from an initial target downstroke displacement range after a predetermined interval (e.g., number of compression cycles, elapsed time, etc.). Similarly, in some implementations, the updated target upstroke displacement range 2602*a* is adjusted from an initial target upstroke displacement range after a predetermined interval (e.g., number of compression cycles, elapsed time, etc.). Such an update in target downstroke displacement range and/or target upstroke displacement range may or may not be based on an updated estimate of the neutral position of the chest. For either the upstroke or the downstroke displacement, the target ranges 2602*a*, 2602*b* can be shifted to represent a range at greater magnitudes, smaller magnitudes, compress the range itself, or expand the range itself (e.g., in response to estimating the neutral position of the chest of the patient).

In some implementations, at least one of the target downstroke displacement range 2602*b* and the target upstroke displacement range 2602*a* can be based on a clinically accepted guideline. However, the target downstroke displacement range 2602*b* can be greater or less than the clinically accepted guideline, and the target upstroke displacement range 2602*a* can be greater or less than the clinically accepted guideline.

In some implementations the ACD device 1200, or other associated feedback/processing device, is configured to determine how the chest of the patient has remodeled based on the estimated neutral position. The feedback signals received from the sensors can cause the display to provide an indication of patient chest remodeling. For example, the feedback device may simply provide an indication that substantial chest remodeling has occurred due to the CPR treatment, so that the user is aware of the change in chest mechanics. Such information may be a cue for the user to alter the manner in which CPR is provided, for example, lessen the force that is applied to the patient to reduce the risk of injury, or provide more or less decompression treatment to the patient. As discussed above, when the neutral position of the chest has depressed significantly due to chest remodeling, then it may be desirable to reduce the depth of compressions on downstroke and/or increase the lift of decompression on upstroke. In some cases, the feedback device may provide more instructional information for the user to adjust the target downstroke displacement and/or target upstroke displacement or forces, or adjust or aspects of the ACD treatment.

Figure 26:
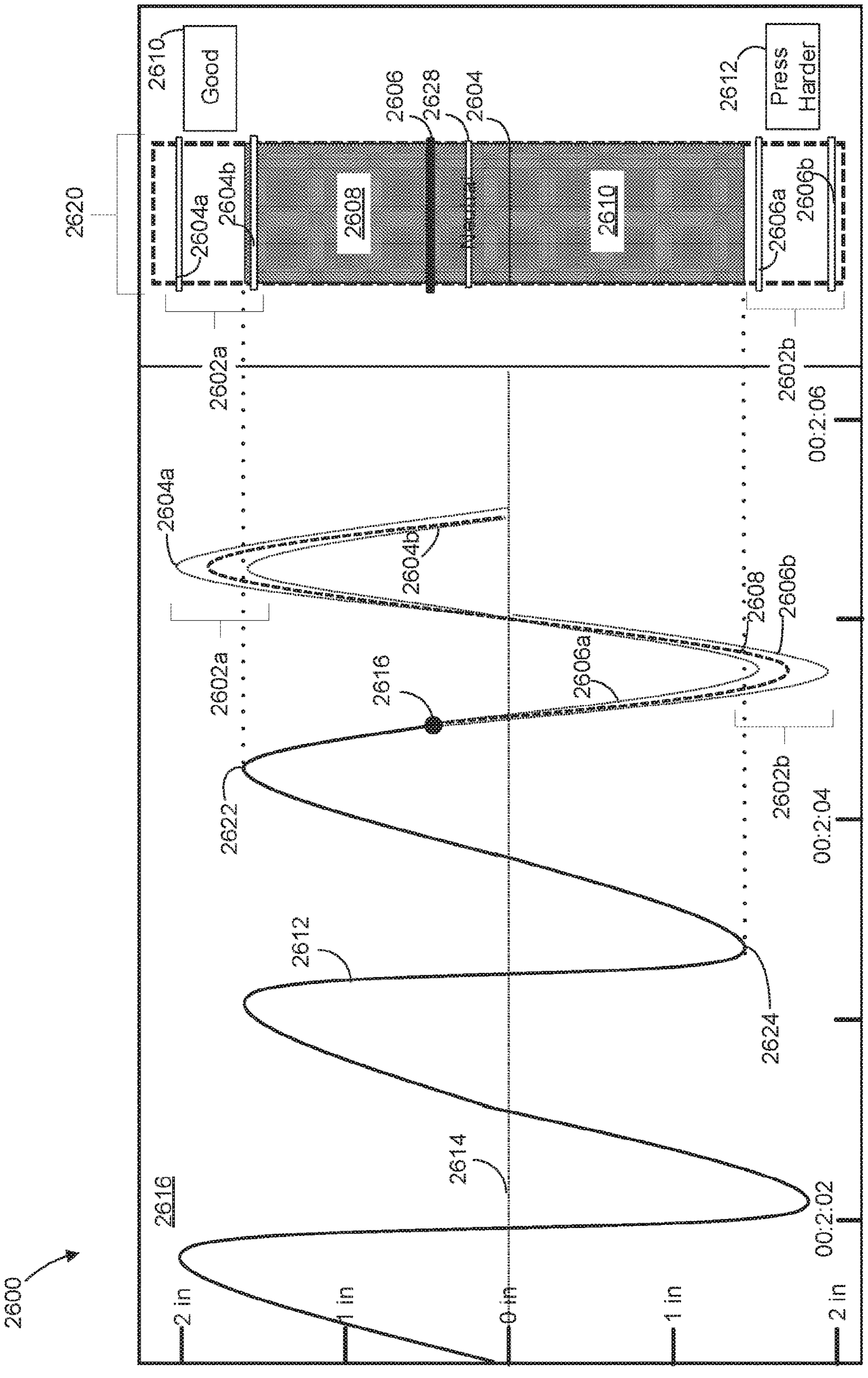

FIG. 26 further shows the waveform 2612 of the treatment, as described in relation to FIG. 25. The indicator 2616 can show the current displacement value of the patient's chest. In some implementations the waveform can be traced from left to right. The elapsed time is shown on the horizontal axis, and the displacement is shown on the vertical axis. The indicator 2616 is mirrored by the current displacement bar 2606 on the displacement meter 2620, and the indicator 2616 is located near a center of the waveform frame 2616. To the right of the indicator 2616, a target compression cycle displacement is plotted against elapsed time. Here, the current time is about 2:04.5. To the right of the indicator, the target displacement trace 2608 is plotted. A maximum target displacement value 2606*a* for both compression and decompression is shown as a dotted line above the target 2608. A minimum target displacement value 2606*b* for both compression and decompression is shown as a dotted line below the target 2608. By showing the target displacement ranges as a waveform, the ACD device 1200, or other feedback device, guides the rescuer for both compression and decompression displacements and pace where the objective is for the rescuer to administer compressions and decompressions in a way that stays within the maximum and minimum set forth by the target ranges. The total range of decompression displacements is shown as 2602*a* in both the depth bar 2620 and the waveform frame 2616. Similarly, total range of compression displacements is shown as 2602*b* in both the depth bar 2620 and the waveform frame 2616.

The target range values 2606*a*, 2606*b* and 2604*a*, 2604*b* may be determined in response to estimating the neutral position of the patient. For example, the ranges 2602*a*, 2602*b*, which determine the values of the displacements 2606*a*, 2606*b* and 2604*a*, 2604*b*, can be updated on a per-compression cycle basis, after a series of compression cycles (e.g., 2-5 compression cycles) after a particular period of time, etc. The updated values of the ranges 2602*a*, 2602*b* can be determined based on the current and/or prior estimated neutral position of the patient's chest, and/or the compression fraction method described herein. For example, the updated ranges 2602*a*, 2602*b* can be based on the current neutral position estimation, a cycle-windowed and/or time-windowed average of neutral position estimations, etc. As the neutral position is estimated, the target waveform 2608 is updated and further projected in front of the user's current position and time. Here, a single cycle is shown in the projection. However, in some implementations, multiple compression cycles can be projected and rescaled as needed.

The feedback of the trace 2612 and the depth meter 2620 can each provide guidance (e.g., to the rescuer, to the processing device) for how to modify the ACD CPR treatment so that the downstroke displacement falls within the target downstroke displacement range 2602*b* prior to the upstroke displacement falling within the target upstroke displacement range 2602*a*. For example, as previously described, a displacement meter can instruct the rescuer to: e.g. push harder, pull harder, press more softly, pull more softly, push deeper, pull up further, change a compression frequency, and so forth.

Figure 27A:
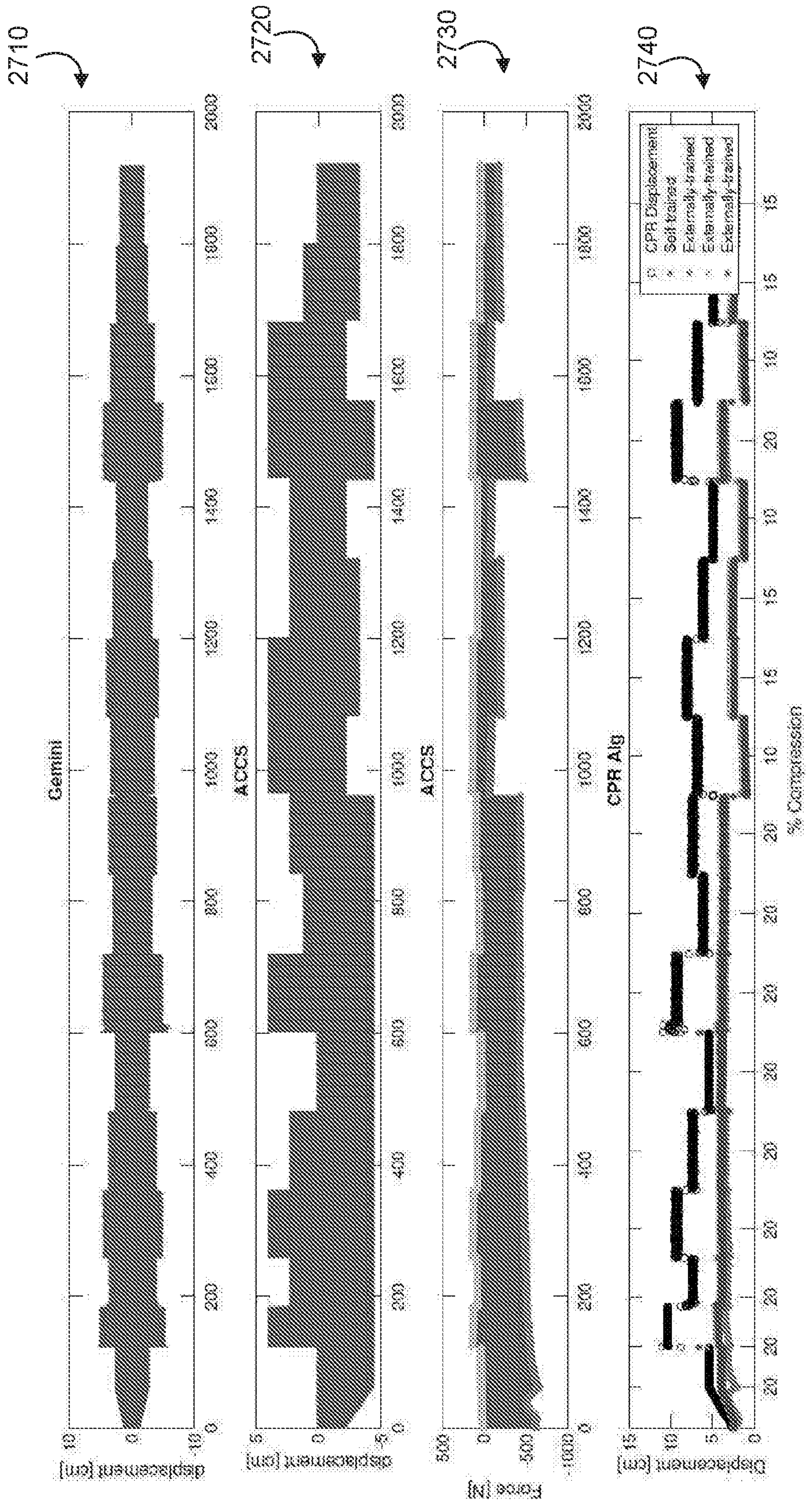
FIG. 27A-27B show a representation of example training data.

Turning to FIG. 27A, graphs 2710, 2720, 2730, and 2740 illustrate training data for training the values of a, b, and c of Equation (3). Graph 2710 shows the compression displacement over time as measured with a motion sensor (e.g., one of accelerometers 216*a-b*, 404*a-b*, etc.). The ACD is configured to estimate total chest displacement $d_T$ on a per-stroke basis, shown graph 2640 (also shown larger in FIG. 27B). The ACD is configured to estimate, by the compression fraction model, how much of that total sensor displacement is due to compression. In this example, the ACD device and/or associated processing device is configured to use the model from Equation (3) by training it with different sets of data. In order to train the model, the ACD device and/or associated processing device uses a known compression depth and decompression lift.

Figure 27B:
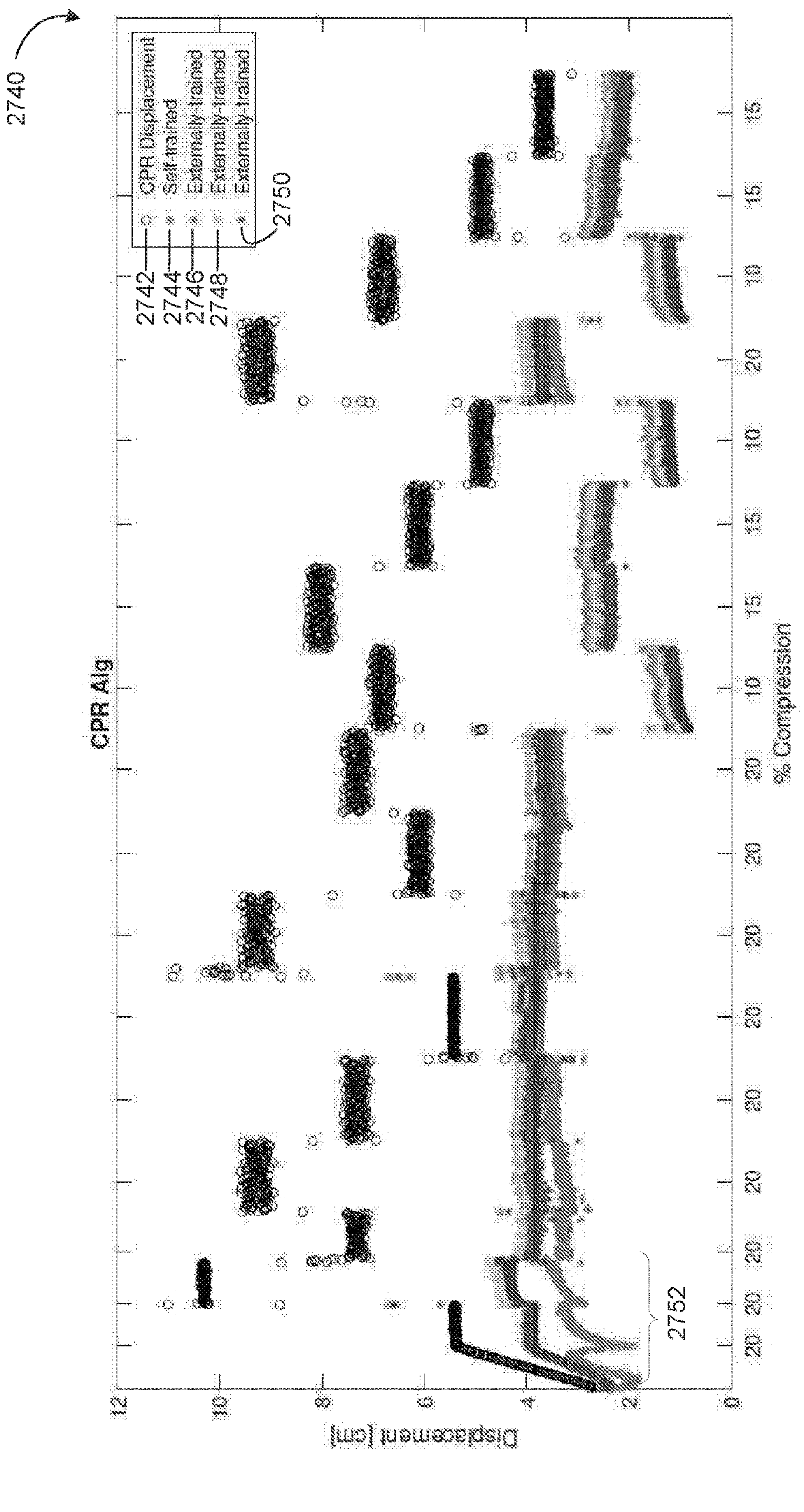

The constants a, b, and c (or additional constants for higher-order equations) in Equations (1), (2), and (3) are determined from the fit to the data of graphs 2710, 2720, and 2730. Once these constants are determined, the compression fraction $F_C$ can be calculated for each compression using Equation (3). Graph 2740 of FIG. 27B shows example estimations 2744, 2746, 2748, and 2750 of the resulting compression depth using calculations of the total compression distance $d_T$ 2742. The ACD device and/or associated processing device estimates the compression depth $d_C$ using training data from different experiments (data sets 2744, 2746, 2748, and 2750) for validation. Because not all training data yields the same results, a database of training data is gathered to train the model. The training data sets can include varying features. For example, the data set 2746 was calculated using a training set that did not have ramp-up CPR. As a result, a discrepancy is shown between data set 2746 and data sets 2744, 2748, and 2750 particularly at the beginning of treatment 2752, presumably because the training set has higher forces associated with CPR than the test set.

Figure 28:
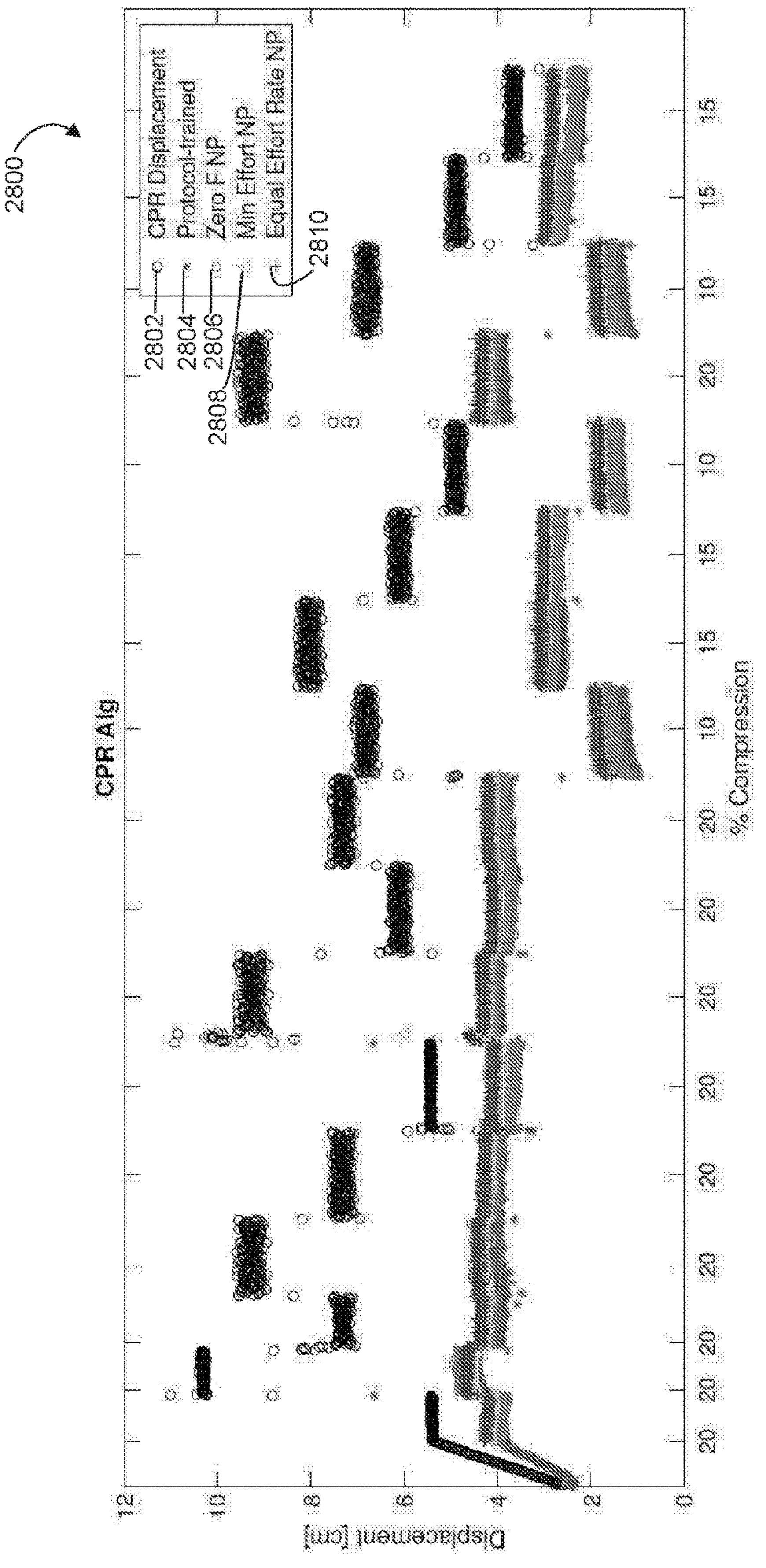
FIG. 28 includes a graph showing the compression depth calculation results from the compression fraction method discussed in relation to FIGS. 24A-27B compared to those from the neutral point estimation methods discussed in relation to FIGS. 13-23.

FIG. 28 includes a graph 2800 showing the compression depth calculation results 2804 from the compression fraction method discussed in relation to FIGS. 24A-27B and compared to the estimated compression depths 2806, 2808, and 2810 obtained using the neutral position estimation methods discussed in relation to FIGS. 13-23. Data 2802 shows the estimated total chest displacement $d_T$. The neutral position estimation techniques previously described can be used to validate the results of the compression fraction model. The neutral position estimation results can be obtained by performing tests on exhaustive tests on animal or human bodies (or other proxy object for the chest of the patient). However, because the compression fraction method uses training data that is specific to a particular patient, the neutral point estimation method results provide the validation to ensure that the compression estimation results are accurate.

In graph 2800, data set 2804 represents determined values for the compression depth using the compression fraction method. Data set 2804 represents the compression depth determined using the zero-force neutral position estimation method of FIGS. 16A-16B. Data set 2806 represents the compression depth determined using the minimum effort neutral position estimation method of FIGS. 17A-17B. Data set 2808 represents the compression depth determined using the equal effort rate neutral position estimation method of FIGS. 18A-18B.

For validation of the compression fraction method, a sequential approach that takes advantage of the determinism of the neutral point estimation methods is used. First, a smaller sample set of data with baseline data are used to determine the accuracy of the neutral point estimation methods. Then, a large database without baseline data is collected, and the neutral point methods are used to obtain pseudo-baseline data for this larger collection of training data. Finally, the large database with pseudo-baseline data is used to train the compression fraction method.

Figure 29:
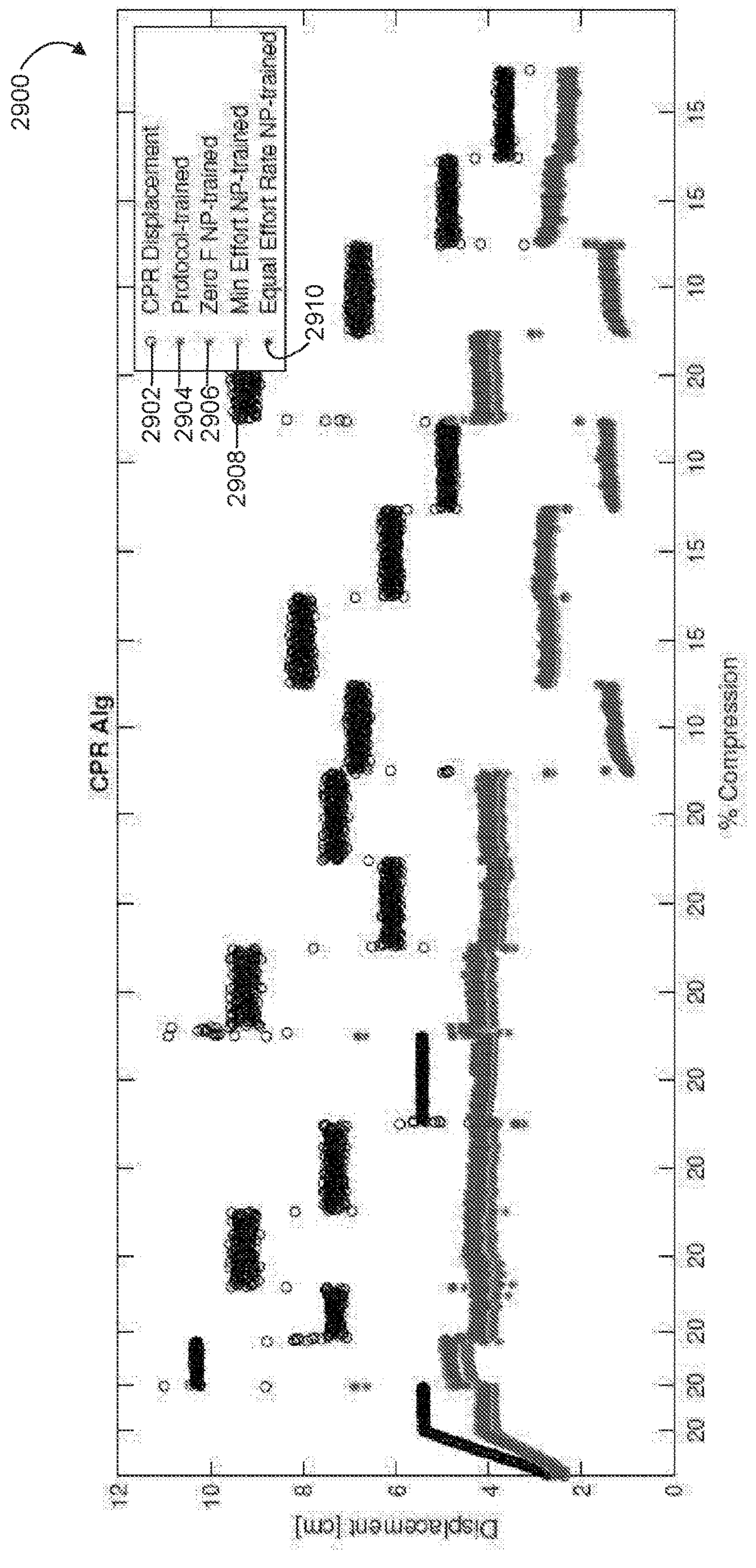
FIG. 29 shows an example of training the compression fraction method using the study protocol on pig data as a baseline in comparison to using the results from the neutral point methods as a baseline.

FIG. 29 shows an example of training the compression fraction method in this manner. In graph 2900, each of the neutral point estimation methods were used to train the compression fraction method. Data set 2904 represents determined values for the compression depth using the compression fraction method trained using compression displacements predetermined from the study protocol described above. Data set 2906 represents the compression depth determined from the compression fraction method trained using the zero-force neutral position estimation method of FIGS. 16A-16B. Data set 2908 represents the compression depth determined from the compression fraction method trained using the minimum effort neutral position estimation method of FIGS. 17A-17B. Data set 2910 represents the compression depth determined from the compression fraction method trained using the equal effort rate neutral position estimation method of FIGS. 18A-18B.

The compression depth $d_C$ and decompression lift $d_L$ can be updated even as the neutral position of the patient changes over time without determination of the neutral position of the chest of the patient. Furthermore, the neutral position of the patient's chest can be determined from the estimates of the decompression lift and the compression depth, rather than determining decompression lift and compression depth from the neutral position estimation, as previously described.

The compression fraction method can use the same motion sensor used for the neutral point estimation methods that can train the compression fraction method. The compression fraction method can reduce or eliminate estimation errors introduced by mechanical aspects of the ACD device, such as an elastic plunger. Because the force measurements used in Equation (3) are peak forces, the forces are static measurements unaffected by the elastic dynamics of the plunger (or other mechanical coupling system of the ACD device). Additionally, data temporal synchrony between force measurement and acceleration has a wide tolerance. The ACD device and/or associated processing device associates each of the force measurements with the compression cycle during which the force measurements were measured. A synchronous measurement of motion and force is not needed; rather, the forces can be measured independent from measuring the motion of the patient. As a result, generation of a presentation of feedback on a user interface, communicating the data to another device, and calculating the compression depth estimations are all simpler than when synchronous data are required. Each mechanical configuration of the ACD device can be associated with training data so that highly accurate values for a, b, and c are available.

In some implementations, additional models can be formulated, given that the available information during a measurement includes total chest displacement and peak forces at lift and compression. The model presented above has used Equation (3), but the compression fraction model can be stated in different terms, such as $$F_C(f_C, f_L) = \frac{d_T - af_L}{af_L + bf_C^2 + cf_C} \tag{5}$$

since the total chest displacement $d_T$ is the sum of compression depth $d_C$ and decompression lift $d_L$. In addition, Equation (2) and FIGS. 24A-24B already show a method to calculate compression depth as a function of peak compression force ($f_C$). The model from Equation 2 can be used to directly estimate compression depth without the need to calculate a compression fraction ($F_C$) or measure decompression force.

Figure 30:
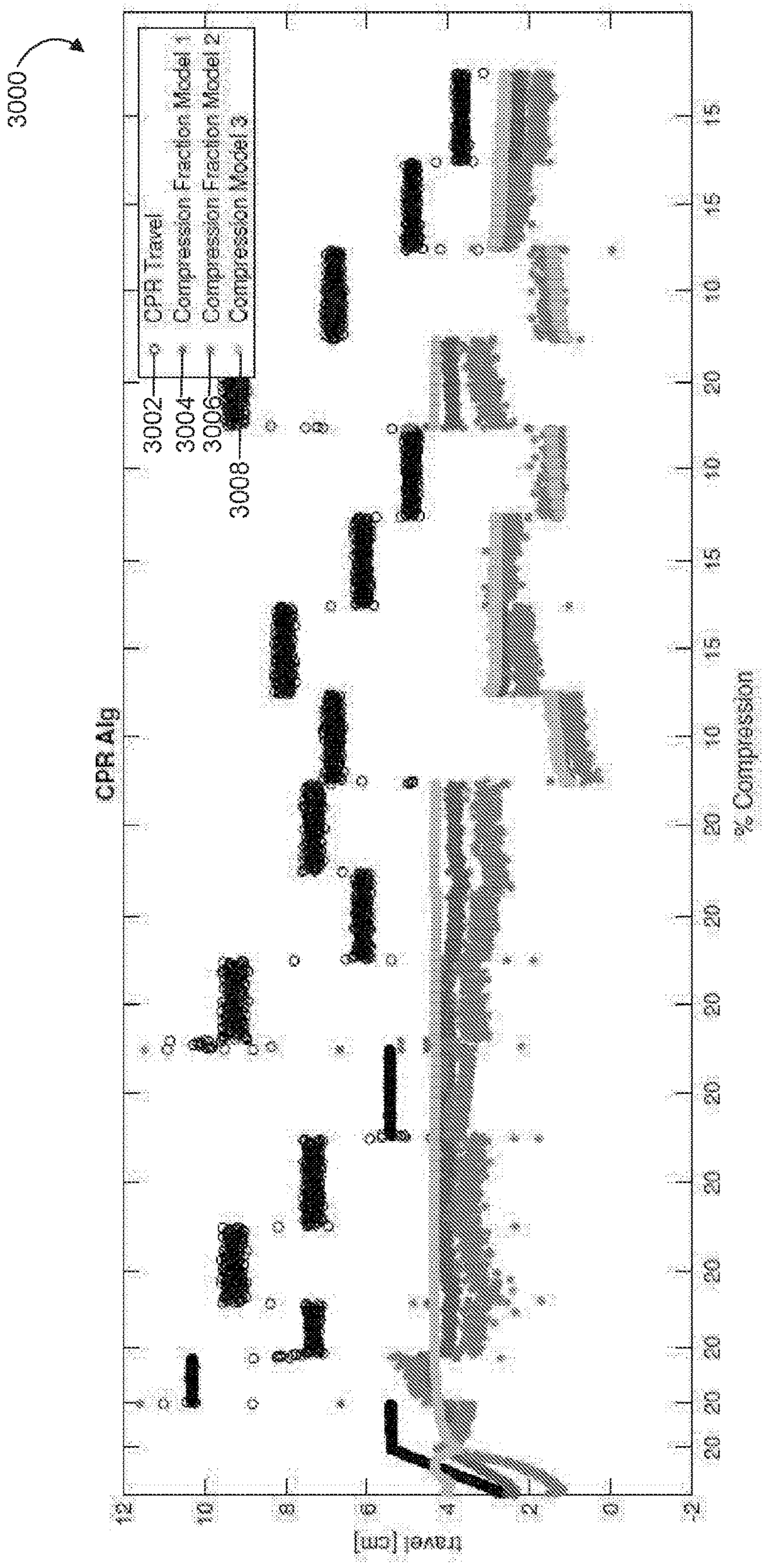
FIG. 30 includes a graph showing results comparing alternate compression fraction methods.

FIG. 30 includes a graph 3000 showing the comparison of these alternate methods from Equations (3) and (5). The compression fraction model from Equation (3) is shown using the data set 3004, the model from Equation (5) is shown by data set 3006, and the model from Equation (2) is shown by data set 3008, where the data set 3002 represents the total chest displacement $d_T$ as measured by the motion sensor.

The ACD device and/or associated device (e.g., feedback device, defibrillator/monitor, AED, patient monitor, tablet, computing device, cloud-based computing system, etc.) that may be used to develop the model trains the compression fraction methods on Equations (3) and (5) using the training data that are available. In some implementations, a separate processing device or devices are used to train the model(s), and the model(s) are loaded onto the ACD device and/or other device for providing feedback to the user. Training Equations (3) and (5) may involve setting the values of the constants a, b, c . . . n by fitting an equation or function to the data gathered from prior measurements, as described previously with respect to FIGS. 24A-24B. More specifically, for such an embodiment, different force values are measured for varying known compression depth or decompression lift values. The compressions and/or decompressions are performed on one or more model chests that having similar physical characteristics to the patient's chest. The chest model(s) chosen can be based on different demographics of the patient. For example, different models can be chosen for various combinations of pediatric patients, female or male patients, and so forth. For each model chest, a given number of compression cycles are performed and the corresponding forces are measured. When a fraction is fitted to the data, the order of the fraction can be selected to find the best fit while avoiding over-modeling the chest by selecting an order that is too high. The resulting values of the constants a-n, or other combination of coefficients, are determined.

When a patient is treated, the corresponding model can be selected for that patient's demographics. For example, a pediatric model can be selected for a pediatric patient. In some implementations, the patient chest stiffness can be assumed to be similar for different patients, which is done using Equation (2) alone as a method. To accommodate this assumption, the ACD device can include a number of settings for target forces (and thus compression depth and decompression lift) based on stiffness, so that a similar model could be followed where the user specifies a stiffness level in order to utilize the correct training data. The ratio of lift to compression stiffness is generally static, so methods using Equations (3) and (5) can operate independent of such a setting.

The results of each of the methods described can be combined to produce a final estimation. For example, a linear combination of any of these methods can be set up as the weighted average, where the weights could be tuned given the accuracy performance seen from large databases. For example, a first value can be determined using Equation (2), a second value using Equation (3), and a third value using equation (5). If, for example, data 3008 appears to provide a model that is less accurate than data 3004 or 3006, the model from data 3008 can be weighted with a smaller weight than the other models for approximating the compression depth and/or decompression lift. In some implementations, the weights for each of the models are adjustable based on the amount of training data gathered for the respective model. For example, if little training data have been gathered for a particular patient demographic, models which rely on that training data are associated with smaller weighting values than other models or smaller with respect to the weighting value that the model receives if more training data are available.

Figure 31:
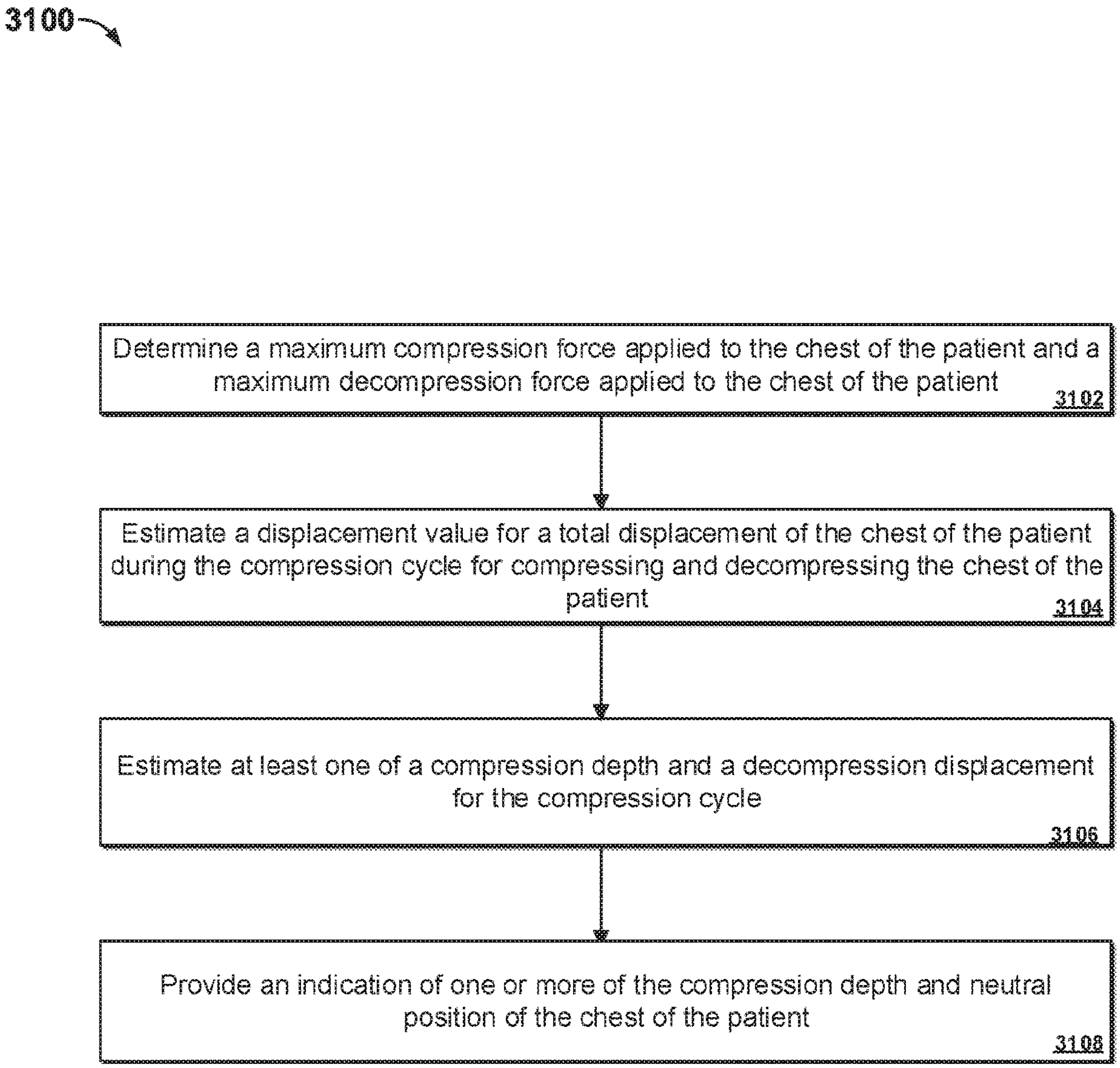
FIG. 31 includes a flow diagram showing an example process for determining a compression depth during ACD treatment.

FIG. 31 shows an example process 3100 for estimating a compression depth ($d_C$) for an active compression decompression treatment using peak force values. The ACD device (e.g., ACD devices 100 or 1200 of FIGS. 1, 12, etc.) and/or associated processing device can be used to estimate the compression depth and decompression lift using process 3100. The ACD device is configured for a user to push downward and pull upward on a chest of a patient. A force sensor configured to measure force applied to the chest of the patient by the user with the ACD device. A motion sensor configured to measure displacement of the chest of the patient. One or more processors configured to execute computer-executable instructions stored in a memory for estimating the compression depth ($d_C$) for an active compression decompression treatment using peak force values, such as those on compression and decompression. The ACD device and/or associated processing device determines (3102), based on at least one signal of the force sensor, a maximum compression force applied to the chest of the patient during a compression cycle and a maximum decompression force applied to the chest of the patient during the compression cycle. The ACD device and/or associated processing device estimates (3104), based on at least one signal of the motion sensor, a displacement value for a total displacement of the chest of the patient during the compression cycle for compressing and decompressing the chest of the patient. The ACD device and/or associated processing device estimates at least one of a compression depth and a decompression displacement for the compression cycle, the estimation being based on the determined compression force, the determined decompression force, and the estimated displacement. A user interface of the ACD device and/or associated processing/feedback device provides (3108) an indication of one or more of the compression depth and neutral position of the chest of the patient.

As discussed herein, various types of feedback may be provided to a user of the feedback device for guiding the user in administering active compression decompression treatment to the patient. Visual feedback presented on a display of a user interface (e.g., on a defibrillator, patient monitor, portable computing device, etc.) may be particularly helpful for the user.

In some embodiments, described further below, the visual feedback may provide an indication of the current displacement of the chest on downstroke and upstroke during ACD treatment, and may also provide an indication of past displacement of the chest on downstroke and upstroke during ACD treatment. For example, a series of sequential ACD bar graphs that show past depth of compression and lift of decompression may be provided for the user to assess how ACD treatment has most recently been provided to the patient. By having such an assessment of past performance or actions, the user may better be able to determine how the ACD treatment should be adjusted.

In various embodiments, if it is consistently displayed, on the ACD device or another device (e.g., patient monitor, defibrillator, portable computing device, other computing device) that is used for processing of ACD related information, that the compression depth on downstroke or decompression lift on upstroke is outside of the target range for each, then the user may be more motivated to modified the manner in which the compressions or decompressions are given. For example, if the compression depth on downstroke is consistently too shallow as compared to target, presented by past downstroke displacement bars, then the user may be more motivated to press harder. Or, if the decompression lift on upstroke is consistently too great as compared to target, presented by past upstroke displacement bars, then the user may be more motivated to ease up on the lift on decompression, so as to meet the preferred target range.

In certain embodiments, also described further below, the visual feedback may employ a graph of current force and displacement that a user can use to guide the manner in which he/she provides ACD treatment to the patient. In some cases, the visual feedback may further provide boundaries or other guidance for the user to apply particular combinations of force and displacement for each given moment in time. For example, the user may be given feedback so as to provide ACD treatment in a way that substantially produces or follows a particular desired force-displacement curve or waveform.

As described above, the ACD devices (e.g., ACD device 100, 1200, etc.) or other appropriate device (e.g., patient monitor, defibrillator, portable computing device, other computing device) associated with the resuscitation effort can provide feedback, such as by the user interface 700, which may be provided on the ACD device and/or other devices described herein. The feedback can include information regarding ACD treatment, such as CPR chest compressions and decompressions, which can assist a rescuer in performing CPR treatment more effectively. The ACD devices or other appropriate device associated with the ACD treatment can use the data received from sensors to provide such feedback. For example, the sensors such as the force sensor 216*a*, multiple accelerometers 216*b*, 216*c* (or a single accelerometer), and/or the force sensor 402 and motion sensors such as accelerometers 404*a*, 404*b* (or a single accelerometer) of ACD device 100 can provide the force and depth estimates for providing compression and decompression feedback to the rescuer in applying effective ACD treatment to the patient. In another example, the position sensor 1206, accelerometer 1204, and force sensor 1208 of ACD device 1200 can provide one or more of depth, rate, and force estimates for feedback for the compressions and/or decompressions of CPR treatment.

As described in relation to FIG. 8, the feedback 718 provided to the rescuer can include information that assists a rescuer in providing optimal CPR treatment. For example, the user interface 700 can instruct a rescuer to push harder during CPR compressions to compress the patient's chest a desired amount. In some implementations, the feedback that is provided can include feedback regarding decompressions and compressions. The user interface 700 can generate instructions and/or information for a rescuer (or any other user of the ACD device 1200) that the amount of decompression can or should be adjusted. For example, the user interface can instruct a rescuer to pull up more to further decompress the patient's chest and improve the ACD CPR treatment. As discussed herein, it may be beneficial to guide the rescuer to provide more decompression treatment to the chest in the event that significant chest remodeling has occurred where the natural resting state or neutral position of the chest has effectively moved downward in response to repetitive chest compressions.

Feedback provided by the ACD device 1200 and/or other appropriate feedback device can depend on the neutral position that is estimated by the ACD device or another device (e.g., patient monitor, defibrillator, portable computing device, other computing device) that is used for processing of ACD related information. In some implementations in response to estimating the neutral position (e.g., as described in relation to FIGS. 12-23), the ACD device 1200 or other appropriate device can update the feedback presented on the user interface 700. That is, the estimation of the neutral position may be an input for feedback provided to the user via the user interface and/or other feedback device. For example, in response to an estimation that the neutral position has moved to approximately 1.0 inch below the zero point (e.g., where the natural resting position of the chest has moved significantly below the starting position of the chest prior to compressions), the ACD device 1200 and/or other device for providing feedback can provide instructions for the rescuer to pull up higher on the patient's chest. The instruction can assist the rescuer to adjust his/her treatment so as to raise the neutral position back toward the zero point, if desired. In another example, in response to determining that the neutral position has moved to approximately 1.0 inch below the zero point, the ACD device 1200 and/or other device for providing feedback can update the feedback to provide the user with a higher lift goal for decompression of the patient's chest (e.g., approximately 1.0 inch higher than previously provided, or approximately 1.0-2.0 inches above the starting zero point). If the rescuer continues to compress the patient's chest at a same level, the ACD device 1200 and/or other device for providing feedback can provide an instruction (e.g., audio cue, speech, visual cue and/or text, etc.) to the rescuer to lift the patient's chest higher.

Figure 32:
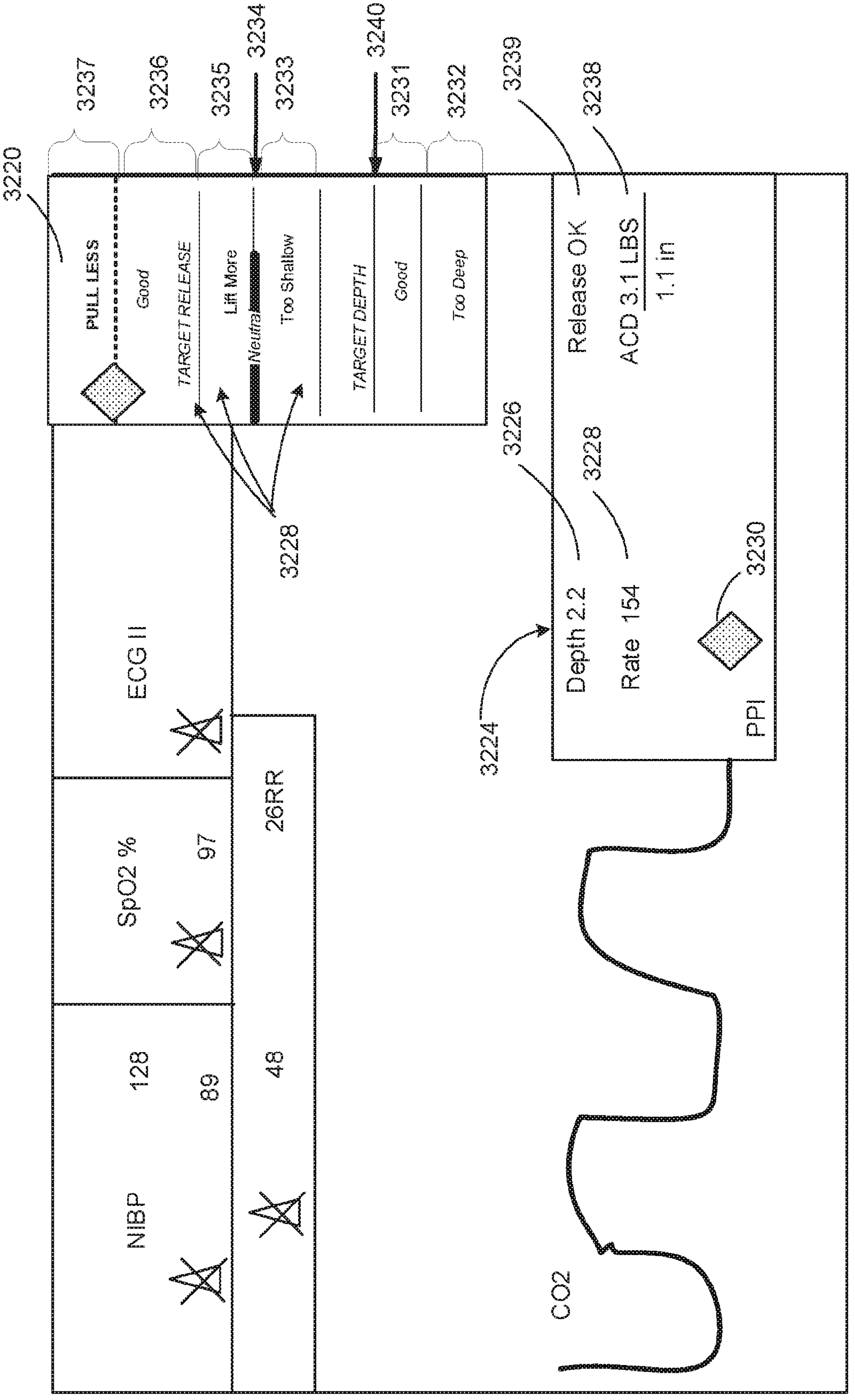
FIGS. 32-33 shows an example user interface configured to provide ACD CPR treatment feedback.

As shown in FIG. 32, a visual representation of a guide for assisting a user in providing quality CPR chest compressions can include an indicator of CPR compression-decompression parameters, such as a CPR chest compression depth/height meter 3220 and a CPR chest compression information box 3224. The CPR chest compression depth/height meter 2420 can be automatically displayed on an appropriate device for providing feedback upon detection of CPR chest compressions and decompressions.

On the CPR chest compression depth/height meter 3220, a general instruction 3237 can be displayed to visually indicate real-time guidance for a rescuer to administer action through the ACD CPR chest compression treatment at a particular time. That is, based on the sensed information from the ACD device, the system may provide feedback to the rescuer and/or other device for administering ACD therapy in a desirable manner, to provide as favorable patient outcomes as possible. As shown, the CPR chest compression depth/height meter 3220 may include a display that is partitioned into sections that indicate certain phases of the ACD CPR chest compression treatment, to assist a rescuer in providing optimal therapy. For example, the system may assist the user in reaching a target release 3236 or a target depth 3240, by highlighting specific instructions for each phase. For example, the display may highlight prompts such as lift more 3235 or too shallow 3233 corresponding to the target release 3236. In some implementations, the display may provide prompts including qualitative ACD CPR feedback, such as "good" 2431 or "too deep" 3232 when guiding the rescuer in reaching the target depth 2440.

The CPR chest compression depth/height meter 3220 can be configured to display identification of a transition point 3234 (e.g., estimate of neutral position), to indicate the transition between different phases of the ACD CPR chest compression treatment, or an estimate of where that transition may be. In some implementations, the neutral position can be determined or otherwise estimated as described in relation to FIGS. 12-23. Though, it should be appreciated that other methods may be used to estimate the neutral position. In some implementations the transition point 3234 can appear static on the user interface, but the actual value or estimated location or position associated with the transition point 3224 can be updated as data are measured by the sensors of the ACD device 1200. As such, the feedback 3231, 3232 can be updated based on the determination of the depth, frequency, force, etc. of the compressions and/or decompressions of the CPR treatment and the updated value of the transition point 3234. In some implementations the position of the transition point 3234 on the user interface can move depending on the determined or otherwise estimated neutral position. For example, if the estimated neutral position is 1 inch below the zero point (approximate location where compressions are believed to have started), the user interface can show the transition point 3234 below a zero point level. In some implementations, if desirable to return the value of the transition point 3234 to the zero point, the feedback can instruct the user to pull harder, pull less, push harder, push less, etc. to accomplish that goal. The user interface may assist the rescuer in doing so by adjusting how easily a PPI graphical indicator 3230 is filled.

Figure 33:
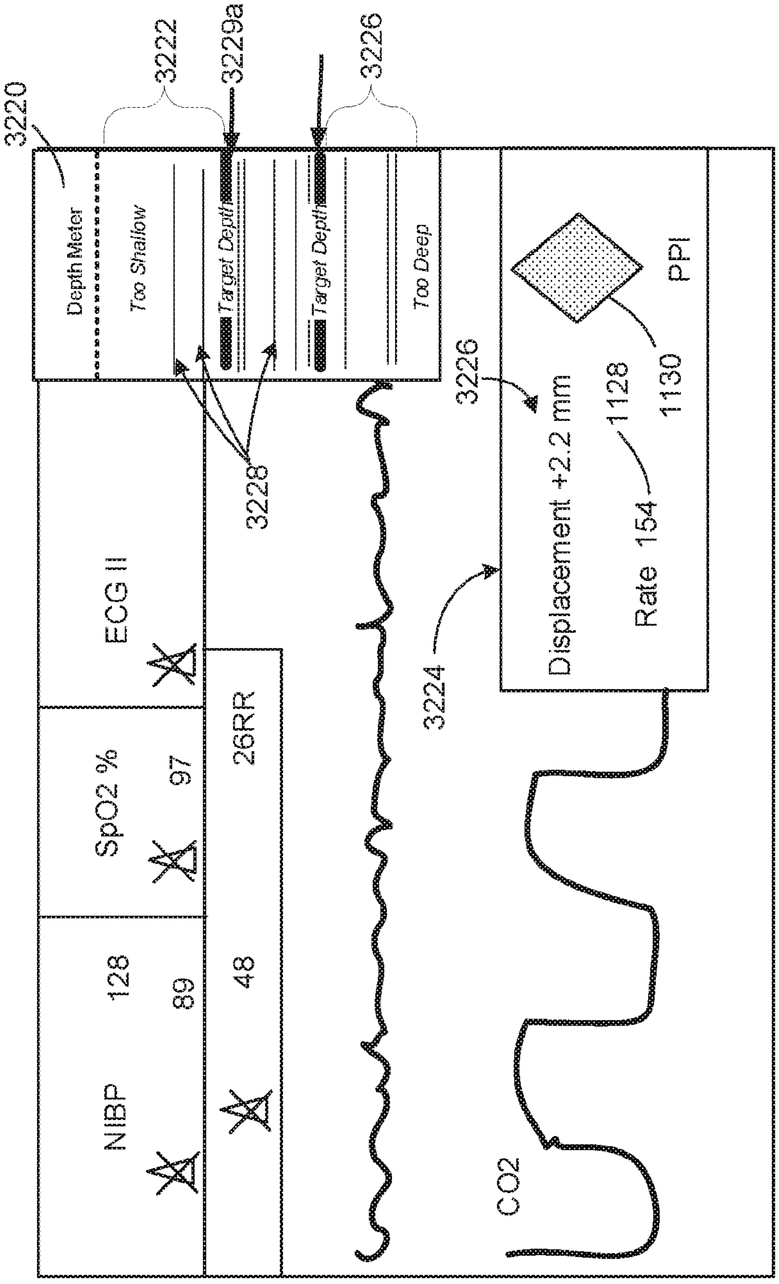

While the example shown in FIG. 32 displayed the target release 3236 and target depth 3240 as written instructions, in some additional examples, the target values can be displayed as a color or bar code corresponding to the range of preferred depths and heights. For example, multiple bars can be included on the depth meter 3220 providing an acceptable range of compression depth (e.g., upper and lower bounds of an acceptable range, as shown in FIG. 33) and an acceptable range of decompression heights or lift. Additionally, in some implementations, compressions and decompressions that have amplitudes outside of an acceptable range can be highlighted in a different color than compressions and decompressions that have depths within the acceptable range of compression depths.

The CPR chest compression information box 3224 may be automatically displayed when compressions and/or decompressions are detected (e.g., by a defibrillator, patient monitor and/or other feedback device). The information about the chest compressions and decompressions that is displayed in box 3224 includes rate 3228 (e.g., number of compressions and decompressions per minute) and displacement 3226 (e.g., depth of compressions on the downstroke expressed as negative values and lift distance of decompressions on the upstroke expressed as positive values in inches or millimeters; or vice versa where depth of compressions on the downstroke are expressed as positive values, and lift distance of decompressions on the upstroke are expressed as negative values). The rate and depth of compressions and decompressions can be determined by analyzing accelerometer readings. Displaying the actual rate and displacement data (in addition to, or instead of, an indication of whether the values are within or outside of an acceptable range) can also provide useful feedback to the rescuer. For example, if an acceptable range for chest compression depth is 25 to 60 mm, providing the rescuer with an indication that his/her compressions and decompressions are only 15 mm can allow the rescuer to determine how to correctly modify his/her administration of the chest compressions and decompressions (e.g., he or she can know how much to increase effort in reaching optimal compression and decompression thresholds).

The information about the chest compressions and decompressions that is displayed box 3224 also includes a perfusion performance indicator (PPI) 3230. The PPI 3230 is a shape (e.g., a diamond or other shape) with the amount of fill that is in the shape differing over time to provide feedback about both the rate and depth of the compressions and/or decompressions. When CPR chest compression is being performed adequately within a range of desired parameters, for example, at a rate suitable for active compression decompression such as of about 80 compressions and decompressions per minute (CPM) with the depth of each compression falling within a desirable range for active compression decompression, the entire indicator will be filled. As the rate and/or depth falls below or exceeds above acceptable limits, the amount of fill lessens. The PPI 3230 provides a visual indication of the quality of the CPR chest compression such that the rescuer can aim to keep the PPI 3230 completely filled.

In some additional embodiments, physiological information (e.g., physiological information such as end-tidal $CO_2$ information, arterial pressure information, volumetric $CO_2$, pulse oximetry (presence of amplitude of waveform possibly), and carotid blood flow (measured by Doppler) of the patient (and in some cases, the rescuer)) can be used to provide feedback on the effectiveness of the CPR chest compression delivered at a particular target depth. Based on the physiological information, the system can automatically determine a target CPR compression depth (e.g., calculate or look-up a new CPR compression target depth) or other CPR parameter (e.g., lift, rate, force) and, for example, provide feedback to a rescuer to increase or decrease the depth/rate of the CPR compressions and decompressions. Such feedback can include a sequence of desirable positions to guide the rescuer to adjust his/her body position and/or body motion to achieve a desirable combination of CPR compressions and decompressions (e.g., depth, lift, rate, force, velocity), rescuer fatigue, and/or physiological outcome. Thus, the system can provide both feedback related to how consistently a rescuer is administering CPR compressions and decompressions at a target parameter (e.g., depth, rate, lift, force, velocity), and feedback related to whether the target depth/rate/lift/force can be adjusted based on measured physiological parameters, along with how the rescuer may enhance his/her body positioning in administering CPR chest compression. If the rescuers do not respond to such feedback and continues performed sub-optimal CPR, the system can then display an additional message to switch out the person performing CPR chest compressions and decompressions.

In some implementations, the system regularly monitors and adjusts the target CPR parameter (e.g., depth, lift, rate, force, velocity). In order to determine a desirable target parameter, the system makes minor adjustments to the target CPR parameter and observes how the change in the parameter affects the observed physiological parameters before determining whether to make further adjustments to the target CPR parameter. For instance, the system can determine an adjustment in the target compression depth that is a fraction of an inch or a centimeter and prompt the rescuer to increase or decrease the compression depth by the determined amount. For example, the system can adjust the target compression depth by 2.5-10 mm (e.g., 2.5 mm to 5 mm or about 5 mm) and provide feedback to the rescuer about the observed compression depth based on the adjusted target compression depth. Then, over a set period of time, the system can observe the physiological parameters and, based on trends in the physiological parameters without making further adjustments to the target compression depth and at the end of the set time period, can determine whether to make further adjustments to the target compression depth.

The actual performance of the rescuer against the revised target can be monitored to determine when the rescuer's performance has fallen below an acceptable level, so that the rescuer and perhaps others can be notified to change who is performing the chest compressions and decompressions. The relevant parameters of patient condition discussed above with respect to the various screenshots can be made one of multiple inputs to a process for determining when rescuers who are performing one component of a rescue technique can be switched out with another rescuer, such as for reasons of apparent fatigue on the part of the first rescuer.

For example, the ACD device 1200 can provide an indication that instructs the rescuer to switch with another person in providing the ACD CPR treatment. In some implementations the indication instructs the rescuer to switch is based on whether the downstroke displacement falls within the target downstroke displacement range or whether the upstroke displacement falls within the target upstroke displacement range, as described in relation to FIGS. 26-33.

Figure 34:
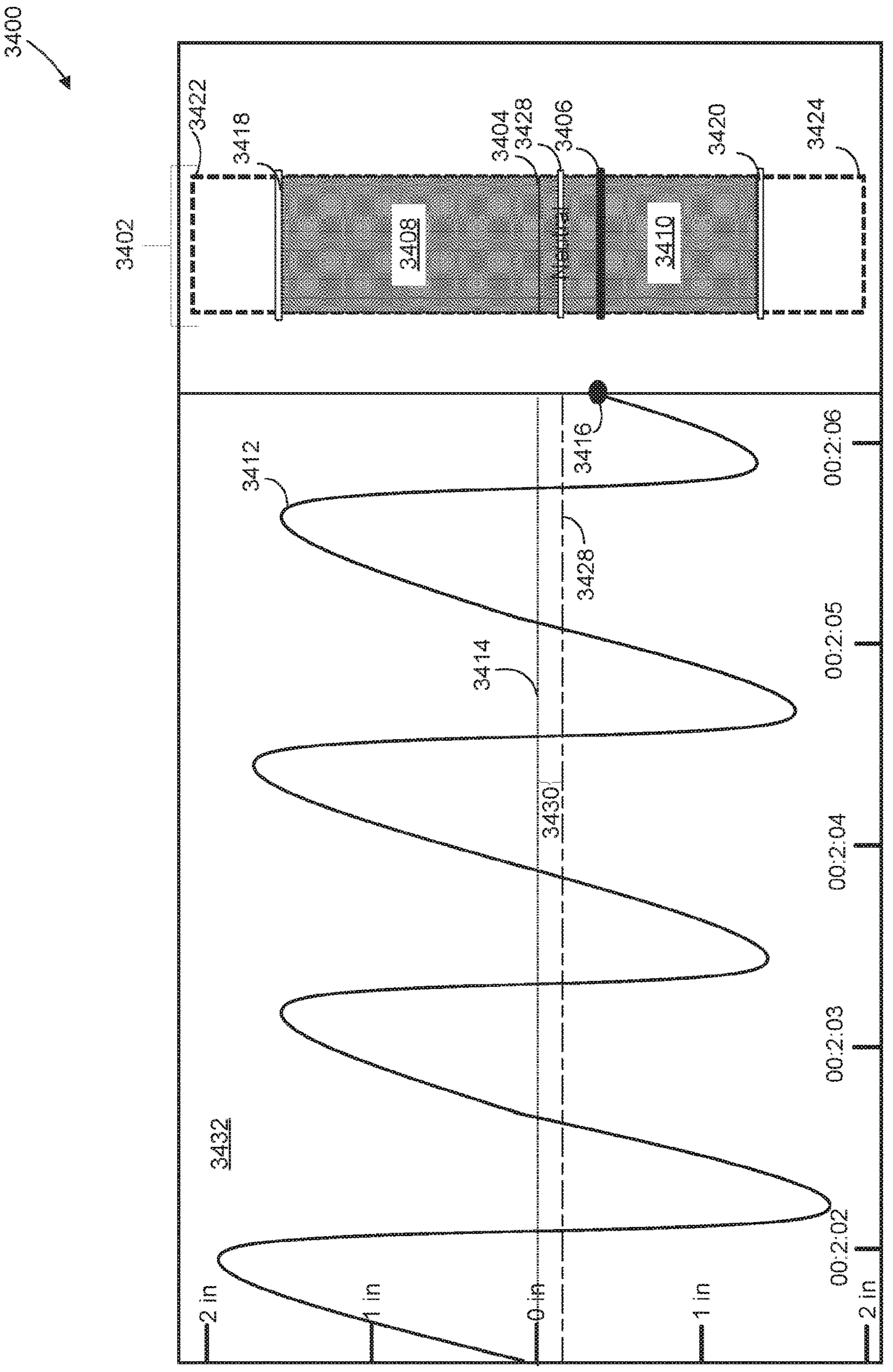
FIG. 34-36 show example screenshots of compression and decompression ranges and feedback provided by an ACD device during ACD CPR treatment.
Figure 35:
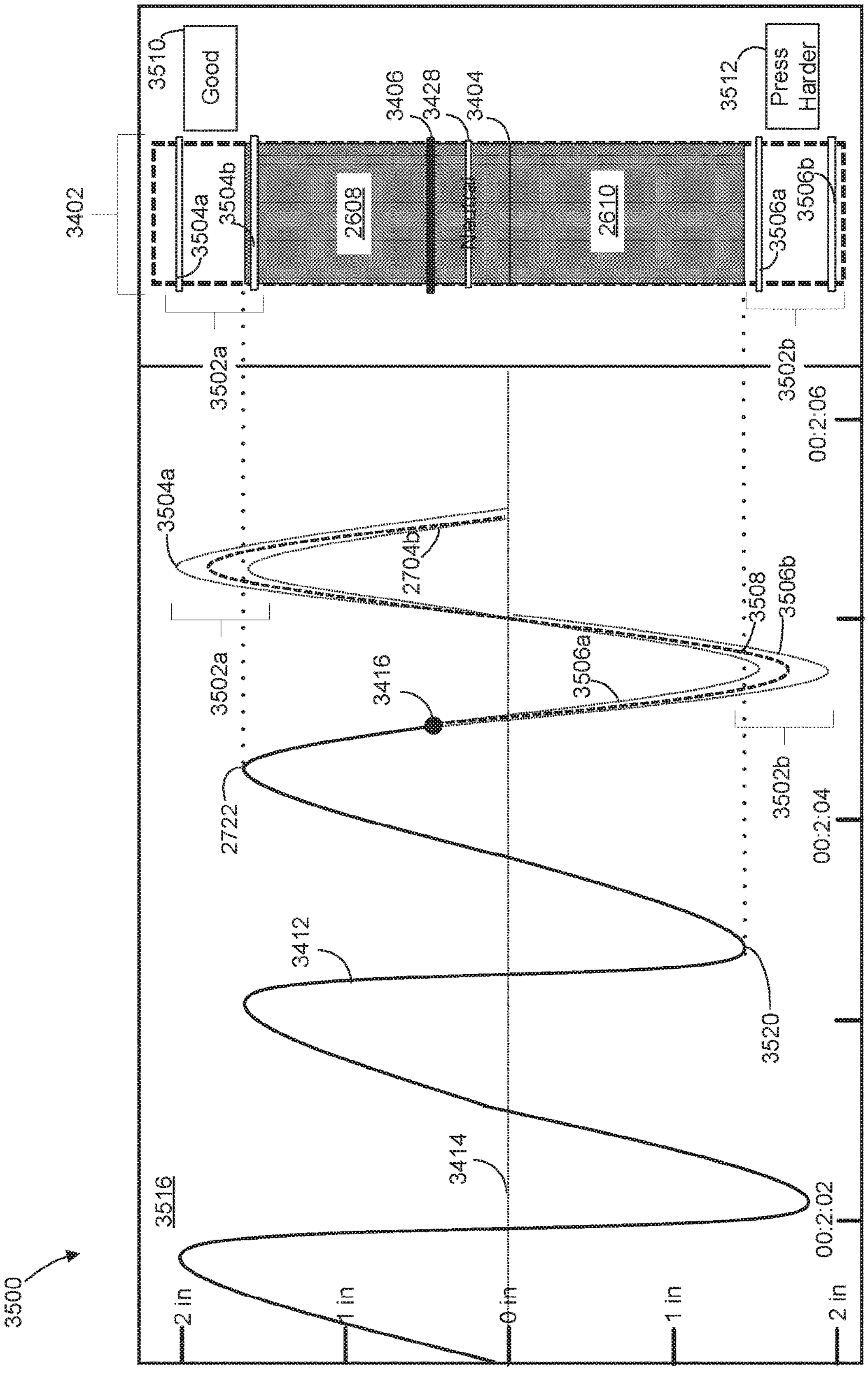
Figure 36:
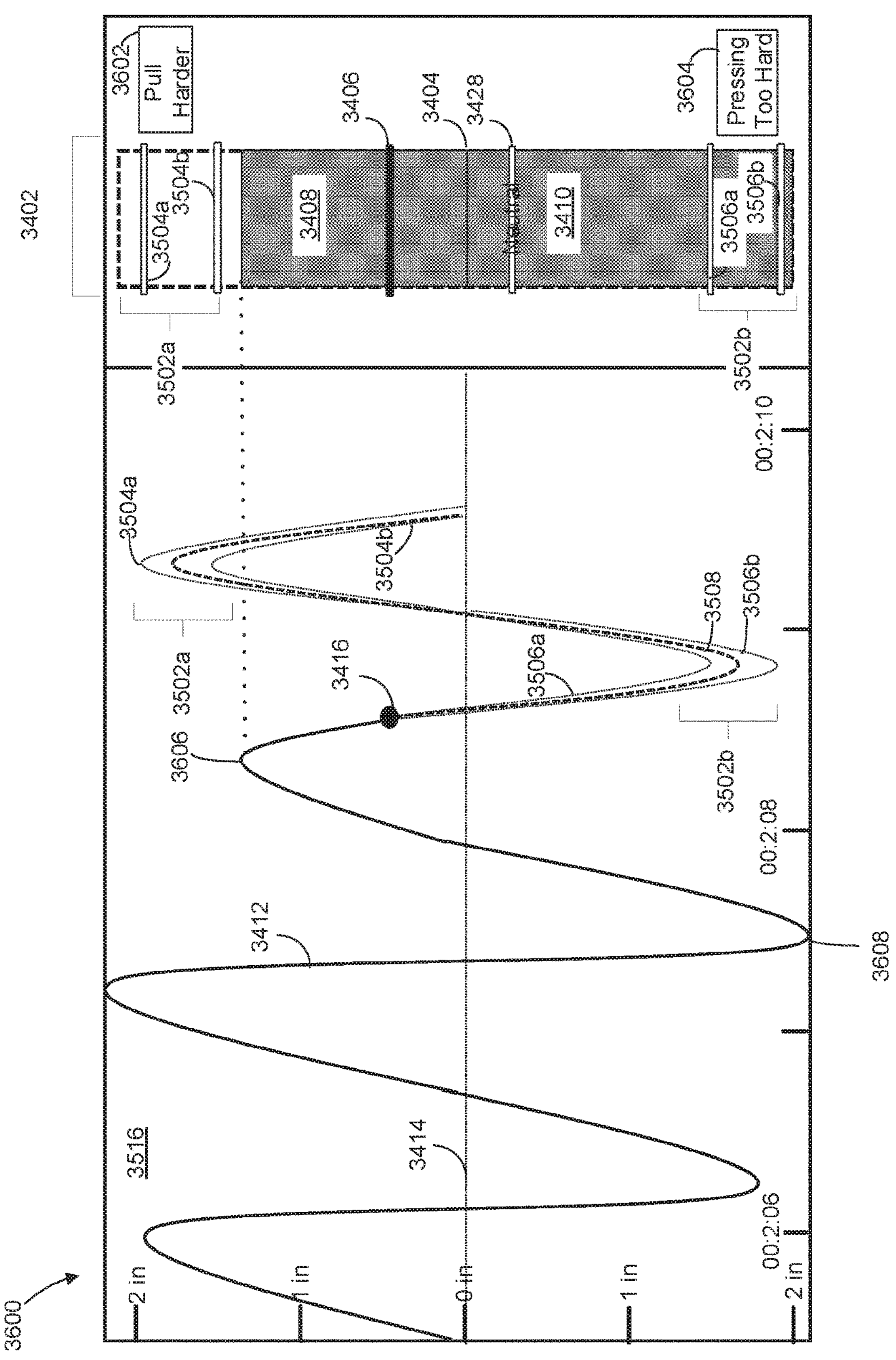

FIG. 34-36 each show example screenshots of user interfaces of the ACD device 1200, or other appropriate devices that provide CPR feedback, of compression and decompression ranges and feedback provided by an ACD device, such as ACD device 1200 or 100, or other CPR feedback device, during ACD CPR treatment. Turning to FIG. 34, an example screenshot 3400 of a user interface for providing CPR feedback shows a compression waveform 3412 and a depth meter 3402.

The depth meter 3402 provides feedback for each of upstroke displacement (e.g., lift on chest decompression) and downstroke displacement (e.g., depth on chest compression). The depth meter 3402 can provide a maximum decompression range (e.g., range 2622). The depth meter 3402 can show a visualization of target compression and decompression (e.g., depth on downstroke and lift on upstroke, respectively) displacements. In this document, a target value for a compression (e.g., depth on downstroke) or a decompression (e.g., lift on upstroke) includes a desired value (e.g., magnitude) of the displacement of the decompression or the compression of the patient's chest on the next compression or decompression of the current compression cycle of the CPR treatment.

In some implementations the displacement can be shown relative to an estimated neutral position of the patient, such as the neutral position estimated as described in relation to FIGS. 12-23. The neutral position can be represented by line 3404 in the depth/displacement meter. In some implementations the target compression and decompression displacements can be based on the zero point. In some implementations the estimate of neutral position 3404 can be fixed near to the center of the displacement meter 3402, even when the estimate of the neutral position changes. Fixing the estimate of neutral position 3404 may be beneficial in instances where it may be preferable for the user interface to be simplified, otherwise an estimate of neutral position that moves along the meter 3402 may be confusing or otherwise challenging for a user to easily interpret in an intuitive manner. In some implementations, the position of the neutral position bar 3404 moves as the estimation of the neutral position is updated, and the center of the depth meter 3402 represents the zero point, or an estimate of the zero point. The difference between the estimated zero point and the estimated neutral position can be shown based on the placement of the neutral position bar 3404. In FIG. 34, the estimated neutral position is shown at the center of the depth meter 3402.

The target decompression 3422 and target compression 3424 can each be determined (e.g., independently) based on the estimation of the neutral position. In some embodiments, the size of the meter 3402 can generally remain static, and different compression targets and decompression targets can be shown by altering a scaling factor of the depth meter 3402. In some implementations, the scaling factor is fixed upon commencement of CPR treatment, and the range bars (e.g., bars 3504, 3506 shown in FIG. 35) are moved to show target decompression and compression displacements, respectively. For example, position 3422 on the displacement meter 3402 can indicate 2 inches of lift/decompression for treatment of a first patient, and 1 inch for treatment of a second patient. However, during treatment of the first patient, the position 3422 can remain visually the same as representing 2 inches, even if the target decompression displacement is changed. Though, in some implementations, the depth meter 3402 can be rescaled during treatment, so that the position 3422 represents the actual target decompression displacement, and the position 3424 represents the actual target compression displacement.

The displacement meter 3402 is configured to show a current displacement 3406 of the patient's chest during CPR (compression and decompression) cycles. The bar 3406 moves up and down the displacement meter 3402 as the compressions and decompressions are performed. In some implementations the displacement meter 3402 shows a prior compression depth (e.g., downstroke displacement) and a prior decompression depth (e.g., upstroke displacement). For example, shaded area 3408 shows the decompression displacement of the prior compression cycle. The displacement reached is shown by decompression bar 3418. The bar 3418 and prior decompression displacement bar 3420 can be compared to the target 3422 to determine whether the correct compression or decompression displacement is being reached. The prior displacement bars 3418, 3420 can be used to adjust the compression and/or decompression of the current compression cycle.

The displacement meter 3402 is configured to show a visual indication of the downstroke displacement 3410, the upstroke displacement 3408, and the estimated neutral position 3428 relative to one another. In some implementations a difference 3430 between the neutral position that is estimated and the zero point 3414 can be shown on either or both of a waveform frame 3432 (described below) and the compression meter 3402. In some implementations, the ACD device 1200 is configured to determine a past (e.g. in time or in compression cycles) estimate of neutral position of the chest, a past downstroke displacement and a past upstroke displacement value. In some implementations the display provides a visual indication of the current downstroke displacement, the current upstroke displacement, the past downstroke displacement, and the past upstroke displacement together on the displacement meter 3402.

In some implementations the visual indication of the displacement meter 3402 includes a color or highlight change of at least a portion of the display based on whether the downstroke displacement falls within the target downstroke displacement range or whether the upstroke displacement falls within the target upstroke displacement range. For example, shaded regions 3408, 3410 can be different colors, flash, etc. when the proper target is achieved. In some implementations the visual indication includes a color or highlight change of at least a portion of the display based on whether the downstroke displacement falls outside the target downstroke displacement range or whether the upstroke displacement falls outside the target upstroke displacement range.

The actual target ranges **3502*a*, 3502*b*** can vary. For example, the target downstroke displacement range and/or the target upstroke displacement range can be between 0.5 and 3.0 inches, between 0.5 and 1.5 inches, between 1.5 and 2.5 inches, between 2.0 and 2.4 inches, and so forth.

In some implementations there is no visual indication on the display of the user interface showing how at least one of the updated estimate of neutral position, the updated target downstroke displacement range, and the updated upstroke target displacement range has been updated. That is, the visible dimensions, targets and/or other aspects of the displacement meter 3402 may substantially remain visually the same (e.g., despite targets changing based on updated estimates of the neutral position), for the benefit of having a simplified user interface.

FIG. 34 also shows a displacement waveform 3412 in the waveform frame 3432, which shows compression displacement and decompression displacement (both measured on the vertical axis) over time (measured on a horizontal axis). The axis 3414 generally represents the estimated zero point of zero displacement. The waveform 3412 can show the displacements and frequency of prior compression cycles to assist a user in adjusting compression and decompression displacements and frequency, as desired. The trace can be generated as treatment is performed, showing an elapsed time and displacement values. Like the depth meter 3402, the scaling can either remain fixed during treatment of a patient or adjust dynamically if desired (e.g., if the waveform 3412 exceeds the current maximum or minimum values). In some implementations the waveform of the entire treatment can be displayed and saved in a log file related to the patient for later review of the case, for example, by an administrator and/or physician. In some implementations, a portion of the waveform can be shown (e.g., the most recent 20 seconds, 10 seconds, 5 seconds, etc.). Portions of the waveform can be saved to log files, such as in response to a treatment event (e.g., a pause in treatment, compression or decompression exceeding respective threshold values, a sudden change in chest compliance or neutral position estimate, etc.).

The waveform 3412 includes an indicator 3416 that shows a current displacement of the patient's chest (e.g., measured by the position sensor of ACD device 1200 or estimated from acceleration and displacement sensors as previously described). In some implementations the displacement bar 3406 tracks the indicator 3416 in real-time. As time progresses, the waveform 3412 trace is drawn (e.g., from right to left), and the indicator represents the actual current displacement of the patient's chest as treatment is performed. In some implementations, to compensate for processing delay (e.g., of neutral position and/or other position estimations), the indicator 3416 can represent a prediction of the patient's chest displacement in the near future (e.g., 5 ms, 10 ms, etc.) so that the position appears to be synchronized with the compressions performed by the rescuer.

Turning to FIG. 35, an example screenshot 3500 of a user interface of the ACD device 1200, or other appropriate feedback device, that shows a more complex implementation of the screenshot 3400 of FIG. 34. The depth meter 3402 includes ranges **3502*a*, 3502*b* for decompression and compression, respectively. Range 3502*a* can be referred to in multiple ways, such as a target decompression range, a target upstroke range, a target upstroke displacement range, a target lift displacement range, and so forth. Range 3502*b*** can be referred to in multiple ways, such as a target compression range, a target downstroke range, a target downstroke displacement range, a target compression depth range, and so forth.

The ranges **3502*a*, 3502*b* can be adjusted in response to updated estimation(s) of the neutral position 3404. In some implementations the ranges 3502*a*, 3502*b* can begin as larger ranges, but narrow over time as the neutral position estimate improves. For decompression range 3502*a*, a maximum target decompression 3504*a* and a minimum target decompression 3504***b* are shown. When the patient's chest is decompressed to a displacement between values 3504*a*, 3504*b*, the ACD device 1200 can present positive feedback. A text box 3510 including the feedback of "good" is shown in screenshot 3500 because the prior decompression (shown by shaded area 3408) shows a prior decompression displacement that is inside the target range 3502*a*. So, the shaded area 3408 may have a color (e.g., green) that indicates that decompressions (e.g., single decompression, average decompression over multiple cycles, etc.) are within the target range. However, alternative feedback can be used. For example, a sound can indicate when proper decompression is reached, such as a positive-sounding tone, a voice saying "good" or similar, and so forth.

Similarly, the displacement meter 3402 shows a decompression range 3502*b*, including a maximum target decompression 3506*b* and a minimum target decompression 3506*a*. When the patient's chest is compressed to a displacement between values 3506*a*, 3506*b*, the ACD device 1200 can present positive feedback. A text box 3512 including the feedback 3512 of "press harder" is shown in screenshot 3500 because the prior decompression (shown by shaded area 3410) shows a prior compression displacement that is outside the target range 3502*a*. Here, the shaded area 3410 shows that the compression 3520 did not reach far enough, and that the next compression should have a greater displacement downward so as to fall within the target downstroke displacement range. Hence, the shaded area 3410 may have a color (e.g., red, yellow) that indicates that the compression is outside of the target range, and that the next compression should be appropriately adjusted. However, alternative feedback can be used. For example, a sound can indicate when improper compression is reached, such as a tone, a voice saying "press harder" or similar, and so forth.

In general, when within the target range, the corresponding shaded area 3408, 3410 may have a color (e.g., green) that indicates that compression(s) or decompression(s) are within the target range and that the manner in which compression(s) or decompression(s) are given should be maintained. When outside of the target range, the corresponding shaded area 3408, 3410 may have a color (e.g., red, yellow) that indicates that compression(s) or decompression(s) are outside of the target range and need to be adjusted, so as to fall within the target range in subsequent cycles.

As seen in FIG. 35, the most recent compression displacement value that was reached 3520 is shown by shaded area 3410, and the most recent decompression value 3522 reached is shown by shaded area 3408. Regions 3408 and 3410 are updated as the next cycle begins. In some implementations these regions are presented as a "ghost" on the bar, and appear faded or deemphasized compared to the current displacement measurement, so as to show to the user that they are past downstroke and upstroke measurements. As the current displacement bar 3406 moves up and down the displacement meter 3402, the shaded areas 3408, 3410 are redrawn, and the old areas fade away or otherwise disappear from the user interface if they are too far into the past. The current displacement can also be referred to as the current upstroke displacement, the current downstroke displacement, the updated upstroke displacement, the updated downstroke displacement, and so forth.

The ranges 3502*a*, 3502*b* can be updated by the ACD device 1200 in response to a variety of detected circumstances. For example, the ACD device can adjust at least one of the target downstroke displacement range 3502*b* and the target upstroke displacement range 3502*a* based on the updated estimate of neutral position. The ACD device 1200, or other associated feedback device can adjust the target downstroke displacement range 3502*b* from an initial target downstroke displacement range to an updated target downstroke displacement range based on whether the downstroke displacement 3410 falls within the target downstroke displacement range, and/or based on the updated estimated of neutral position. Similarly, the ACD device 1200 can adjust the target upstroke displacement range 3502*a* from an initial target upstroke displacement range to an updated target upstroke displacement range based on based on whether the upstroke displacement 3408 falls within the target upstroke displacement range, and/or based on the updated estimated of neutral position.

In some implementations the updated target downstroke displacement range 3502*b* is adjusted from an initial target downstroke displacement range after a predetermined interval (e.g., number of compression cycles, elapsed time, etc.). Similarly, in some implementations, the updated target upstroke displacement range 3502*a* is adjusted from an initial target upstroke displacement range after a predetermined interval (e.g., number of compression cycles, elapsed time, etc.). Such an update in target downstroke displacement range and/or target upstroke displacement range may or may not be based on an updated estimate of the neutral position of the chest. For either the upstroke or the downstroke displacement, the target ranges 3502*a*, 3502*b* can be shifted to represent a range at greater magnitudes, smaller magnitudes, compress the range itself, or expand the range itself (e.g., in response to estimating the neutral position of the chest of the patient).

In some implementations, at least one of the target downstroke displacement range 3502*b* and the target upstroke displacement range 3502*a* can be based on a clinically accepted guideline. However, the target downstroke displacement range 3502*b* can be greater or less than the clinically accepted guideline, and the target upstroke displacement range 3502*a* can be greater or less than the clinically accepted guideline.

In some implementations the ACD device 1200, or other associated feedback device, is configured to determine how the chest of the patient has remodeled based on the estimated neutral position. The feedback signals received from the sensors can cause the display to provide an indication of patient chest remodeling. For example, the feedback device may simply provide an indication that substantial chest remodeling has occurred due to the CPR treatment, so that the user is aware of the change in chest mechanics. Such information may be a cue for the user to alter the manner in which CPR is provided, for example, lessen the force that is applied to the patient to reduce the risk of injury, or provide more or less decompression treatment to the patient. As discussed above, when the neutral position of the chest has depressed significantly due to chest remodeling, then it may be desirable to reduce the depth of compressions on downstroke and/or increase the lift of decompression on upstroke. In some cases, the feedback device may provide more instructional information for the user to adjust the target downstroke displacement and/or target upstroke displacement, or adjust or aspects of the ACD treatment.

FIG. 35 further shows the waveform 3412 of the treatment, as described in relation to FIG. 34. The indicator 3416 can show the current displacement value of the patient's chest. In some implementations the waveform can be traced from left to right. The elapsed time is shown on the horizontal axis, and the displacement is shown on the vertical axis. The indicator 3416 is mirrored by the current displacement bar 3406 on the displacement meter 3402, and the indicator 3416 is located near a center of the waveform frame 3516. To the right of the indicator 3416, a target compression cycle displacement is plotted against elapsed time. Here, the current time is about 2:04.5. To the right of the indicator, the target displacement trace 3508 is plotted. A maximum target displacement value 3506*a* for both compression and decompression is shown as a dotted line above the target 3508. A minimum target displacement value 3506*b* for both compression and decompression is shown as a dotted line below the target 3508. By showing the target displacement ranges as a waveform, the ACD device 1200, or other feedback device, guides the rescuer for both compression and decompression displacements and pace where the objective is for the rescuer to administer compressions and decompressions in a way that stays within the maximum and minimum set forth by the target ranges. The total range of decompression displacements is shown as 3502*a* in both the depth bar 3402 and the waveform frame 3516. Similarly, total range of compression displacements is shown as 3502*b* in both the depth bar 3402 and the waveform frame 3516.

Similarly to the target displacements of FIG. 34, the target range values 3506*a*, 3506*b* and 3504*a*, 3504*b* may be determined in response to estimating the neutral position of the patient. For example, the ranges 3502*a*, 3502*b*, which determine the values of the displacements 3506*a*, 3506*b* and 3504*a*, 3504*b*, can be updated on a per-compression cycle basis, after a series of compression cycles (e.g., 2-5 compression cycles) after a particular period of time, etc. The updated values of the ranges 3502*a*, 3502*b* can be determined based on the current and/or prior estimated neutral position of the patient's chest. For example, the updated ranges 3502*a*, 3502*b* can be based on the current neutral position estimation, a cycle-windowed and/or time-windowed average of neutral position estimations, etc. As the neutral position is estimated, the target waveform 3508 is updated and further projected in front of the user's current position and time. Here, a single cycle is shown in the projection. However, in some implementations, multiple compression cycles can be projected and rescaled as needed.

The feedback of the trace 3412 and the depth meter 3402 can each provide guidance (e.g., to the rescuer, to the processing device) for how to modify the ACD CPR treatment so that the downstroke displacement falls within the target downstroke displacement range 3502*b* prior to the upstroke displacement falling within the target upstroke displacement range 3502*a*. For example, as previously described, a displacement meter can instruct the rescuer to push harder, pull harder, press more softly, pull more softly, change a compression frequency, and so forth.

Turning to FIG. 36, an example screenshot 2800 of a user interface of the ACD device 1200, or other appropriate feedback device, shows a different implementation of the screenshot 3500 of FIG. 35. Here, the shaded areas 3408, 3410 represent different prior compression and decompression displacement values that were reached during the prior compression cycle. The prior decompression value 3606 was too small, and the feedback 3602 is adjusted to instruct the rescuer to "pull harder." While the instruction can update each compression cycle, a moving average of two or more cycles can be used for updating the instruction. For example, the instruction might be updated to read "pull harder" only if the decompression target is not reached for 3 cycles in a row, based on a moving average of the previous 3 cycles (e.g., or 2, 4, 5, etc. cycles), or some combination of such determinations.

Similarly, as shown in FIG. 36, the prior compression value 3608 was too large, and the feedback 3604 is adjusted to instruct that rescuer is "pressing too hard." While the instruction can update each compression cycle, a moving average of two or more cycles can be used for updating the instruction. For example, the instruction might be updated to read "pressing too hard" only if the compression target is exceeded for 3 cycles in a row, based on a moving average of the previous 3 cycles (e.g., or 2, 4, 5, etc. cycles), or some combination of such determinations.

Figure 37:
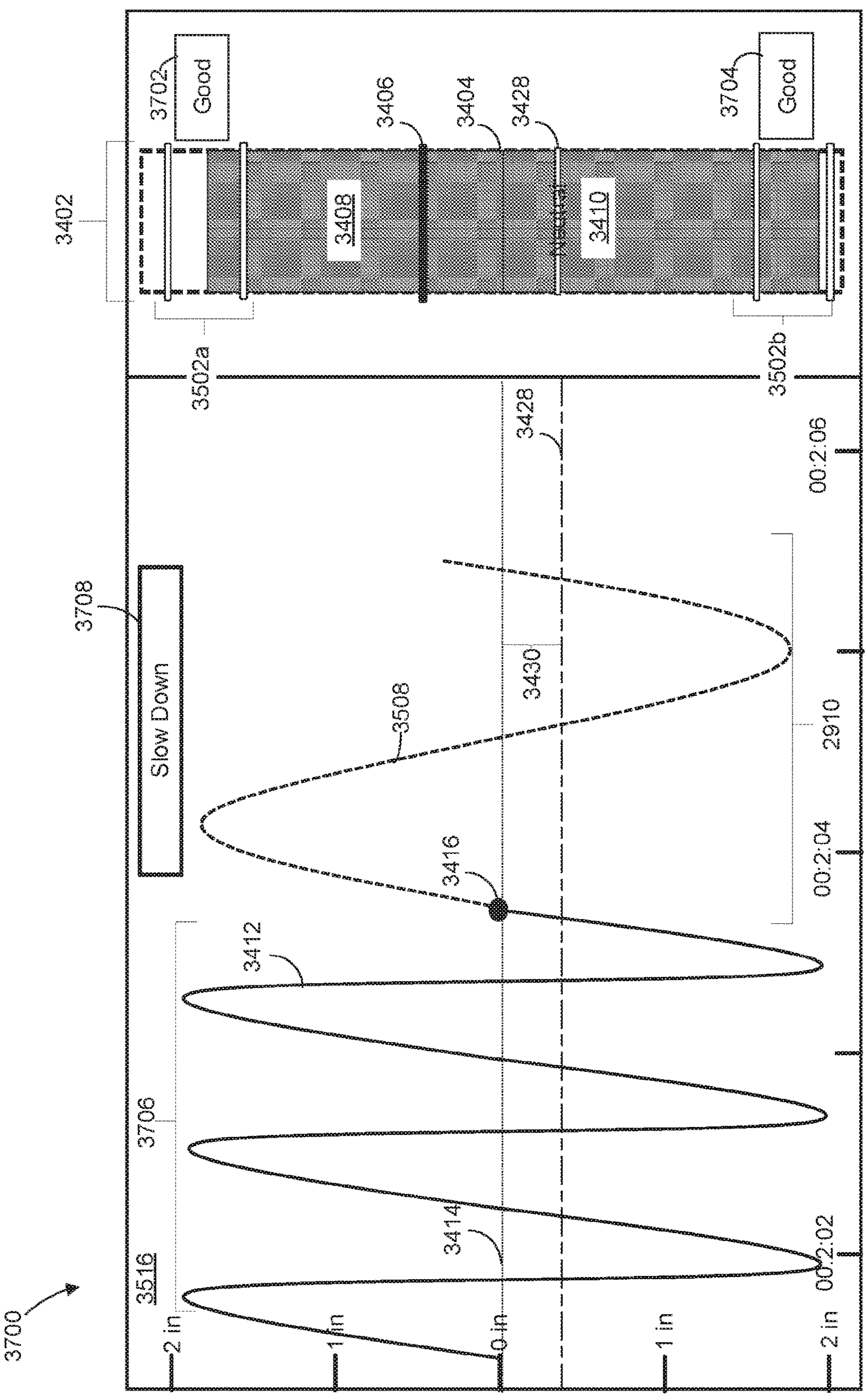
FIGS. 37-38 show example screenshots of compression frequency feedback provided by an ACD device during ACD CPR treatment.
Figure 38:
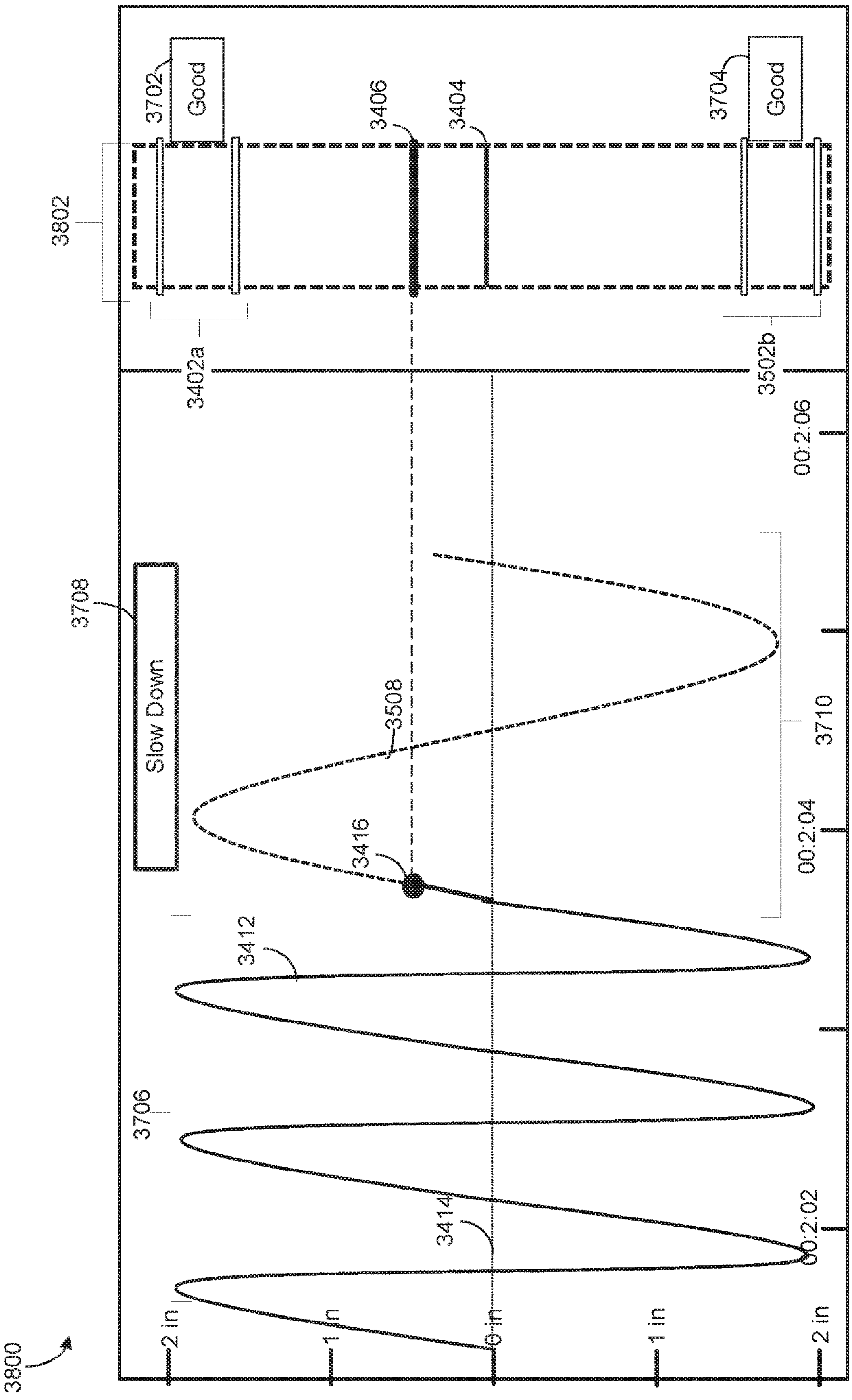

FIGS. 37-38 show example screenshots of compression frequency feedback provided by an ACD feedback device during ACD CPR treatment. Turning to FIG. 37, screenshot 3700 of a user interface of the ACD feedback device shows waveform 3412, projected displacement waveform 3508, indicator 3416, and compression bar 3402, as described in relation to FIGS. 34-36. In addition to displacement feedback, the ACD feedback device can be configured to provide compression cycle frequency feedback (also referred to as pacing feedback).

The measured trace 3412 and the estimated trace 3508 are shown on either side (e.g., prior and future) of current displacement value 3416. The depth meter 3402 indicates that the prior compression and decompression displacement values were both within the target ranges 3502*b*, 3502*a*, respectively, and reports "good" feedback in boxes 3702, 3704. This can also be seen by shaded areas 3408, 3410 extending within the ranges 3502*a*, 3502*b* shown on the depth meter 3402.

However, the frequency of the compression cycles in this example have been too fast. The completed compressions are shown in waveform by portion 3706 to have a shorter period than the period of the projected waveform 3508, shown by portion 3710. A feedback box 3708 appears (or can remain on the interface) instructing the rescuer to "slow down." Alternatively, the instruction can emit a tone, a metronome, an audio instruction, etc. The instruction 3708 can also read "good pace," "too fast," "too slow," "speed up," or other such variations of this frequency feedback.

In some implementations the instructions 3708 provides an indication that instructs the rescuer of a hold period following downstroke or upstroke. In some implementations the display provides a visual indication of a hold period following downstroke or upstroke. For example, in some cases, it may be preferable for a chest compression to be held at the maximum compression depth on downstroke for a brief period (e.g., 50-500 msec, approximately 100 msec), and/or a decompression to be held at the maximum decompression lift on upstroke for a brief period (e.g., 50-500 msec, approximately 100 msec). Such hold periods may help to enhance circulation to and from the heart.

In some implementations the ACD feedback device provides an indication that instructs the rescuer to adjust a velocity of downstroke or velocity of upstroke. For example, the speed can be changed to hasten or slow the compression cycle and change the frequency of compressions. In certain instances, it may be preferable to increase the velocity on upstroke to quickly generate negative intrathoracic pressure, so as to enhance venous return of blood to the heart and improve overall circulation.

FIG. 38 includes a screenshot 3800 of a user interface of the ACD feedback device showing an alternative example of the screenshot 3700 of FIG. 37. In this example, a displacement meter 3802 operates similarly to displacement meter 3402, except that there are no shaded regions.

Figure 39:
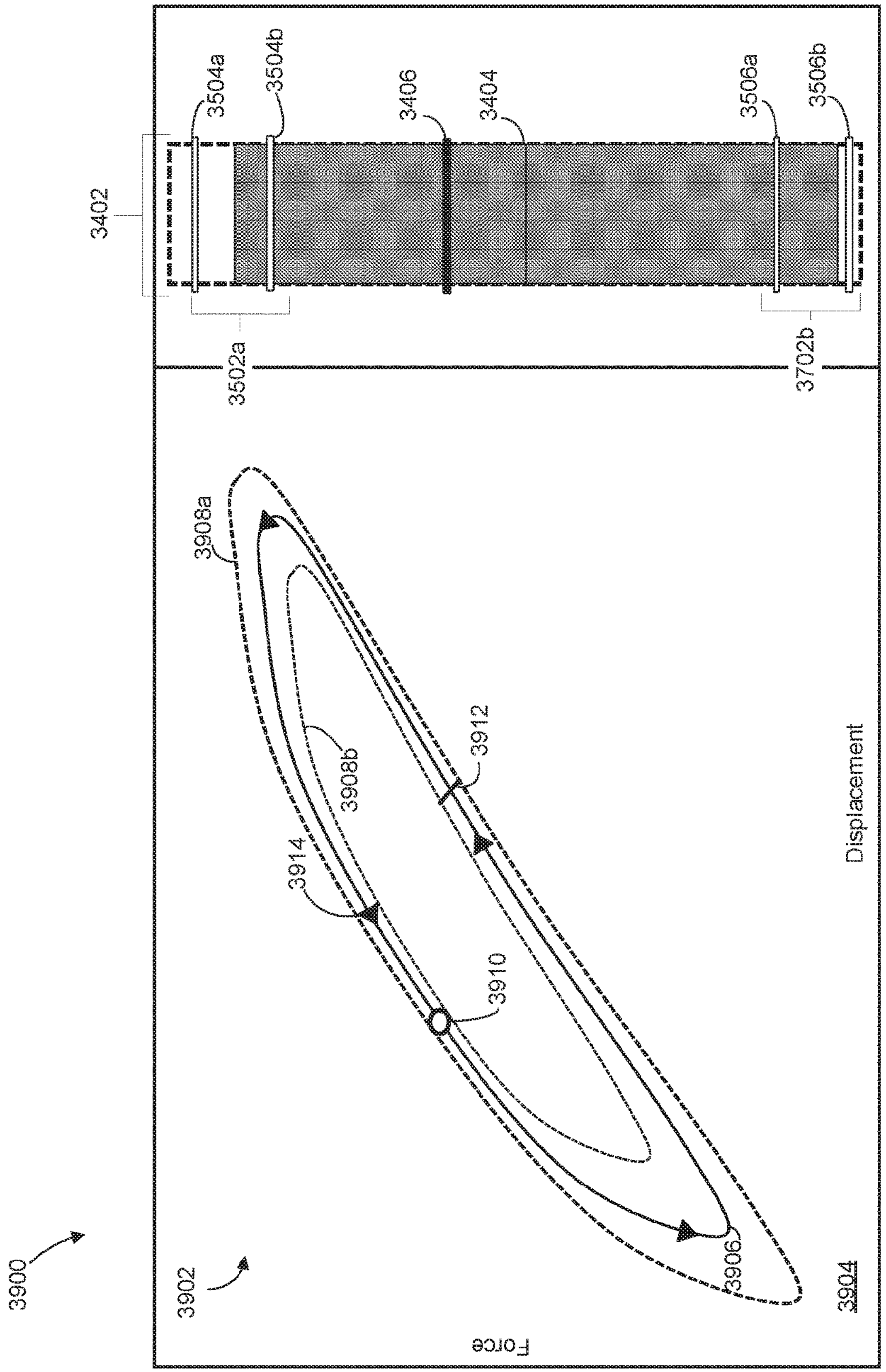
FIG. 39 shows an example of a normalized force-displacement graph for providing feedback by an ACD device during ACD CPR treatment.

FIG. 39 shows an example screenshot 3900 of a user interface of the ACD feedback device including a normalized force-displacement graph for providing feedback by an ACD feedback device during ACD CPR treatment. Depth meter 3402 is shown, similar to FIGS. 34-38. A normalized force-displacement graph 3902 is shown in a graphic pane 3904 adjacent to the depth meter 3402.

The graph 3902 shows a compression cycle as a circuit 3906. Indicator 3910 moves around the circuit 3906 in a clockwise direction as shown by arrows 3914 (though a counterclockwise direction can be used). In some implementations the graph 3902 is a scaled version of the graph 1500 of FIG. 15, in which each axis of the graph is scaled to make the circuit 3906 appear circular. As compressions are performed, the force and displacement relationship is determined and plotted on the graph 3902. A first tolerance value 3108*a* is shown as an outer ring and a second tolerance value 3908*b* is shown as an inner ring. The rescuer can view the graph 3902 and maintain the correct force and displacement to keep the indicator 3910 on the track that is shown between the second tolerance value 3908*b* and the first tolerance value 3908*a*. The line 3912 shows a beginning of a new cycle. In some implementations the displacement meter 3402 can be replaced with an effort meter showing a floating effort range that is updated as the neutral position estimation is updated.

Figure 40:
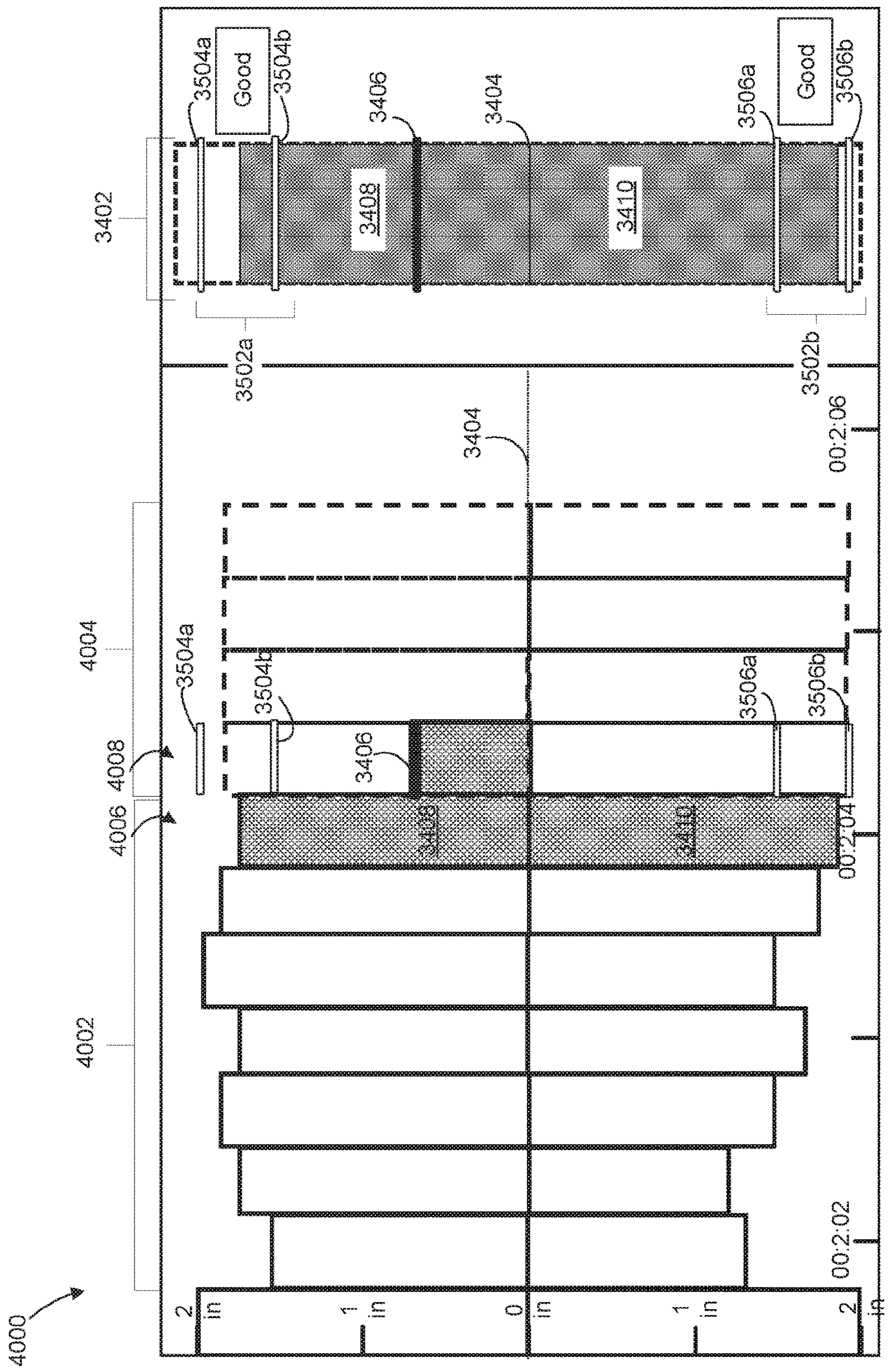
FIGS. 40-41 show examples of prior compression cycle upstroke and downstroke ranges, current compression cycle upstroke and downstroke ranges, and target compression cycle upstroke and downstroke ranges displayed as feedback during ACD CPR treatment.
Figure 41:
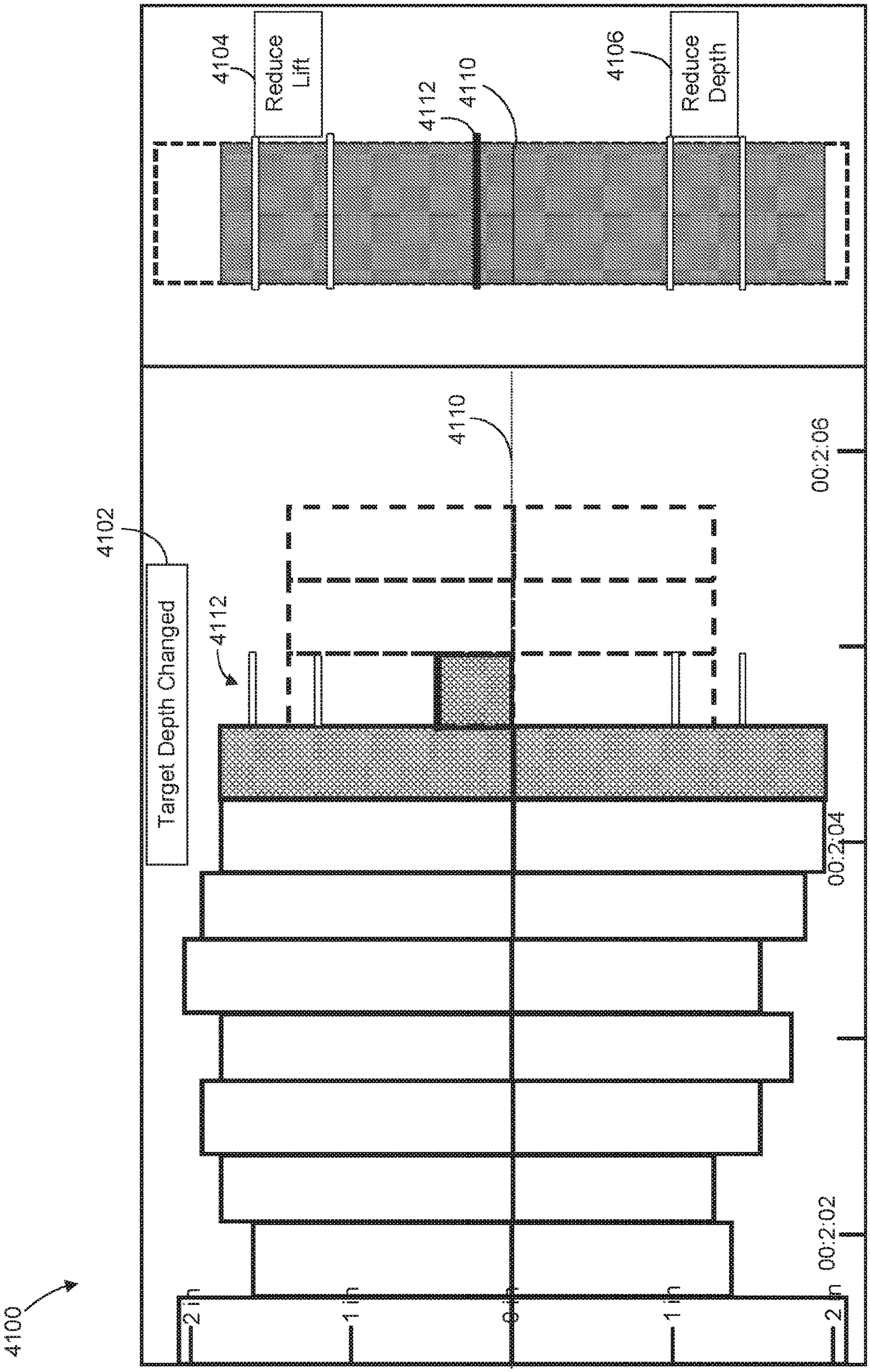

FIGS. 40-41 show example screenshots 4000, 4100 of user interfaces of the ACD feedback device. Screenshots 4000, 4100 each show examples of prior compression cycle upstroke and downstroke ranges, current compression cycle upstroke and downstroke ranges, and target compression cycle upstroke and downstroke ranges displayed as feedback during ACD CPR treatment.

Turning to FIG. 40, a series of displacement meters are shown as bar graphs along with the displacement meter 2402 on the right of the interface. Prior compression cycles are shown as prior displacement meters 4002, and target compression and decompression displacement values are shown as dashed displacement meters 4004 to indicate where the provider of ACD treatment should aim. As time elapses, in this example, the meters each move from right to left. A current displacement meter 4008 is shown near the center of the screenshot 4000. The meter 4008 can mirror the displacement meter 3402, including ranges 3502*a*, 3502*b*, and range bars 3504*a*, 3504*b*, 3506*a*, 3506*b*. However, shaded areas 3408, 3410 are not shown on the current displacement meter 4008, but a prior displacement meter 4006 to the left of the current displacement meter shows shaded areas 3408, 3410. The compression and decompression displacements of the prior cycle are shown in meter 4006. Once the current cycle is completed, meter 3206 loses the shading of regions 3408, 3410, which are updated to be included in the meter 4008 (which becomes the prior meter 3406). Such a view assists a rescuer in comparing a current compression cycle to prior compression cycles and prepare for target compression and decompression displacement values, which can be updated based on an estimation of the neutral position (as described above in relation to FIGS. 12-23).

In some implementations the target ranges 4004 and the prior ranges 4002 can be re-scaled if needed depending on the estimated neutral position and target and measured displacement values. Here, line 3404 generally represents the estimated zero point.

Turning to FIG. 41, screenshot 4100 shows another version of the user interface of the ACD feedback device shown in screenshot 4000. Here, the target displacements for one or both of compression and decompression have changed, such as because of a change in the estimated neutral position of the patient. An indication 4102 can appear informing the rescuer that the targets have been updated. The new target ranges can be shown on the user interface on the current displacement meter 4112. Instructions 4104, 4106 can appear to inform the user that the next compression or decompression should be changed. This can change feedback that reported "good" to "reduce lift" 4104 because of the change in range, even if the prior target was reached at the time it was shown. Line 4110 generally represents the estimated zero point. Line 4112 generally represents the current displacement of the patient's chest.

In some implementations, user interfaces similar to the screenshots 3400, 3500, 3600, 3700, 3800, 3900, 4000, and 4100 of FIGS. 34-41 can be shown on the display of the ACD device 1200. In some implementations, the display is located on a handle of the ACD device. The handle, such as handles 108 described in relation to FIG. 1, can provide haptic feedback to provide the guidance for how to modify the ACD CPR treatment. In some implementations, user interfaces similar to the screenshots 3400, 3500, 3600, 3700, 3800, 3900, 4000, and 4100 can be shown on a patient monitor (e.g., defibrillator/monitor, monitor without defibrillating functionality) of the ACD device 1200, the patient monitor having at least one sensor for obtaining physiological data from the patient. In some implementations, user interfaces similar to the screenshots 3400, 3500, 3600, 3700, 3800, 3900, 4000, 4100 can be shown on a portable computing device (e.g., tablet, phone, etc.), where the portable computing device may be in communication with an ACD device and/or patient monitor. For example, the ACD device or patient monitor may receive signals from the motion sensor(s) or force sensor(s) associated with the ACD treatment, and processing of those signals may occur on the ACD device or patient monitor, and results of the processing may be sent to the portable computing device. Or, the portable computing device may receive data from the motion sensor(s) or force sensor(s) associated with the ACD treatment and may itself perform the processing necessary to produce the feedback for user interfaces for feedback described herein.

Figure 42:
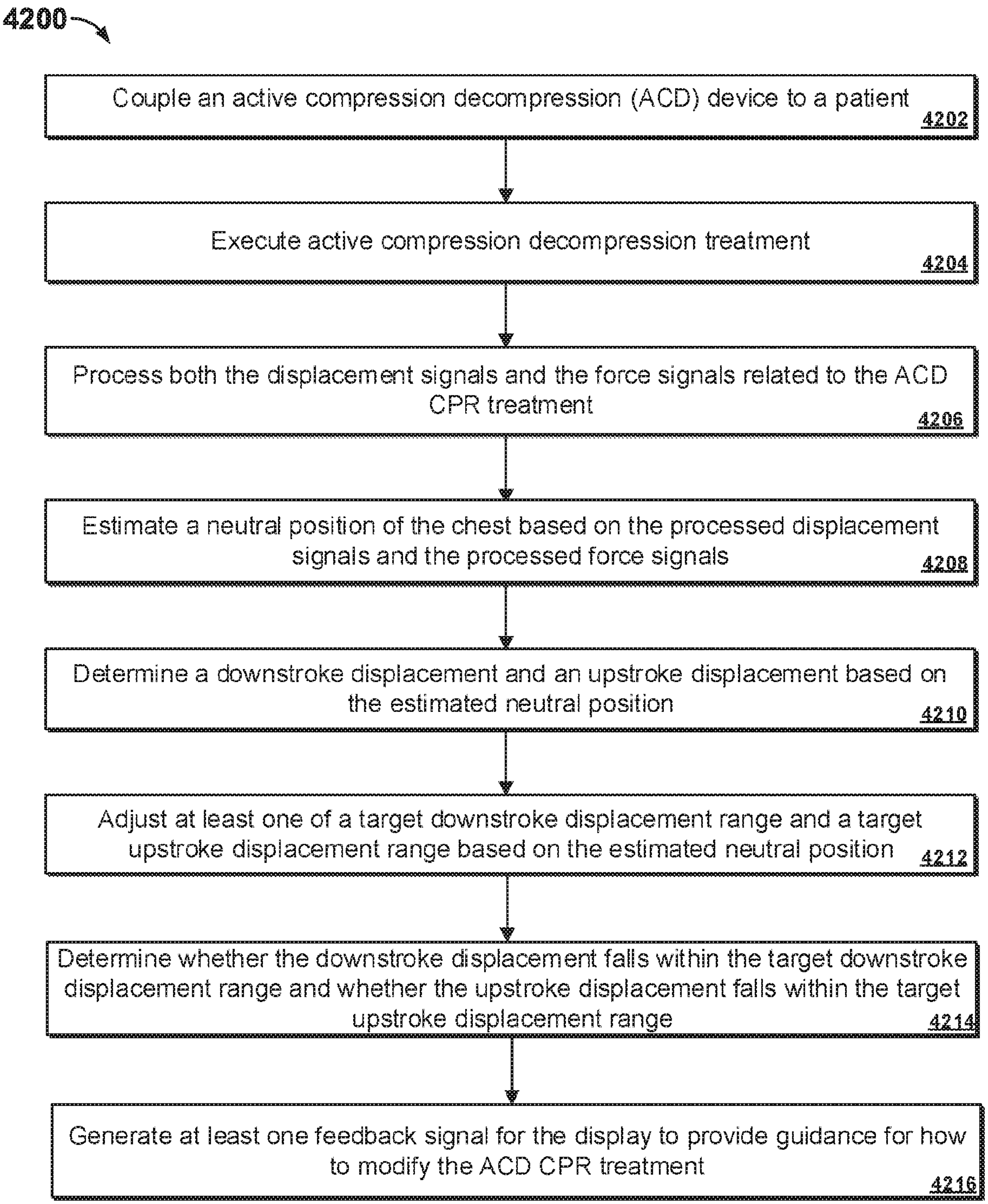
FIGS. 42-45 show flow diagrams of example processes of providing feedback during ACD CPR treatment.

FIG. 42 shows an example process 4200 for providing feedback for using an ACD device, such as device 100 or 1200, during ACD CPR treatment. The process 4200 includes coupling (4202) an ACD an ACD device to a patient. The process 4200 includes executing (4204) ACD treatment on the patient, such as by a rescuer using the ACD device. The ACD device or other associated device is configured to process (4206) the displacement signals and the force signals related to the ACD CPR treatment. For example, the displacement signals and the force signals are generated during each compression cycle. The ACD device or other associated device is configured to estimate (4208) a neutral position of the chest based on the processed displacement signals and the processed force signals. The ACD device 1200 or other associated device measures the displacement during the compression phase and the decompression phase of the compression cycle. The ACD device 1200 or other associated device is configured to determine (4210) a downstroke displacement and an upstroke displacement based on the estimated neutral position. The ACD device 1200 or other associated device is configured to adjust (4212) at least one of a target downstroke displacement range and a target upstroke displacement range based on the estimated neutral position. For example, the ACD device 1200 or other associated device can estimate that the neutral position is 0.75 inches below the zero point. In response, the ACD device 1200 or other associated device can adjust the upstroke displacement (e.g., lift) to be greater than a prior upstroke displacement target, so as to effectively raise the neutral position back to a location closer to when compressions were initiated. Similarly, the ACD device 1200 or other associated device can adjust the corresponding downstroke displacement (e.g., depression) to be smaller than a prior target downstroke displacement. While these examples are provided for illustration, other adjustments can be made in response to estimating the neutral position (e.g., decreasing an upstroke displacement target and increase a downstroke displacement target, decreasing both the upstroke and downstroke displacements, etc.). The ACD device 1200 or other associated device is configured to determine (4214) whether the downstroke displacement falls within the target downstroke displacement range and whether the upstroke displacement falls within the target upstroke displacement range. The ACD device 1200 or other associated device is configured to generate (4216) at least one feedback signal for the display to provide guidance for how to modify the ACD CPR treatment based on the determination of whether the downstroke displacement falls within the target downstroke displacement range and whether the upstroke displacement falls within the target upstroke displacement range.

Figure 43:
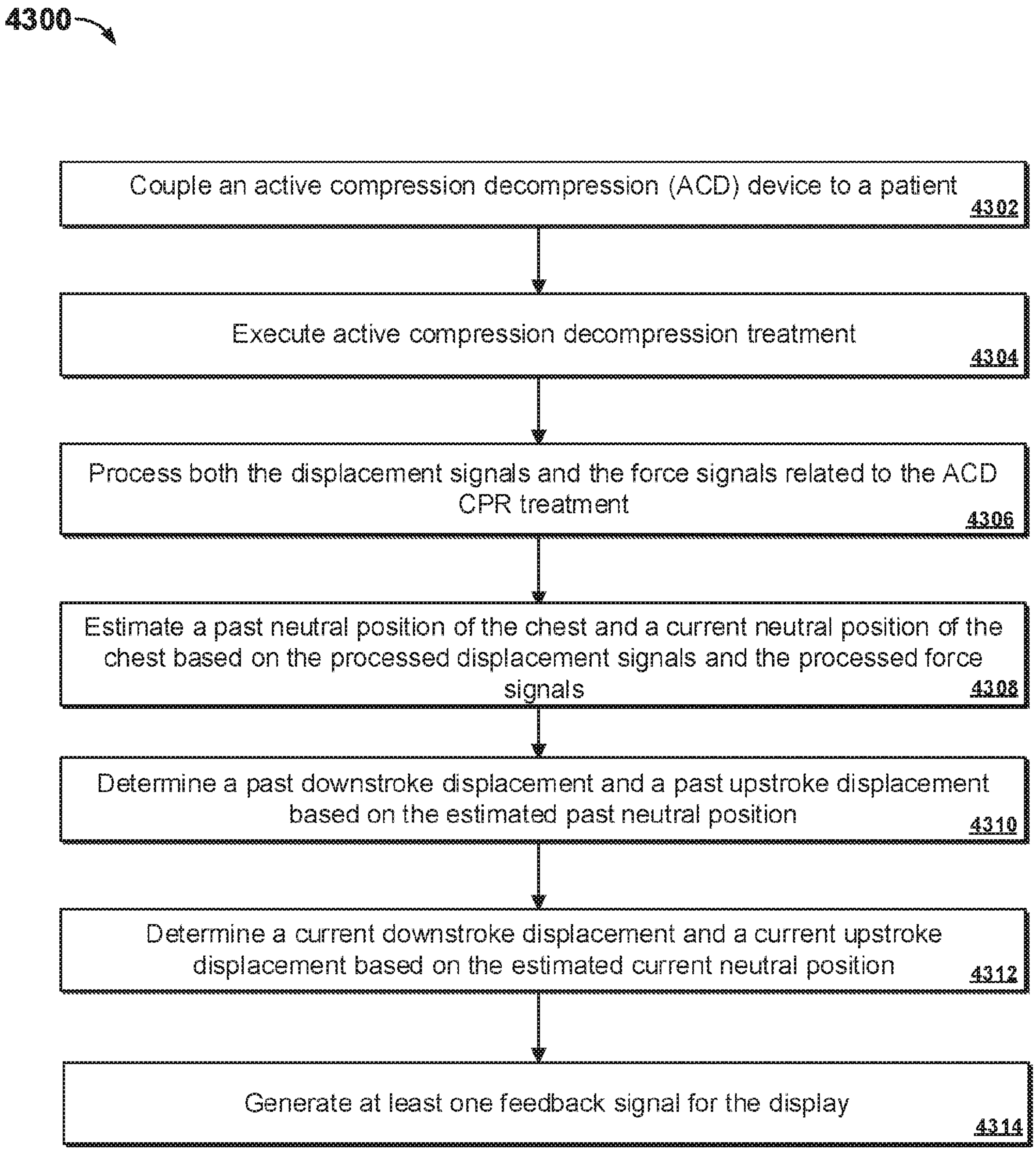

Turning to FIG. 43, an example process 4300 for providing feedback for using an ACD device, such as device 100 or 1200, during ACD CPR treatment is shown. The process 4300 includes coupling (4302) an ACD an ACD device to a patient. The process 3500 includes executing (4304) ACD treatment on the patient, such as by a rescuer using the ACD device. The ACD device or other associated device is configured to process (4306) the displacement signals and the force signals related to the ACD CPR treatment. The ACD device 1200 or other associated device is configured to estimate (4308) a past neutral position of the chest and a current neutral position of the chest based on the processed displacement signals and the processed force signals. In some implementations, the ACD device 1200 or other associated device can estimate the neutral position as described in relation to FIGS. 12-23. The ACD device 1200 or other associated device is configured to determine (4310) a past downstroke displacement and a past upstroke displacement based on the estimated past neutral position, such as described in relation to FIGS. 40-41. The ACD device 1200 or other associated device is configured to determine (3512) a current downstroke displacement and a current upstroke displacement based on the estimated current neutral position, such as described in relation to FIGS. 12-23. The ACD device or other associated device is configured to generate (4314) at least one feedback signal for the display to provide a visual indication of the current downstroke displacement, the current upstroke displacement, the past downstroke displacement, and the past upstroke displacement.

Figure 44:
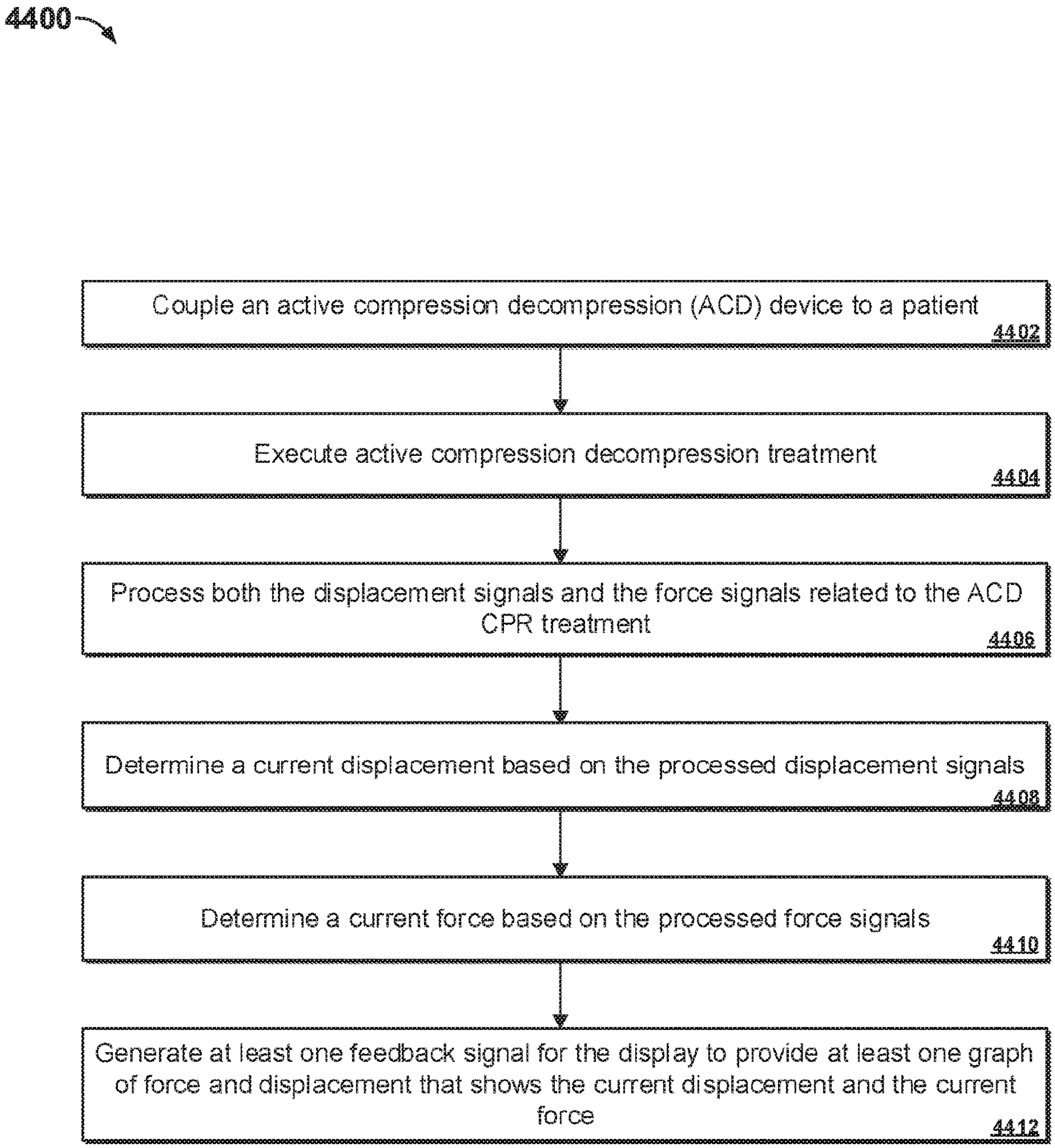

FIG. 44 shows an example process 4400 for providing feedback for using an ACD device, such as device 100 or 1200, during ACD CPR treatment. The process 4400 includes coupling (4402) an ACD an ACD device to a patient. The process 4400 includes executing (4404) ACD treatment on the patient, such as by a rescuer using the ACD device. The ACD device or other associated device is configured to process (4406) the displacement signals and the force signals related to the ACD CPR treatment. For example, the displacement signals and the force signals are generated during each compression cycle. The ACD device 1200 or other associated device is configured to determine (4408) a current displacement based on the processed displacement signals. The ACD device or other associated device is configured to determine (4410) a current force based on the processed force signals. The ACD is configured to generate (4412) at least one feedback signal for the display to provide at least one graph of force and displacement that shows the current displacement and the current force, such as shown in FIG. 15-16B and FIG. 39. In some implementations the graph of the current displacement and the current force can be normalized to assist a rescuer in providing ACD CPR treatment, as described in relation to FIG. 39.

Figure 45:
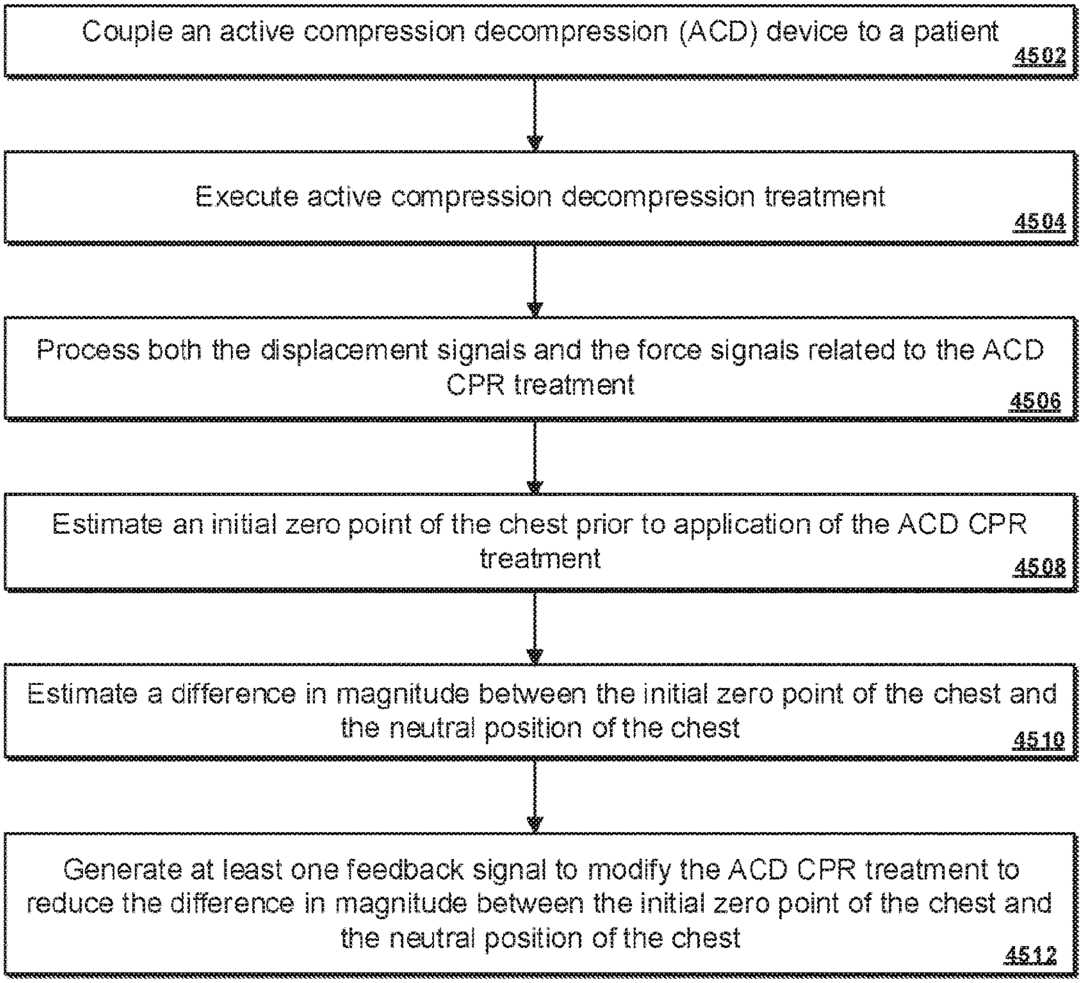

FIG. 45 shows an example process 4500 for providing feedback for using an ACD device, such as device 100 or 1200, during ACD CPR treatment. The process 4500 includes coupling (4502) an ACD an ACD device to a patient. The process 4500 includes executing (4504) ACD treatment on the patient, such as by a rescuer using the ACD device. The ACD device or other associated device is configured to process (4506) the displacement signals and the force signals related to the ACD CPR treatment. For example, the displacement signals and the force signals are generated during each compression cycle. The ACD device 1200 or other associated device is configured to estimate (4508) a neutral position of the chest based on the processed displacement signals and the processed force signals. For example, the ACD device 1200 or other associated device can estimate the neutral position as described in relation to FIGS. 12-23. The ACD device 1200 or other associated device is configured to estimate (4510) an initial zero point of the chest prior to application of the ACD CPR treatment, such as based on one or more initial readings of displacement of the patient's chest. The ACD device 1200 or other associated device is configured to determine (4512) a difference in magnitude between the estimated initial zero point of the chest and the estimated neutral position of the chest. The ACD device 1200 or other associated device is configured to generate (4514) at least one feedback signal to modify the ACD CPR treatment to reduce the difference in magnitude between the initial zero point of the chest and the neutral position of the chest.

While processes 4200, 4300, 4400, and 4500, while described in sequence, can be combined, run in parallel, or be executed alternatively for ACD CPR treatment.

Furthermore, while at least some of the embodiments described above describe techniques and displays used during manual human-delivered chest compressions and decompressions, similar techniques and displays can be used with automated chest compression devices such as the AUTOPULSE device manufactured by ZOLL Medical, MA. Hence, target ACD parameters adjusted based on the estimated neutral position may be applicable to both manual and automatically provided ACD treatment. For example, in the case of automated ACD treatment, the estimated neutral position may be an input for determining the target downstroke displacement and/or the target upstroke displacement. Once such targets are determined, then the automated chest compression device may be set to provide ACD treatment according to the updated or otherwise adjusted targets. In the case of manually provided ACD treatment, the estimated neutral position may also be an input for determining the target downstroke displacement and/or the target upstroke displacement. However, in the case of manual ACD treatment, an appropriate feedback device is used to assist a user in achieving the target parameters (e.g., current displacement(s) failing within desired range(s)).

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A system for assisting with cardiopulmonary resuscitation (CPR), the system comprising:
- an active compression decompression (ACD) device configured to push downward and pull upward on a chest of a patient;
- a force sensor configured to measure force applied to the chest of the patient by the ACD device;
- a motion sensor configured to measure displacement of the chest of the patient;
- one or more computer-readable media storing computer-executable instructions; and
- one or more processors configured to execute the computer-executable instructions, the execution carrying out operations to:
- identify, based on one or more signals received from at least one of the force sensor and the motion sensor, a compression cycle for an active compression decompression treatment, wherein the compression cycle comprises a compression phase and a decompression phase,
- determine a first displacement of chest compression corresponding to a crossing point in a force-displacement relationship of the compression phase of the compression cycle,
- determine a second displacement of chest compression corresponding to crossing point in a force-displacement relationship of the decompression phase of the compression cycle,
- estimate a neutral position of the chest of the patient based on the first displacement and the second displacement for each identified compression cycle of the active compression decompression treatment;
- generate at least one feedback signal based on the estimated neutral position; and
- modify operation of the ACD device based on the generated at least one feedback signal.

2. The system of claim 1, wherein estimating the neutral position of the chest of the patient based on the first displacement and the second displacement comprises determining a chest compression displacement representing the neutral position of the chest that is inside a range defined by the first displacement and the second displacement.

3. The system of claim 1, wherein estimating the neutral position of the chest of the patient based on the first displacement and the second displacement comprises determining a chest compression displacement representing the neutral position of the chest that is outside a range defined by the first displacement and the second displacement.

4. The system of claim 1, wherein estimating the neutral position of the chest of the patient based on the first displacement and the second displacement comprises determining a chest compression displacement representing the neutral position of the chest that is a function of an average of the first displacement and the second displacement.

5. The system of claim 4, wherein the function of the average of the first displacement and the second displacement comprises a moving average of the first displacement and the second displacement for a plurality of compression cycles including the compression cycle and one or more compression cycles immediately prior to the compression cycle.

6. The system of claim 1, wherein estimating the neutral position of the chest of the patient based on the first displacement and the second displacement comprises determining a chest compression displacement representing the neutral position of the chest that is a function of the first displacement and the second displacement, wherein the first displacement is weighted by a first weight value and wherein the second displacement is weighted by a second weight value that is different than the first weight value.

7. The system of claim 1, wherein the compression phase comprises at least one of a compression elevated portion and a compression non-elevated portion.

8. The system of claim 1, wherein the decompression phase comprises at least one of a decompression elevated portion and decompression non-elevated portion.

9. The system of claim 1, wherein the force-displacement relationship of the compression phase is different than the force-displacement relationship of the decompression phase based on a hysteresis of the compression cycle.

10. The system of claim 1, wherein the ACD device comprises:
- a first element configured to be coupled to the chest of the patient; and
- a second element configured to be grasped by a rescuer, the second element being coupled to the first element.

11. The system of claim 1, wherein the ACD device comprises at least one of the force sensor and the motion sensor.

12. The system of claim 1, wherein the motion sensor comprises an accelerometer.

13. The system of claim 1, comprising a user interface configured to display data representing one or more of the first displacement and the second displacement.

14. The system of claim 13, wherein the user interface is configured to display data indicating one or more of the force and the displacement.

15. The system of claim 13, wherein the user interface is configured to display a compression non-elevated depth of the compression phase.

16. The system of claim 13, wherein the user interface is configured to display a decompression elevated height of the decompression phase.

17. The system of claim 13, wherein the user interface is configured to display a trend graph representing chest remodeling.

18. The system of claim 13, wherein the user interface is configured for display on a device that is external to the ACD device.

19. The system of claim 18, wherein the device is remote from the ACD device.

20. The system of claim 18, wherein the device comprises at least one of a smartphone, a smartwatch, and a tablet device.

21. The system of claim 1, comprising a communication device configured to communicate data to an external device and receive data from the external device.

22. The system of claim 1, wherein the execution is carrying out operations to:
- determine a third displacement of chest compression corresponding to when approximately zero force is applied to the chest of the patient during the compression phase of the compression cycle,
- determine a fourth displacement of chest compression corresponding to when approximately zero force is applied to the chest of the patient during the decompression phase of the compression cycle, and estimate the neutral position of the chest of the patient based on the first displacement, the second displacement, the third displacement and the fourth displacement.

23. The system of claim 22, wherein the execution is carrying out operations to:

determine a fifth displacement of chest compression corresponding to a first product of force and displacement on the compression phase of the compression cycle, determine a sixth displacement of chest compression corresponding to a second product of force and displacement on the decompression phase of the compression cycle, and estimate the neutral position of the chest of the patient based on the first displacement, the second displacement, the third displacement, the fourth displacement, the fifth displacement, and the displacement depth.

24. The system of claim 23, wherein estimating the neutral position of the chest of the patient based on the first displacement, the second displacement, the third displacement, the fourth displacement, the fifth displacement, and the sixth displacement comprises a function of an average of the first displacement, the second displacement, the third displacement, the fourth displacement, the fifth displacement, and the sixth displacement.

* * * * *